(12) United States Patent
Kusaka

(10) Patent No.: US 8,049,801 B2
(45) Date of Patent: Nov. 1, 2011

(54) IMAGE SENSOR AND IMAGING APPARATUS

(75) Inventor: Yosuke Kusaka, Yokohama (JP)

(73) Assignee: Nikon Corporation, Tokyo (JP)

( * ) Notice: Subject to any disclaimer, the term of this patent is extended or adjusted under 35 U.S.C. 154(b) by 425 days.

(21) Appl. No.: 12/310,393

(22) PCT Filed: Sep. 14, 2007

(86) PCT No.: PCT/JP2007/067934
§ 371 (c)(1),
(2), (4) Date: Feb. 24, 2009

(87) PCT Pub. No.: WO2008/032820
PCT Pub. Date: Mar. 20, 2008

(65) Prior Publication Data
US 2009/0278966 A1   Nov. 12, 2009

(30) Foreign Application Priority Data

Sep. 14, 2006   (JP) .................................. 2006-249525

(51) Int. Cl.
*H04N 5/335* (2011.01)
*H01L 31/113* (2006.01)

(52) U.S. Cl. .................. 348/302; 348/294; 257/291

(58) Field of Classification Search ............... 250/208.1; 257/290, 291; 348/294, 300, 301, 308, 302
See application file for complete search history.

(56) References Cited

U.S. PATENT DOCUMENTS

| 6,819,360 B1 | 11/2004 | Ide et al. | |
| 6,933,978 B1 | 8/2005 | Suda | |
| 7,711,261 B2 * | 5/2010 | Kusaka | .......................... 396/111 |

FOREIGN PATENT DOCUMENTS

| JP | A-1-216306 | 8/1989 |
| JP | A-2000-292686 | 10/2000 |
| JP | A-2001-124984 | 5/2001 |
| JP | A-2005-106994 | 4/2005 |
| JP | A-2005-303409 | 10/2005 |
| JP | A-2006-154065 | 6/2006 |
| JP | A-2007-65330 | 3/2007 |
| JP | A-2007-158597 | 6/2007 |
| JP | A-2007-158692 | 6/2007 |
| JP | A-2007-184716 | 7/2007 |

OTHER PUBLICATIONS

English translation of Written Opinion of the International Search Authority (PCT/ISA/237) for prepared for PCT/JP2007/067934 on Mar. 14, 2009.*

* cited by examiner

*Primary Examiner* — David N Spector
(74) *Attorney, Agent, or Firm* — Oliff & Berridge, PLC

(57) ABSTRACT

An image sensor captures an image formed through an optical system and includes a plurality of types of imaging pixels with spectral sensitivity characteristics different from one another, two dimensionally disposed in a predetermined array. The image sensor includes a plurality of focus detection pixel rows that are disposed so as to occupy part of the predetermined array and extend along a plurality of directions intersecting each other, each made up with a plurality of focus detection pixels set along one of the plurality of directions, and the focus detection pixel rows are used to detect a focusing condition of the optical system. A focus detection pixel occupying a position at which the focus detection pixel rows intersect is set at a position equivalent to a position of an imaging pixel with specific spectral sensitivity characteristics corresponding to imaging pixels disposed with a highest level of density in the predetermined array.

20 Claims, 42 Drawing Sheets

Figure 1:
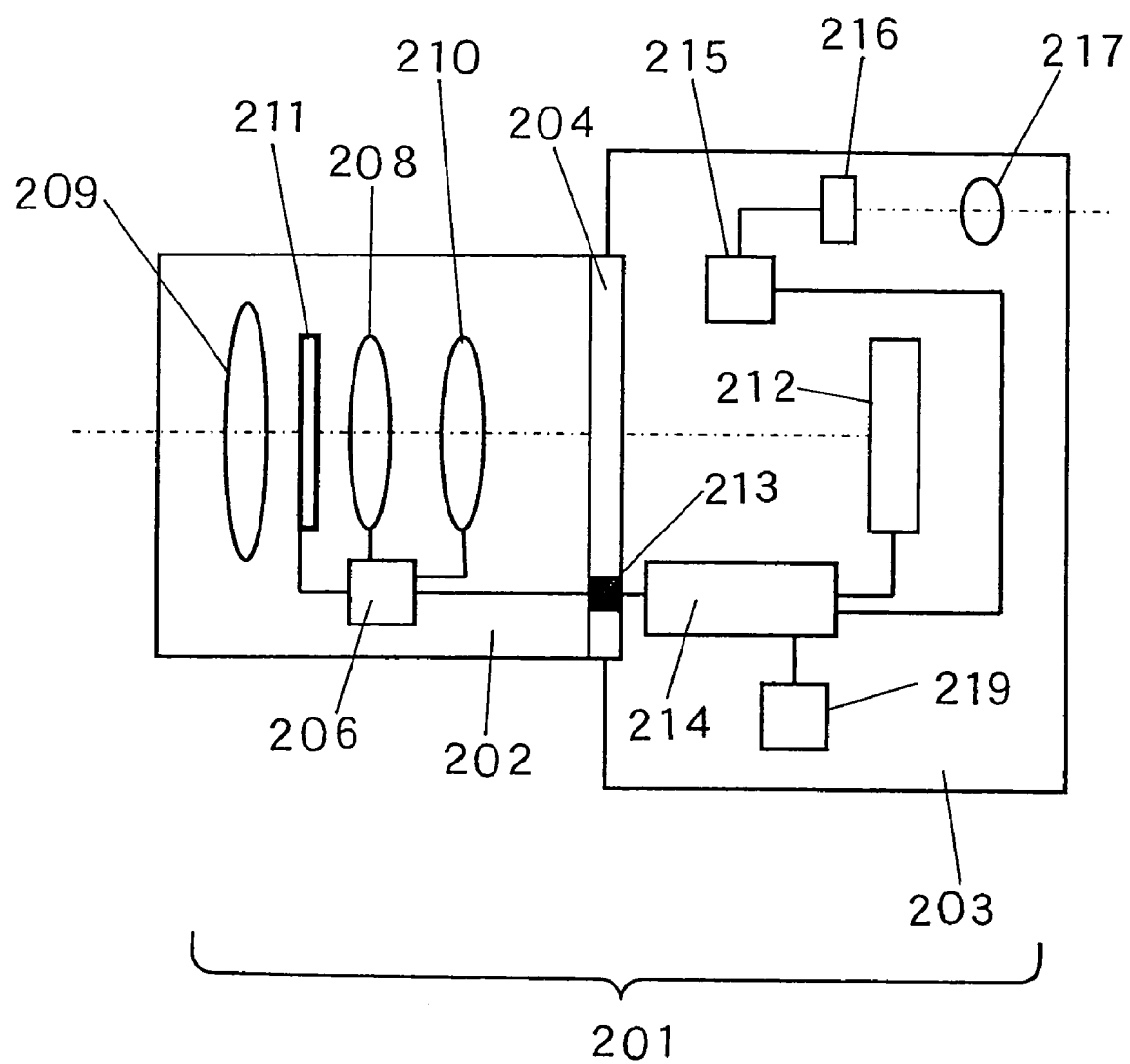

FIG.44
(a)
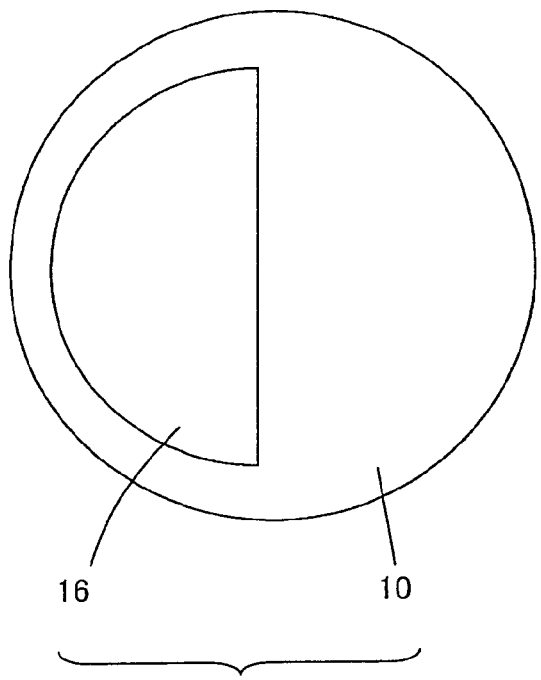
16    10
330a (320a)
(b)
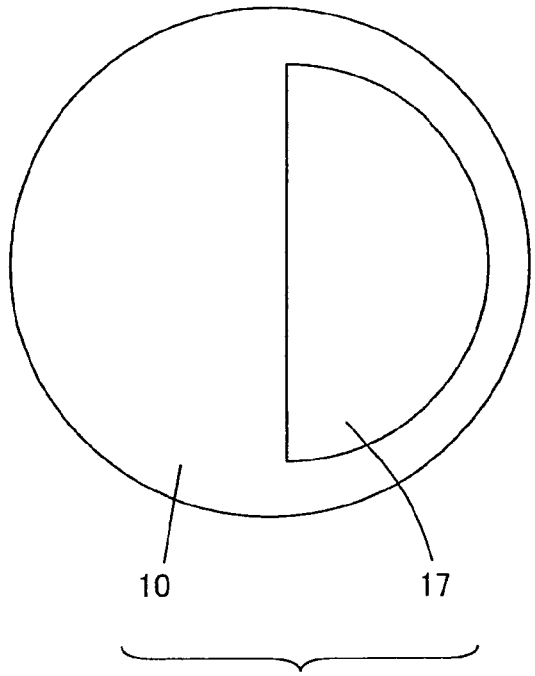
10    17
330b (320b)

IMAGE SENSOR AND IMAGING APPARATUS

This application is a national phase of PCT/JP2007/067934, filed on Sep. 14, 2007, and is based on and claims priority from Japanese Patent Application No. 2006-249525, filed on Sep. 14, 2006, the content of which is hereby incorporated by reference in its entirety into this application.

TECHNICAL FIELD

The present invention relates to an image sensor and an imaging apparatus.

BACKGROUND ART

There are image sensors known in the related art that include focus detection pixels disposed in a cross-shaped pattern in correspondence to a focus detection area set on the photographic field, so as to detect the focusing condition of an optical system along two directions assumed on the photographic filed (see, for instance, patent reference literature 1).

The prior art literatures related to the present invention include the following.

Patent reference literature 1: Japanese Laid Open Patent Publication No. 2000-292686

DISCLOSURE OF THE INVENTION

Problems to be Solved by the Invention

In an image sensor such as that in the related art described above, pixel image data at positions occupied by the focus detection pixels must be obtained through interpolation executed based upon the image data at imaging pixels present around the focus detection pixels when generating image data expressing the captured image based upon the output from the image sensor. This requirement gives rise to a challenge particularly pronounced in the area near the position at which the focus detection pixel rows intersect, where imaging pixels are disposed with lower density, in that the lowered accuracy with which the interpolation is executed to generate image data for the area is bound to lower the quality of the image data generated to express the captured image.

Means for Solving the Problems (1) According to one exemplary embodiment, an image sensor that captures an image formed through an optical system and that comprises a plurality of types of imaging pixels with spectral sensitivity characteristics different from one another, two-dimensionally disposed in a predetermined array, wherein: a plurality of focus detection pixel rows are disposed so as to occupy part of the predetermined array and extend along a plurality of directions intersecting each other, each made up with a plurality of focus detection pixels set along one of the plurality of directions, and the focus detection pixel rows are used to detect a focusing condition of the optical system; and a focus detection pixel occupying a position at which the focus detection pixel rows intersect is set at a position equivalent to a position of an imaging pixel with specific spectral sensitivity characteristics corresponding to imaging pixels disposed with a highest level of density in the predetermined array.

(2) According to another exemplary embodiment, an image sensor that captures an image formed through an optical system and that comprises a plurality of types of imaging pixels with spectral sensitivity characteristics different from one another, two-dimensionally disposed in a Bayer array, wherein: a plurality of focus detection pixel rows are disposed so as to occupy part of the Bayer array and extend along a plurality of directions intersecting each other, each made up with a plurality of focus detection pixels set along one of the plurality of directions, the focus detection pixel rows are used to detect a focusing condition of the optical system; and a focus detection pixel occupying a position at which the focus detection pixel rows intersect is set at a position equivalent to a position of one of a blue pixel and a green pixel in the Bayer array.

(3) According to another exemplary embodiment, in the image sensor according to the embodiment discussed above, the focus detection pixel occupying the position at which the focus detection pixel rows intersect is set at a position equivalent to a position of a blue pixel in the Bayer array.

(4) According to another exemplary embodiment, in the image sensor according to the embodiment discussed above, the predetermined array is a Bayer array.

(5) According to another exemplary embodiment, in the image sensor according to any one of the embodiments discussed above, the plurality of focus detection pixel rows comprises a first focus detection pixel row and a second focus detection pixel row, the first focus detection pixel row is arranged along a direction perpendicular to a direction running from a center of photographic field to a field periphery and the second focus detection pixel row is arranged along the direction running from the center of photographic field toward the field periphery; and a focus detection pixel in the first focus detection pixel row occupies the position at which the first focus detection pixel row and the second focus detection pixel row intersect.

(6) According to another exemplary embodiment, in the image sensor according to the embodiment discussed above, the focus detection pixels in the first focus detection pixel row each receives a first pair of focus detection light fluxes having passed through the optical system and the focus detection pixels in a second focus detection pixel row each receives a second pair of focus detection light fluxes having passed through the optical system; and a distance between gravitational centers of the first pair of focus detection light fluxes is greater than a distance between gravitational centers of the second pair of focus detection light fluxes.

(7) According to another exemplary embodiment, in the image sensor according to the embodiments discussed above, an array pitch at which the focus detection pixels in the first focus detection pixel row are disposed is set smaller than an array pitch at which the focus detection pixels in the second focus detection pixel rows are disposed and a focus detection pixel in the first focus detection pixel row occupies the position at which the first focus detection pixel row and the second focus detection pixel row intersect.

(8) According to another exemplary embodiment, in the image sensor according to any one of the embodiments discussed above, the imaging pixels are disposed in a dense two-dimensional array; and the plurality of focus detection pixel rows are disposed in a grid pattern assuming a greater grid pitch than an array pitch at which the imaging pixels are disposed.

(9) According to another exemplary embodiment, in the image sensor according to the embodiment discussed above, the plurality of focus detection pixel rows are disposed in a square grid pattern.

(10) According to another exemplary embodiment, in the image sensor according to the embodiment discussed above, the plurality of focus detection pixel rows includes focus detection pixel rows disposed along directions in which diagonal lines connecting intersection points of the focus detection pixel rows disposed in the grid pattern extend.

(11) According to another exemplary embodiment, in the image sensor according to any one of the embodiments discussed above, the focus detection pixels are disposed adjacent to one another continuously along a straight line.

(12) According to another exemplary embodiment, in the image sensor according to the embodiment discussed above, a focus detection pixel in a focus detection pixel row ranging along a direction closer to a tangential direction along which a tangential line of a concentric circle centered on a center of photographic field extends, occupies an intersection position at which the focus detection pixel rows intersect each other.

(13) According to another exemplary embodiment, in the image sensor according to any one of the embodiments discussed above, the imaging pixels and the focus detection pixels are each equipped with a micro-lens and a photoelectric conversion unit.

(14) According to another exemplary embodiment, an imaging apparatus comprises: an image sensor according to any one of the embodiments discussed above; and a focus detection means for detecting a focusing condition of the optical system based upon signals output from the focus detection pixel rows.

(15) According to another exemplary embodiment, the imaging apparatus according to the embodiment discussed above comprises an interpolation means for generating an image signal at a position occupied by each of the focus detection pixels through interpolation executed based upon image signals from the imaging pixels disposed near the focus detection pixel.

(16) According to another exemplary embodiment, the imaging apparatus according to the embodiment discussed above comprises a selection means for selecting a specific position on the image sensor based upon an output from the image sensor, and the focus detection means detects the focusing condition of the optical system based upon signals from the focus detection pixel row present in the position selected via the selection means.

(17) According to another exemplary embodiment, in the imaging apparatus according to the embodiment discussed above, the selection means detects a position of a person, a person's face or a person's eye within an image obtained via the image sensor.

(18) According to another exemplary embodiment, in the imaging apparatus according to the embodiment discussed above, the plurality of focus detection pixel rows are disposed in a grid pattern assuming a grid pitch greater than an array pitch at which the imaging pixels are disposed; and the grid pitch is set smaller than a statistically-determined average size of the person, the person's face or the person's eyes assumed on the photographic field.

(19) According to another exemplary embodiment, in the imaging apparatus according to the embodiment discussed above, the selection means selects the specific position based upon an output from the image sensor which does not include signals from the focus detection pixels.

(20) According to another exemplary embodiment, in the imaging apparatus according to the embodiment discussed above, the selection means selects the specific position by using image signals generated via the interpolation means in correspondence to positions occupied by the focus detection pixels.

ADVANTAGEOUS EFFECT OF THE INVENTION

According to the present invention, two focus detection pixel rows can be set so as to intersect each other while maintaining a high level of image quality.

Figure 6:
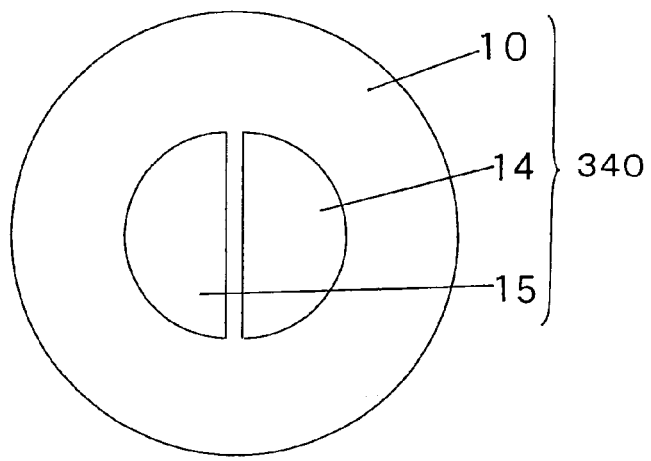
Figure 7:
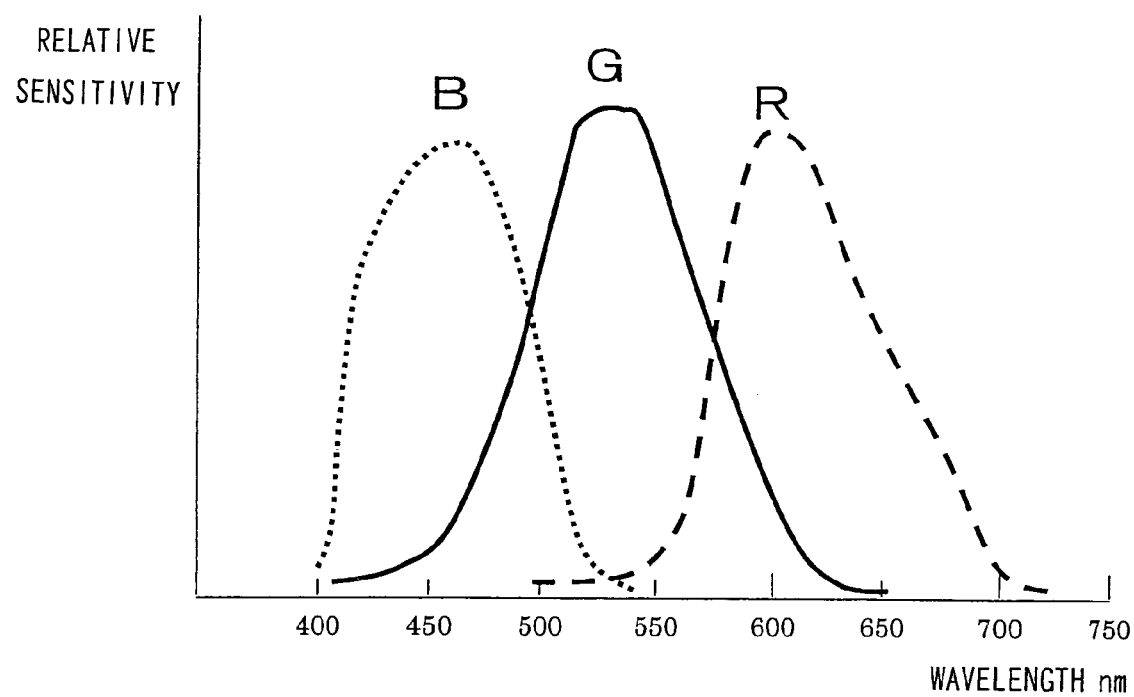
Figure 8:
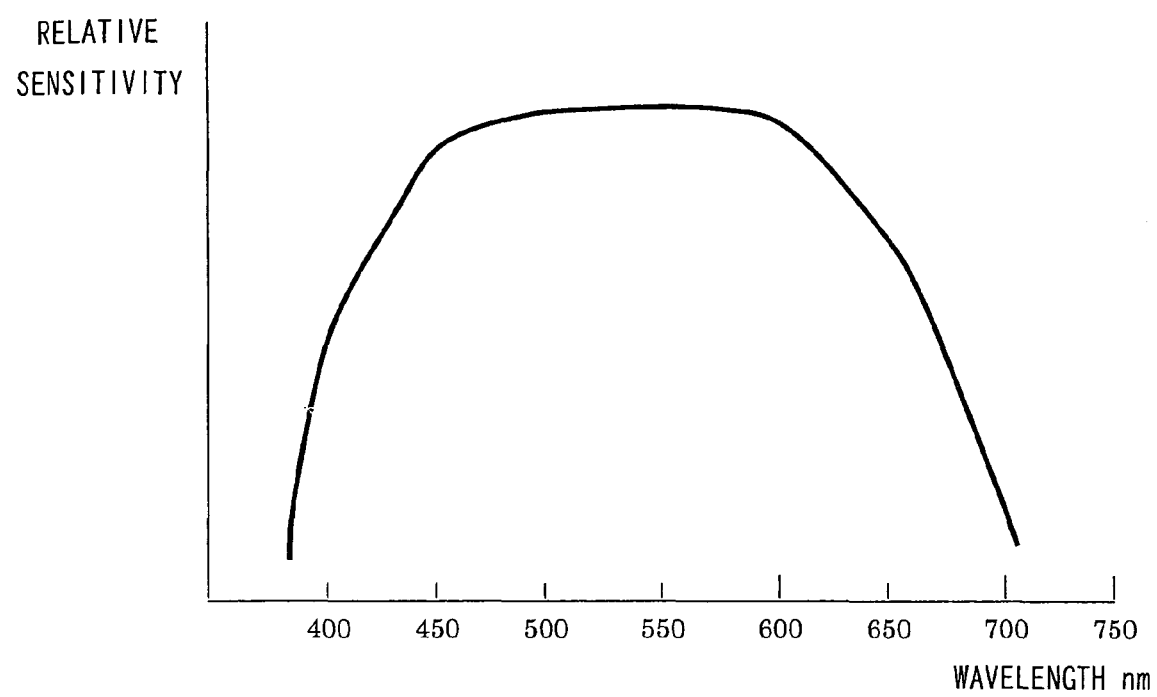

BRIEF DESCRIPTION OF THE DRAWINGS (FIG. 1) A structure adopted in an embodiment (FIG. 2) A focus detection position assumed on the photographic field (FIG. 3) A front view showing in detail the structure adopted at the image sensor (FIG. 4) A front view showing the structure of an imaging pixel (FIG. 5) A front view showing the structure of a focus detection pixel (FIG. 6) A front view showing the structure of another focus detection pixel (FIG. 7) The spectral characteristics of the imaging pixels (FIG. 8) The spectral characteristics of the focus detection pixels (FIG. 9) A sectional view showing the structure of an imaging pixel (FIG. 10) A sectional view showing the structure of a focus detection pixel (FIG. 11) An illustration of focus detection executed via micro-lenses by adopting a split-pupil method (FIG. 12) An illustration of vignetting at the range-finding pupils over a peripheral area of the photographic field (FIG. 13) The relationship between imaging pixels and the exit pupil (FIG. 14) A front view of the range-finding pupils at the exit pupil plane, which correspond to a focus detection pixel (FIG. 15) A front view of the range-finding pupils at the exit pupil plane, which correspond to another focus detection pixel (FIG. 16) A flowchart of the operation executed in the digital still camera (imaging apparatus) in the embodiment (FIG. 17) An illustration of the correlation operation processing (FIG. 18) A front view showing in detail the structure adopted in an image sensor achieved in a variation (FIG. 19) A front view of the range-finding pupils at the exit pupil plane, which correspond to a focus detection pixel (FIG. 20) A front view showing in detail the structure adopted in an image sensor achieved in a variation (FIG. 21) A front view showing in detail the structure adopted in the image sensor achieved in another variation (FIG. 22) A front view showing in detail the structure adopted in the image sensor achieved in yet another variation (FIG. 23) A front view showing in detail the structure adopted in the image sensor achieved in yet another variation (FIG. 24) A front view showing in detail the structure adopted in the image sensor achieved in yet another variation (FIG. 25) The positional arrangement with which focus detection pixels are disposed at the image sensor in an alternative embodiment (FIG. 26) An illustration showing in detail the structure of the image sensor achieved in the alternative embodiment (FIG. 27) An illustration showing in detail the structure of the image sensor achieved in the alternative embodiment (FIG. 28) An illustration of vignetting of focus detection light fluxes (FIG. 29) An illustration of vignetting of focus detection light fluxes (FIG. 30) A flowchart of the operation executed in the digital still camera (imaging apparatus) achieved in the alternative embodiment (FIG. 31) An illustration showing a position on the photographic field at which a person's face is detected, and the positional arrangement assumed for focus detection pixels (FIG. 32) An illustration of a method that may be adopted to generate image data at focus detection pixel positions through interpolation (FIG. 33) A front view showing in detail the structure adopted in the image sensor achieved in a variation of the alternative embodiment (FIG. 34) A front view showing in detail the structure adopted in the image sensor achieved in another variation (FIG. 35) A front view showing in detail the structure adopted in the image sensor achieved in yet another variation (FIG. 36) A front view showing in detail the structure adopted in the image sensor achieved in yet another variation (FIG. 37) A front view showing in detail the structure adopted in the image sensor achieved in yet another variation (FIG. 38) A front view showing in detail the structure adopted in the image sensor achieved in yet another variation (FIG. 39) A front view showing in detail the structure adopted in the image sensor achieved in yet another variation (FIG. 40) A front view showing in detail the structure adopted in the image sensor achieved in yet another variation (FIG. 41) A front view showing in detail the structure adopted in the image sensor achieved in yet another variation (FIG. 42) A front view showing in detail the structure adopted in the image sensor achieved in yet another variation (FIG. 43) A front view showing in detail the structure adopted in the image sensor achieved in yet another variation (FIG. 44) Structures that may be adopted in focus detection pixels

EXPLANATION OF REFERENCE NUMERALS

10; micro-lens
11, 12, 13, 14, 15, 16, 17; photoelectric conversion unit
202; interchangeable lens
212, 212A~212N; image sensor
310, 310, 312; imaging pixel
320, 320a, 32b, 330, 330a, 330b, 340, 350, 360; focus detection pixel

BEST MODE FOR CARRYING OUT THE INVENTION

In the example described below, an imaging apparatus achieved in an embodiment of the present invention is adopted in a digital still camera. FIG. 1 shows the structure adopted in the embodiment. A digital still camera 201 in the embodiment comprises an interchangeable lens 202 and a camera body 203 and the interchangeable lens 202 is mounted at the camera body 203 via a mount unit 204.

The interchangeable lens 202 includes a lens drive control device 206, a zooming lens 208, a lens 209, a focusing lens 210 and a diaphragm 211. The lens drive control device 206, constituted with a microcomputer and peripheral components such as a memory, controls the drive of the focusing lens 210 and the diaphragm 211, detects the state of the zooming lens 208 and the focusing lens 210, and exchanges information with a body drive control device 214 to be detailed later. The information exchanged with the body drive control device includes lens information transmitted to the body drive control device and camera information received from the body drive control device.

At the camera body 203, an image sensor 212, the body drive control device 214, a liquid crystal display element drive circuit 215, a liquid crystal display element 216, an eyepiece lens 217, a memory card 219 and the like are disposed. Pixels to be described in detail later are disposed in a two-dimensional array at the image sensor 212, which is positioned at a predetermined imaging plane of the interchangeable lens 202 and captures a subject image formed via the interchangeable lens 202. It is to be noted that focus detection pixels are disposed at a specific focus detection position in the image sensor 212, as described in detail later.

The body drive control device 214, constituted with a microcomputer and peripheral components such as a memory, executes control of the overall operation of the digital still camera, as well as control under which image signals are read out from the image sensor 212, the image signals are corrected, the focusing condition of the interchangeable lens 202 is detected, the lens information originating from the lens drive control device 206 is received, the camera information (defocus amount) is transmitted to the lens drive control device 206 and the like. The various types of information are exchanged between the body drive control device 214 and the lens drive control device 206 through communication carried out via an electrical contact point 213 at the mount unit 204.

The liquid crystal display element drive circuit 215 drives the liquid crystal display element 216 of an electronic viewfinder (EVF). The photographer is able to observe an image on display at the liquid crystal display element 216 via the eyepiece lens 217. In the memory card 219, which is a portable storage medium detachably loaded in the camera body 203, image signals are saved and stored.

A subject image having passed through the interchangeable lens 202 and formed on the image sensor 212 undergoes photoelectric conversion at the image sensor 212 and the output from the image sensor 212 is provided to the body drive control device 214. Based upon data output from focus detection pixels at the image sensor 212, the body drive control device 214 calculates a defocus amount indicating the extent of defocusing manifesting at a specific focus detection position and provides the defocus amount thus calculated to the lens drive control device 206. In addition, the body drive control device 214 stores image signals generated based upon the output from the image sensor 212 into the memory card 219 and also provides the image signals to the liquid crystal display element drive circuit 215 so as to enable an image to be displayed at the liquid crystal display element 216.

Operating members such as a shutter button and a focus detection position selector member (not shown) are disposed at the camera body 203. The body drive control device 214 detects an operating state signal from such an operating member and controls the operation (imaging operation, focus detection position selection operation or image processing operation) corresponding to the detection results.

The lens drive control device 206 adjusts the lens information in conformance to the focusing state, the zooming state, the aperture setting state, the maximum aperture F-number and the like. More specifically, the lens drive control device 206 monitors the positions of the lenses 208 and 210 and the aperture position assumed by the diaphragm 211, and obtains through arithmetic operation current lens information corresponding to the monitored information or selects current lens information corresponding to the monitored information from a lookup table created in advance. The lens drive control device 206 calculates a lens drive quantity indicating the extent to which the lens should be driven based upon the defocus amount having been received and drives the focusing lens 210 to the focus match point via a drive source such as a motor (not shown) based upon the lens drive quantity.

Figure 2:
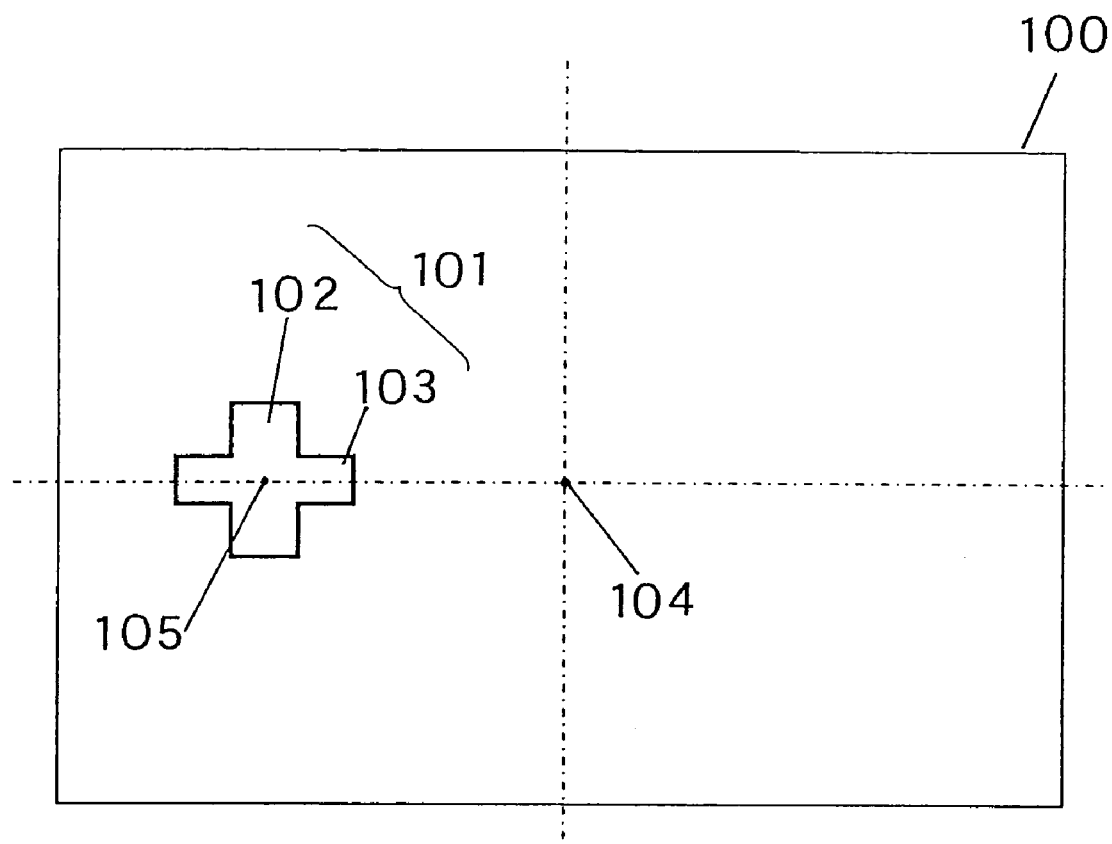

FIG. 2 shows a focus detection position (focus detection area) set on the photographic field, representing an example of an area where an image is sampled via focus detection pixel rows (or focus detection pixel lines) on the photographic field for purposes of focus detection. In the embodiment, a focus detection area 101 is set at a position 105 further toward the periphery of the photographic field along the horizontal direction relative to a center 104 of the photographic field 100. The focus detection area 101 includes a portion 102 ranging along the vertical direction and a portion 103 ranging along the horizontal direction, intersecting each other at the position 105, so as to enable focus detection (image shift detection) both along the horizontal direction (the direction parallel to the line connecting the field center 104 and the focus detection position 105) and along the vertical direction (the direction perpendicular to the line connecting the field center 104 and the focus detection position 105).

Figure 3:
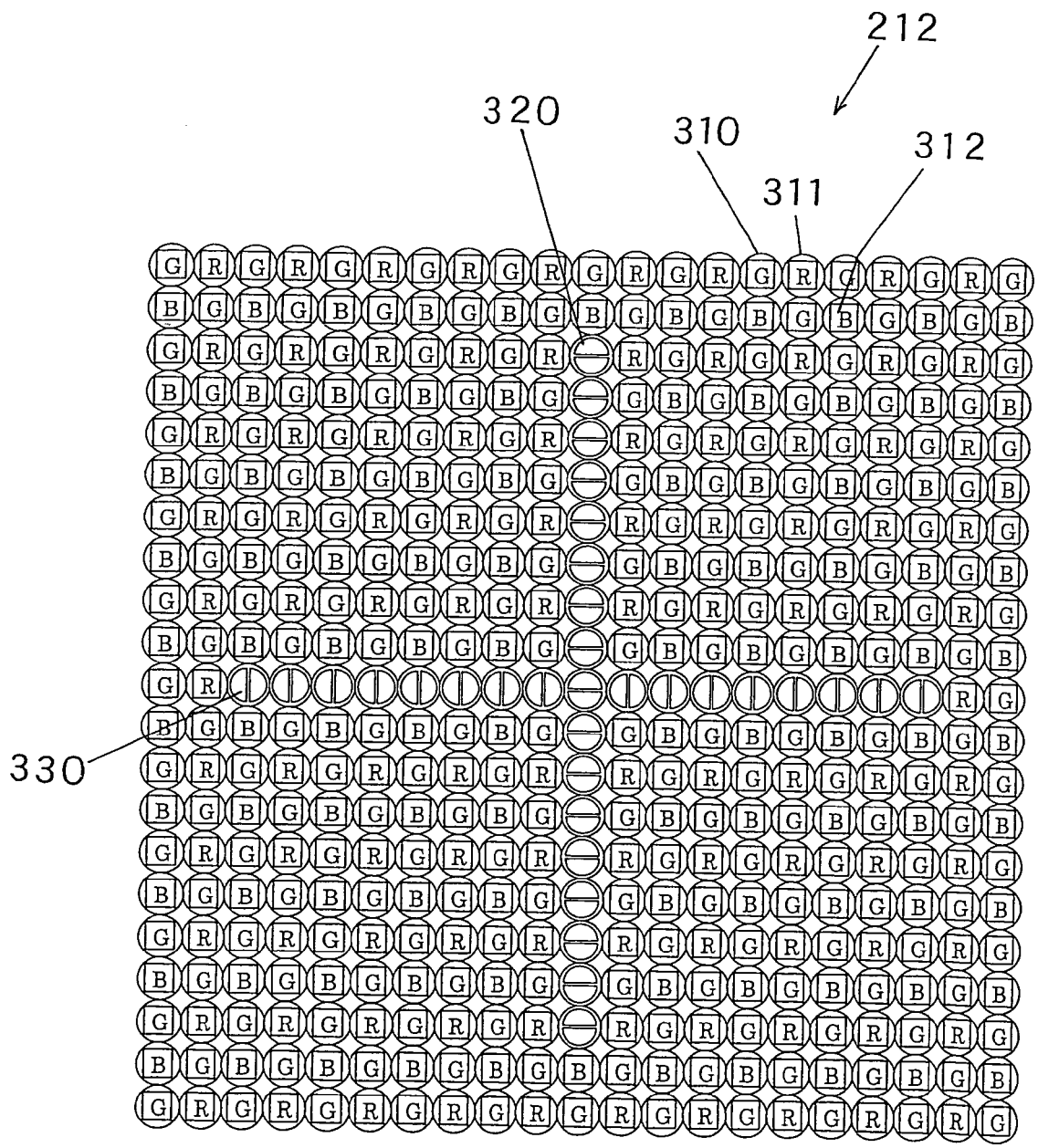
Figure 4:
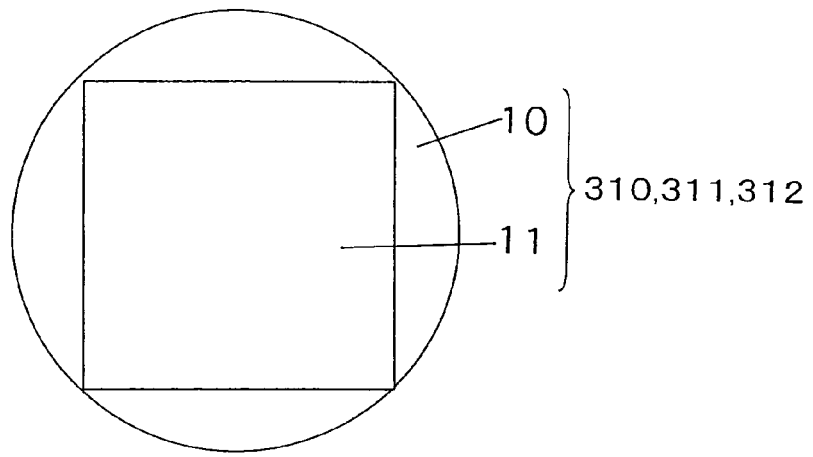

FIG. 3 is a front view showing in detail the structure adopted in the image sensor 212, in an enlargement of a portion thereof corresponding to the focus detection area 105 in FIG. 2. It is to be noted that the longitudinal/lateral orientation assumed for the image sensor 212 in FIG. 3 corresponds to the longitudinal/lateral orientation of the photographic field 100 in FIG. 2. The image sensor 212 includes imaging pixels (green pixels 310, red pixels 311 and blue pixels 312) used to capture images and focus detection pixels 320 and 330 used in focus detection. As shown in FIG. 4, the imaging pixels (the green pixels 310, the red pixels 311 and the blue pixels 312) are each constituted with a micro-lens 10, a photoelectric conversion unit 11 and a color filter (not shown). Three different types of color filters, i.e., red (R) filters, green (G) filters and blue (B) filters, are disposed at the imaging pixels, and the color filters corresponding to the different colors assume spectral sensitivity characteristics such as those shown in FIG. 7. At the image sensor 212, the imaging pixels equipped with color filters corresponding to the three different colors (the green pixels 310, the red pixels 311 and the blue pixels 312) are disposed in a Bayer array.

Figure 5:
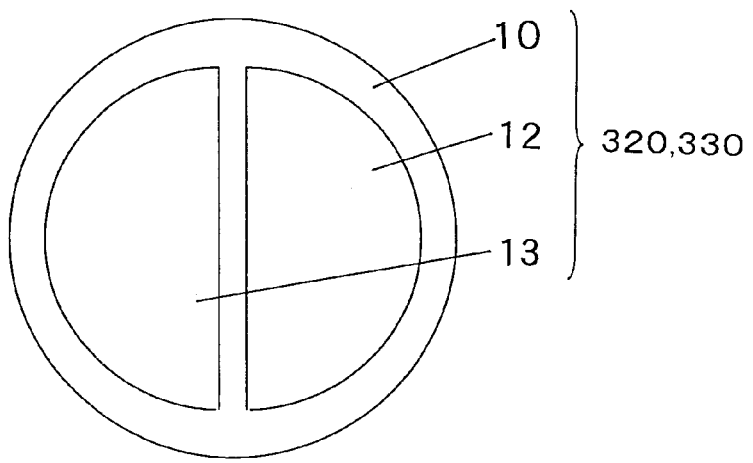

As shown in FIG. 5, the focus detection pixels 320 and 330 are each constituted with a micro-lens 10 and a pair of photoelectric conversion units 12 and 13. Each focus detection pixel 320 is oriented by rotating a focus detection pixel 330 by 90°. In order to assure a sufficient quantity of light, no color filters are disposed at the focus detection pixels 320 and 330, and they assume spectral characteristics (see FIG. 8) achieved by integrating the spectral sensitivity of the photodiodes where photoelectric conversion is executed and the spectral characteristics of the infrared filter (not shown). The spectral characteristics of the focus detection pixels are substantially the sum of the spectral characteristics of the green pixels, the red pixels and the blue pixels in FIG. 7, manifesting sensitivity to light over a light wavelength range that includes the light wavelength sensitivity ranges of the green pixels, the red pixels and the blue pixels.

The photoelectric conversion units 11 of the imaging pixels 310, 311 and 312 are designed in a shape that allows the entire light flux through a predetermined aperture diameter (e.g., F1.0) to be received via the corresponding micro-lens 10, as shown in FIG. 4. The pair of photoelectric conversion units 12 and 13 at each of the focus detection pixels 320 and 330 are designed in a shape that allows the entire light flux through a predetermined aperture diameter (e.g., F2.8) to be received via the micro-lens 10, as shown in FIG. 5. The focus detection pixels 320 used in focus detection are disposed in a dense linear pattern with no gap between the individual focus detection pixels, occupying part of a column where green pixels 310 and blue pixels 312, i.e., imaging pixels, would otherwise be disposed. The focus detection pixels 330 used in focus detection are disposed in a dense linear pattern with no gap between the individual focus detection pixels, occupying part of a row where green pixels 310 and red pixels 311, i.e., imaging pixels, would otherwise be disposed. A focus detection pixel 320 is disposed at the pixel position at which the pixel row made up with the focus detection pixels 320 and the pixel row made up with the focus detection pixels 330 intersect.

Image data output from the imaging pixels through an imaging operation are directly utilized. Image data at positions occupied by the focus detection pixels, on the other hand, must be generated through interpolation executed by using the image data at imaging pixels present near the focus detection pixels. For instance, image data at a position that would otherwise be occupied by a blue imaging pixel 312 but is actually occupied by a focus detection pixel 320 are generated through interpolation by averaging the image data at the blue pixel 312 present to the right of the focus detection pixel 320 across the green pixel 310 directly adjacent to the focus detection pixel 320 and the image data at the blue pixel 312 present to the left of the focus detection pixel 320 across the green pixel 312 directly adjacent to the focus detection pixel 320. Image data at a position that would otherwise be occupied by a green imaging pixel 310 but is actually occupied by a focus detection pixel 320 are generated through interpolation by averaging the image data at the four green pixels 310 present next to the focus detection pixel 320 along the 45° diagonal directions, assuming the upper right position, the lower right position, the upper left position and the lower left position relative to the focus detection pixel 320.

In addition, image data at a position that would otherwise be occupied by a red imaging pixel 311 but is actually occupied by a focus detection pixel 330 are generated through interpolation by averaging the image data at the red pixel 311 present above the focus detection pixel 330 across the green pixel 310 directly above the focus detection pixel 330 and the image data at the red pixel 311 present below the focus detection pixel 320 across the green pixel 310 directly below the focus detection pixel 330. Image data at a position that would otherwise be occupied by a green imaging pixel 310 but is actually occupied by a focus detection pixel 330 are generated through interpolation by averaging the image data at the four green pixels 310 present next to the focus detection pixel 330 along the 45° diagonal directions, assuming the upper right position, the lower right position, the upper left position and the lower left position relative to the focus detection pixel 330.

Among the green pixels 310, the red pixels 311 and the blue pixels 312 disposed in the Bayer array, the green pixels 310 are set more densely than the red pixels 311 and the blue pixels 312. This means that image data for a green pixel position (a position that would otherwise be occupied by a green pixel) can be generated through interpolation with a higher level of accuracy than image data for a red pixel position or a blue pixel position and thus, the image data generated through the interpolation for the green pixel position achieve higher quality.

As described above, in an image sensor with imaging pixels disposed two-dimensionally along the horizontal direction and the vertical direction in a matrix pattern (Bayer array), the pixel row made up with focus detection pixels 320 disposed along the columnar direction and the pixel row made up with focus detection pixels 330 disposed along the row direction intersect at a pixel position that would normally be occupied by a green pixel 310, so as to enable optimal image data interpolation even at the pixel position at which the focus detection pixel rows intersect. If the focus detection pixel rows were made to intersect at a position that would otherwise be occupied by a red pixel 311 or a blue pixel 312, image data at the intersection position would need to be generated through interpolation executed by adopting a different interpolation method. Furthermore, since interpolation would have to be executed by using the image data at imaging pixels further away from the intersection position, the interpolation accuracy would be lowered, compromising the image quality.

Figure 9:
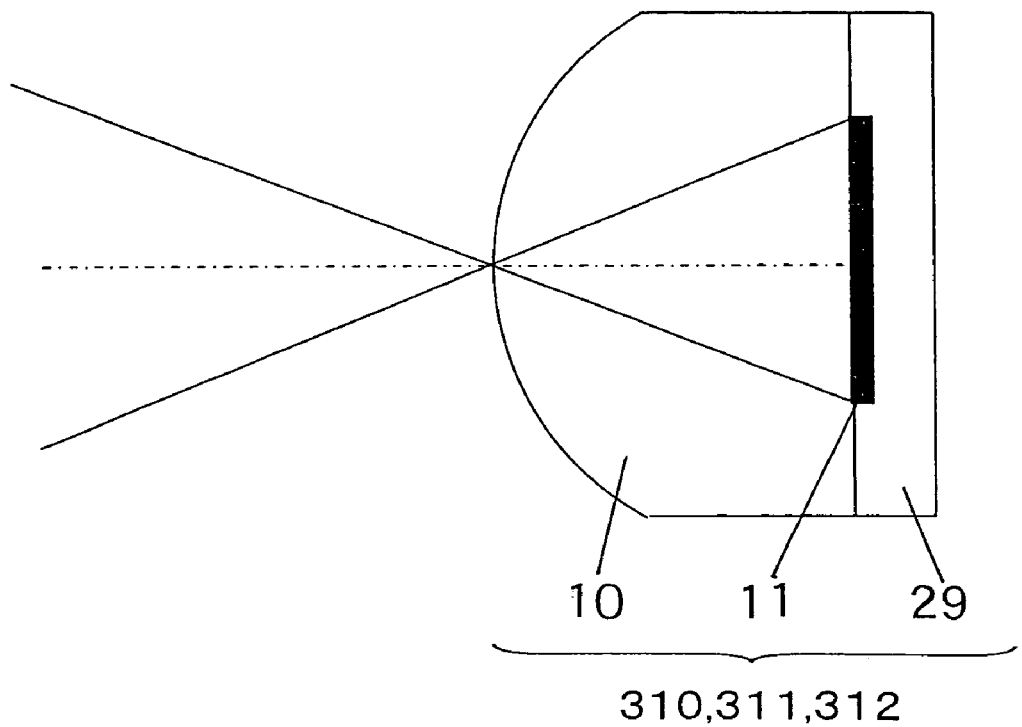

FIG. 9 is a sectional view of an imaging pixel. The microlens 10 is set to the front of the imaging photoelectric conversion unit 11 at each of the imaging pixels 310, 311 and 312 and, as a result, the photoelectric conversion unit 11 is projected frontward via the micro-lens 10. The photoelectric conversion unit 11 is formed on a semiconductor circuit substrate 29. In addition, the color filter (not shown) is disposed between the micro-lens 10 and the photoelectric conversion unit 11.

Figure 10:
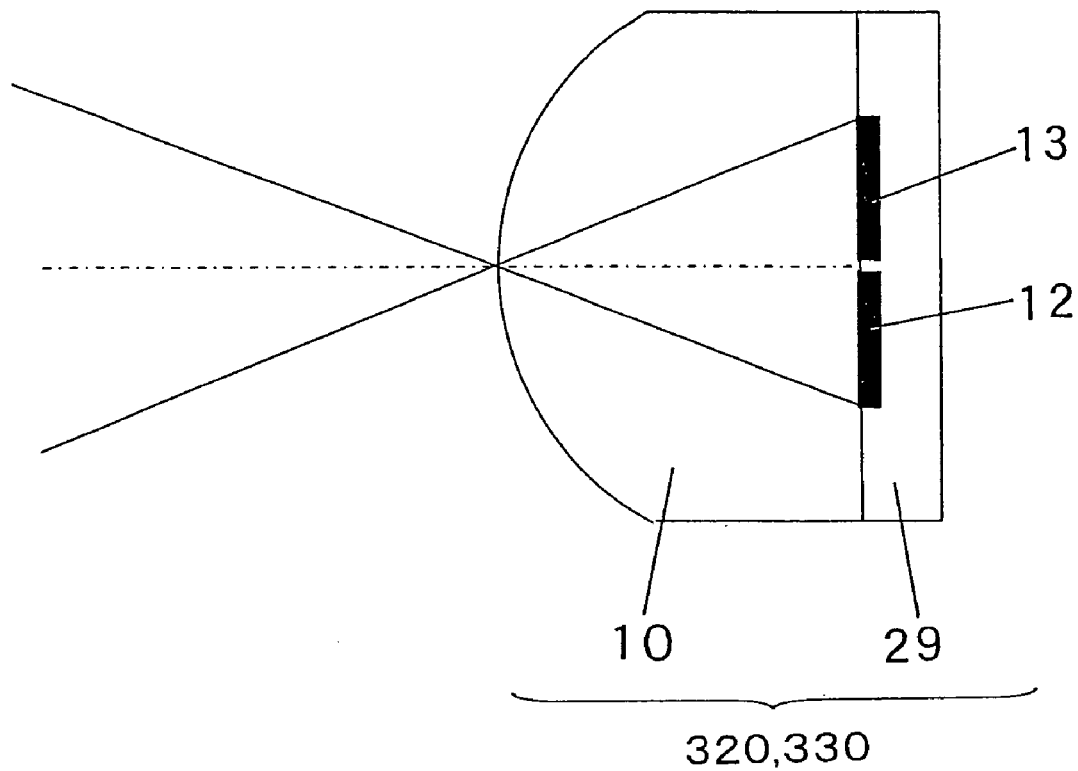

FIG. 10 is a sectional view of a focus detection pixel. The micro-lens 10 is disposed to the front of the focus detection photoelectric conversion units 12 and 13 at each of the focus detection pixels 320 and 330 so as to project the photoelectric conversion units 12 and 13 along the frontward direction via the micro-lens 10. The photoelectric conversion units 12 and 13 are formed on the semiconductor circuit substrate 29.

Figure 11:
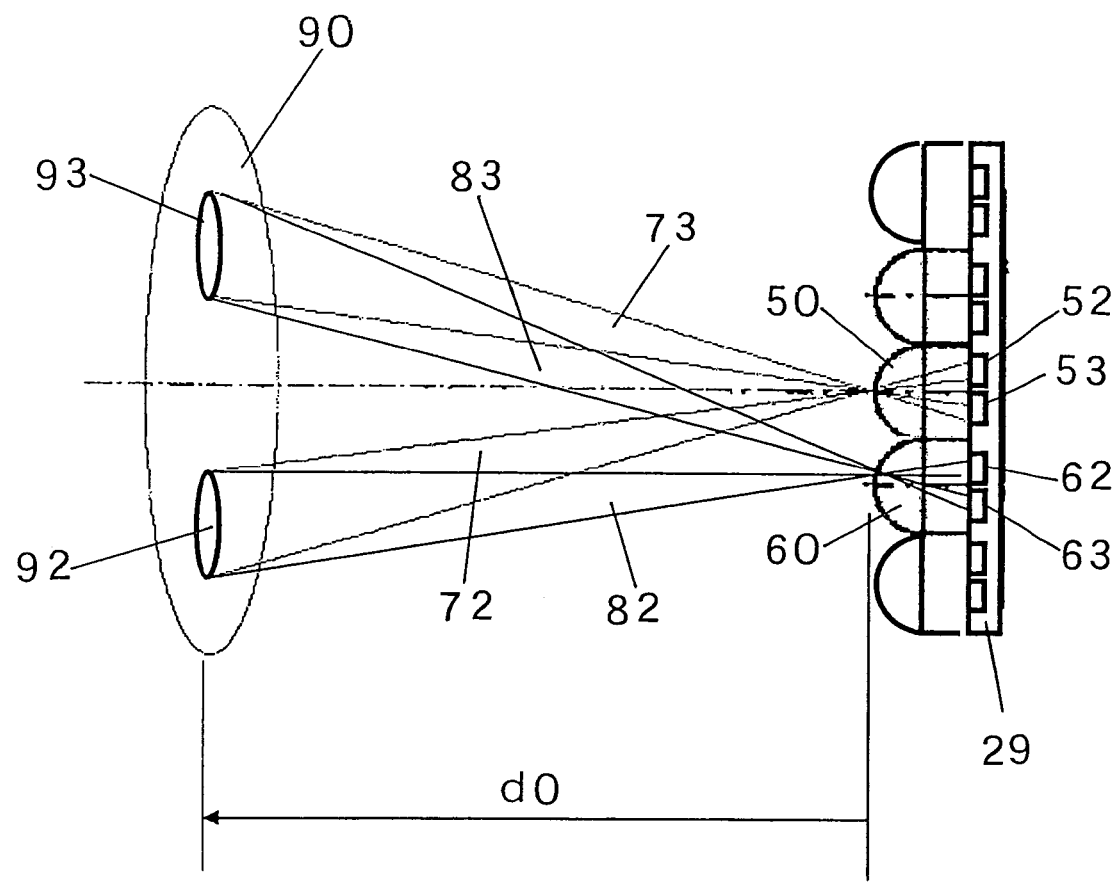

FIG. 11 illustrates focus detection executed via microlenses by adopting a split-pupil method. Reference numeral 90 indicates an exit pupil set over a distance d0 along the frontward direction from the micro-lenses disposed at the predetermined imaging plane of the interchangeable lens. The distance d0 is determined in correspondence to the curvature of the micro-lenses, the refractive index of the microlenses, the distance between the micro-lenses and the photoelectric conversion units and the like, and is referred to as a range-finding pupil distance in the following description. Reference numerals 50 and 60 each indicate a micro-lens, reference numerals 52, 53, 62, 63 indicate pairs of photoelectric conversion units at focus detection pixels and reference numerals 72, 73, 82, 83 indicate focus detection light fluxes. Reference numeral 92 indicates a range defined by the photoelectric conversion units 52 and 62 projected via the micro-lenses 50 and 60 (hereafter referred to as a range-finding pupil). Reference numeral 93 indicates a range defined by the photoelectric conversion units 53 and 63 projected via the micro-lenses 50 and 60 (hereafter referred to as a range-finding pupil).

While FIG. 11 schematically shows the focus detection pixel (constituted with the micro-lens 50 and the pair of photoelectric conversion units 52 and 53) disposed on the optical axis and an adjacent focus detection pixel (constituted with the micro-lens 60 and the pair of photoelectric conversion units 62 and 63), for purposes of simplification, the pairs of photoelectric conversion units of other focus detection pixels present in the periphery of the photographic field further away from the optical axis, too, receive light fluxes arriving at their micro-lenses from the pair of range-finding pupils. The focus detection pixels are arrayed in a direction matching the direction in which the pair of range-finding pupils are set side-by-side, i.e., along the direction in which the photoelectric conversion units in each pair are set side-by-side.

The micro-lenses 50 and 60 are disposed near the predetermined imaging plane of the optical system. The shapes of the pair of photoelectric conversion units 52 and 53 disposed behind the micro-lens 50 are projected via the micro-lens 50 onto the exit pupil 90 set away from the micro-lenses 50 and 60 by the projection distance do, and the projected shapes define the range-finding pupils 92 and 93. The shapes of the pair of photoelectric conversion units 62 and 63 disposed behind the micro-lens 60 are projected via the micro-lens 60 onto the exit pupil 90 set apart by the micro-lenses 50 and 60 by the projection distance do, and the projected shapes define the range-finding pupils 92 and 93. Namely, the directions along which images are projected via the individual pixels are determined so that the projected shapes (range-finding pupils 92 and 93) of the photoelectric conversion units at the various focus detection pixels are aligned on the exit pupil 90 located over the projection distance do. The pair of photoelectric conversion units (52, 53) and the pair of photoelectric conversion units (62, 63) achieve a conjugate relation to the pair of range-finding pupils 92 and 93 via the micro-lenses 50 and 60.

The photoelectric conversion unit 52 outputs a signal corresponding to the intensity of an image formed on the micro-lens 50 with the light flux 72 having passed through the range-finding pupil 92 and having advanced toward the micro-lens 50. The photoelectric conversion unit 53 outputs a signal corresponding to the intensity of an image formed on the micro-lens 50 with the focus detection light flux 73 having passed through the range-finding pupil 93 and having advanced toward the micro-lens 50. The photoelectric conversion unit 62 outputs a signal corresponding to the intensity of an image formed on the micro-lens 60 with the light flux 82 having passed through the range-finding pupil 92 and having advanced toward the micro-lens 60. The photoelectric conversion unit 63 outputs a signal corresponding to the intensity of an image formed on the micro-lens 60 with the focus detection light flux 83 having passed through the range-finding pupil 93 and having advanced toward the micro-lens 60.

By linearly disposing a large number of focus detection pixels each structured as described above and integrating the outputs from the pairs of photoelectric conversion units at the individual focus detection pixels into output groups each corresponding to one of the two range-finding pupils 92 and 93, information related to the intensity distribution of the pair of images formed on the focus detection pixel row with the individual focus detection light fluxes passing through the range-finding pupil 92 and the range-finding pupil 93, is obtained. Image shift detection calculation processing (correlation calculation processing, phase detection processing), to be detailed later, is subsequently executed by using the information thus obtained so as to detect an image shift amount indicating the extent of image shift manifested by the pair of images through the split-pupil phase detection method. Then, by executing a conversion operation on the image shift amount in correspondence to the distance between the gravitational centers of the pair of range-finding pupils, the deviation (defocus amount) of the current imaging plane (the imaging plane on which the image is formed at the focus detection position corresponding to the position assumed by the micro-lens array on the predetermined imaging plane) relative to the predetermined imaging plane is calculated.

It is to be noted that while the explanation is given above by assuming that the range-finding pupils are not restricted by any opening-restricting element at the interchangeable lens, e.g., the aperture opening, the outer rim of the lens, the hood or the like, the range-finding pupils may actually assume the shape and the size determined in correspondence to the opening-restricting element. If such is the case, light fluxes having passed through the limited areas of the range-finding pupils thus restricted are received at the photoelectric conversion units of the focus detection pixels and used at focus detection light fluxes.

Figure 12:
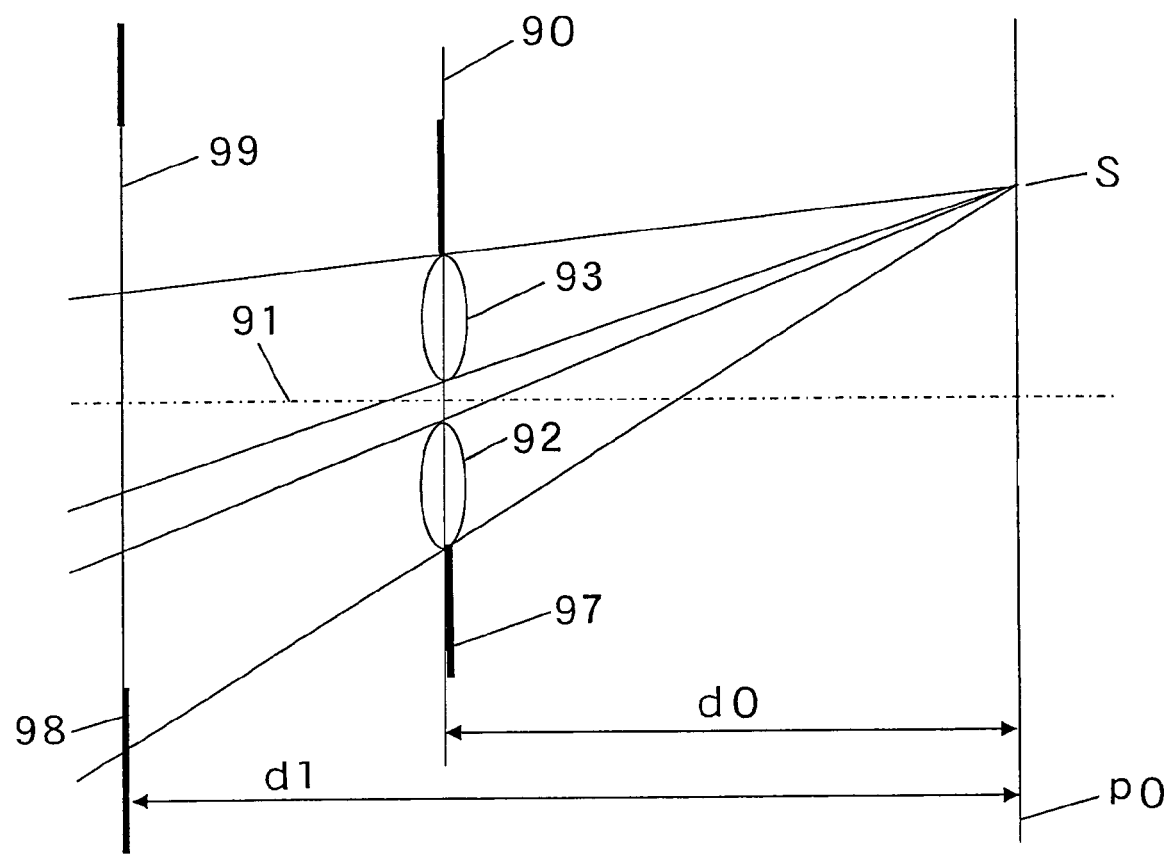

FIG. 12 illustrates how vignetting may occur at the range-finding pupils in the periphery of the photographic field. As shown in FIG. 12, when the focus detection area assumes a position S in the periphery of the filed set at the predetermined focal plane P0, no vignetting occurs at the range-finding pupils 92 and 93 due to an aperture stop 97 at the exit pupil 90. However, the range-finding pupil 92 is vignetted by an opening restricting element 98 present at a plane 99 further away than the exit pupil plane 90. Thus, the light flux passing through an opening over which the opening of the opening restricting element 98, offset along the direction in which the line connecting the field center and the focus detection position S extends, overlaps with the range-finding pupil in correspondence to the distance between the field center and the focus detection position S, is used as the focus detection light flux.

Figure 13:
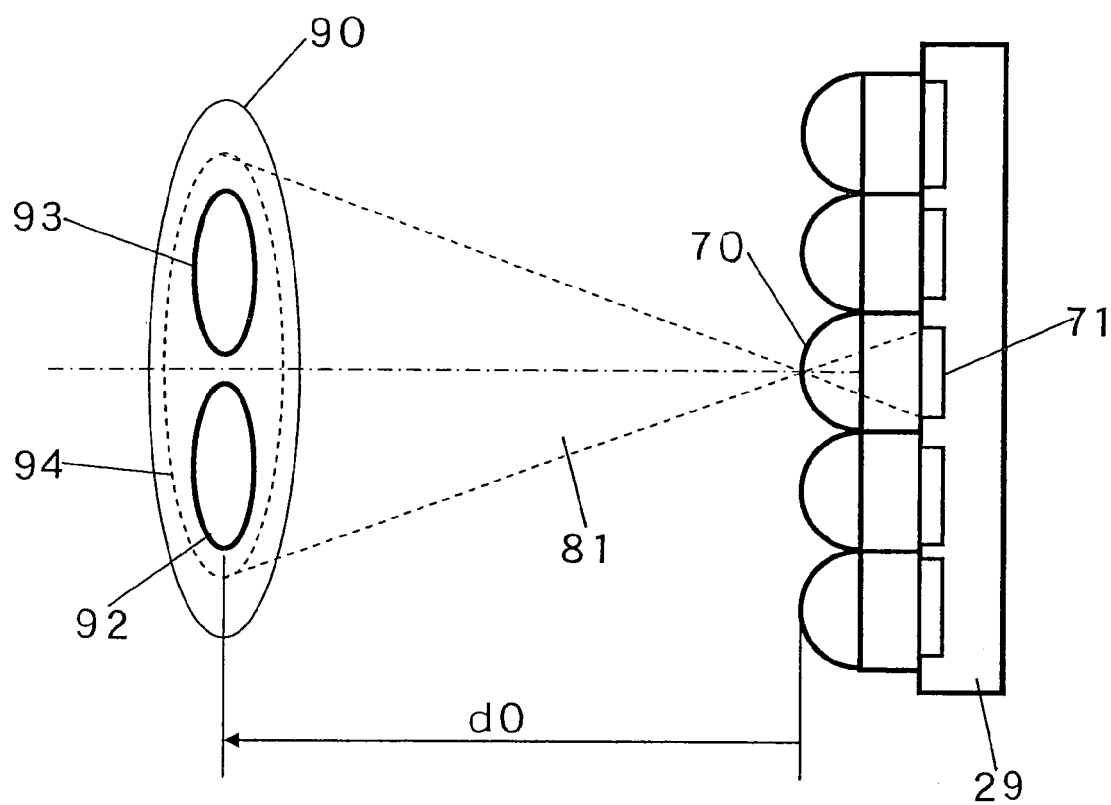

FIG. 13 shows the relationship between the imaging pixels and the exit pupil. It is to be noted that elements similar to those in FIG. 11 are not repeatedly described. Reference numeral 70 indicates a micro-lens, reference numeral 71 indicates a photoelectric conversion unit of an imaging pixel, reference numeral 81 indicates an imaging light flux and reference numeral 94 indicates the range defined by the photoelectric conversion unit 71 projected via the micro-lens 70. While FIG. 13 schematically illustrates the imaging pixel (constituted with the micro-lens 70 and the photoelectric conversion unit 71) set on the optical axis, the photoelectric conversion units of other imaging pixels, too, individually receive light fluxes advancing toward their micro-lenses from the area 94.

Via the micro-lens 70, disposed near the predetermined imaging plane of the optical system, the photoelectric conversion unit 71 disposed rearward relative to the micro-lens 70 is projected onto the exit pupil 90 set away from the micro-lens 70 by the projection distance d0 and the shape of the projected unit defines the area 94. The photoelectric conversion unit 71 outputs a signal corresponding to the intensity of an image formed on the micro-lens 70 with the focus detection light flux 81 having passed through the area 94 and advanced to the micro-lens 70. By disposing a great many of such imaging pixels in a two-dimensional array, image information is obtained via the photoelectric conversion units in the individual pixels. It is to be noted that while the explanation is given above by assuming that the range-finding pupils are not restricted by any opening restricting element (the aperture stop, the outer rim of the lens, the lens hood or the like) at the interchangeable lens, light fluxes having passed through the limited areas of the restricted range-finding pupils are received at the photoelectric conversion units of the focus detection pixels as focus detection light fluxes if the range-finding pupils are restricted by any opening restricting element in the interchangeable lens.

Figure 14:
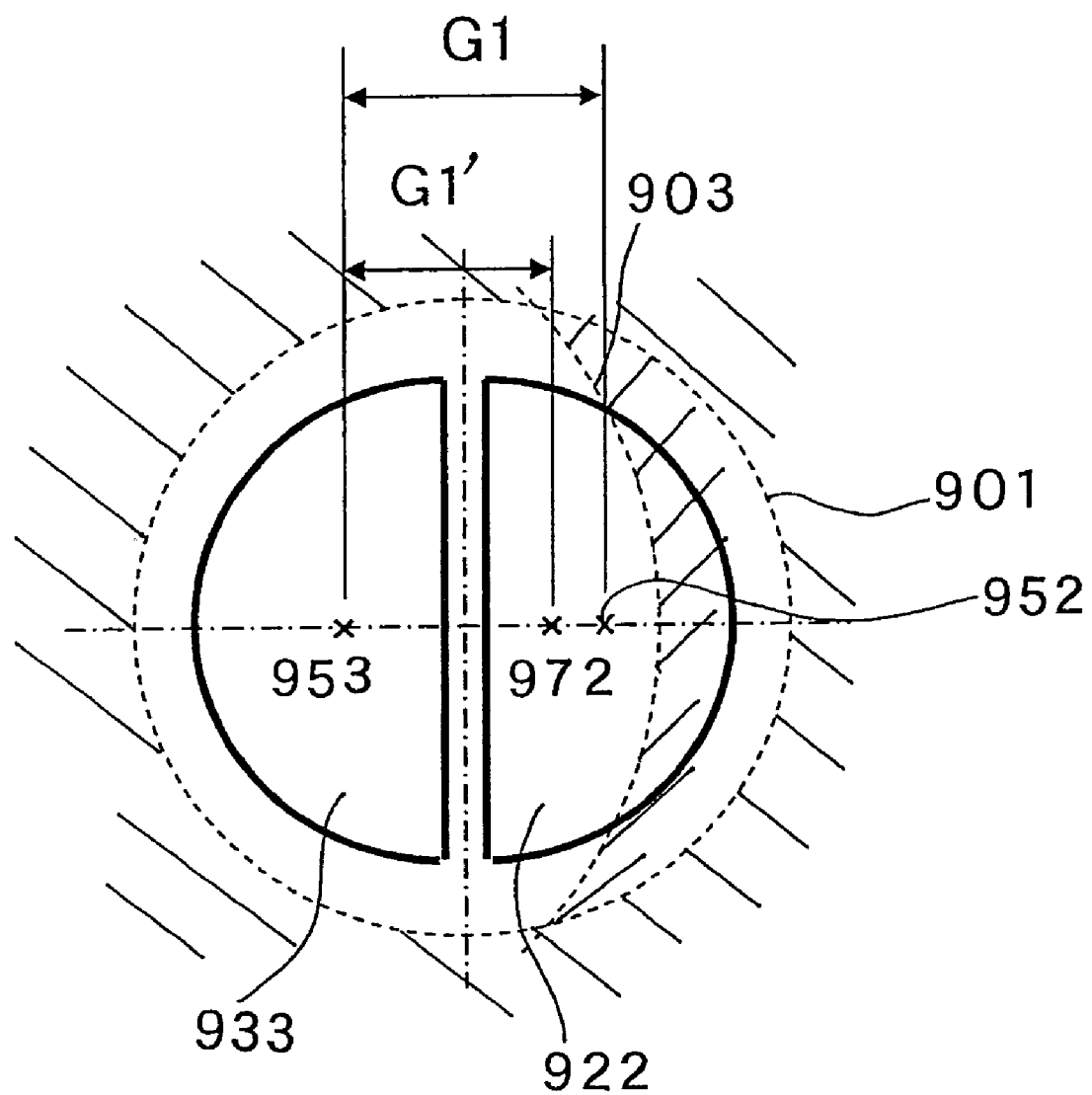
Figure 15:
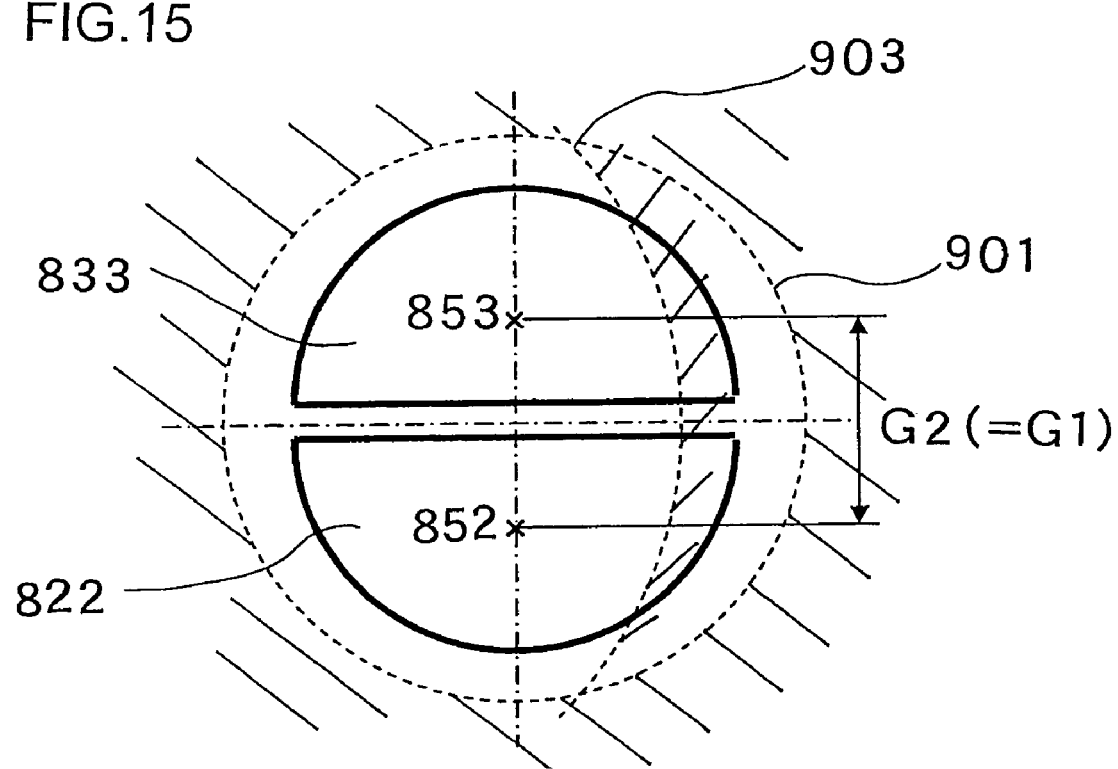

FIGS. 14 and 15 are front views each showing range-finding pupils formed on the exit pupil plane. In FIG. 14, a circle circumscribing the range-finding pupils 922 and 933 defined by the pair of photoelectric conversion units of a focus detection pixel 330 (see FIG. 5) projected onto the exit pupil plane 90 via the micro-lens, viewed from the image plane, assumes a specific F number (referred to as a range-finding pupil F number F2.8 in this example). An area 901 outlined with the dotted line is an area corresponding to an aperture value greater than the aperture F-number 2.8 (e.g., F2), and contains therein the range-finding pupils 922 and 933. The distance between gravitational centers 952 and 953 of the light fluxes (focus detection light fluxes) passing through the range-finding pupils 922 and 933, measured along the direction in which the range-finding pupils 922 and 933 are set side-by-side (along the horizontal direction in the figure), is G1.

When vignetting of a focus detection light flux such as that shown in FIG. 12 occurs (the range-finding position S corresponds to the position 105 in FIG. 2), the opening formed via the opening restricting member is offset along the horizontal direction relative to the range-finding pupil and is made to overlap with the range-finding pupil (an area 903 indicates part of the opening restriction). In this state, the range-finding pupil 922 is vignetted by the area 903 and the gravitational center 972 of the light flux (focus detection light flux) passing through the range-finding pupil 922 restricted by the area 903 is closer to the center (the center of the circle circumscribing the range-finding pupils 922 and 933) than the gravitational center 952 of the light flux that is not vignetted. The range-finding pupil 933, on the other hand, is not vignetted by the area 903 and thus, the position of the gravitational center 953 of the light flux (focus detection light flux) passing through the range-finding pupil 933 remains the same. As a result, the range-finding pupil gravitational centers 972 and 953 are set away from each other by a smaller gravitational center distance G1' than the gravitational center distance G1 setting apart the range-finding pupil gravitational centers when no vignetting occurs.

In FIG. 15, a circle circumscribing the range-finding pupils 822 and 833 defined by the pair of photoelectric conversion units of a focus detection pixel 320 (see FIG. 5; the focus detection pixel 320 is oriented by rotating a focus detection pixel 330 by 90°) projected onto the exit pupil plane 90 via the micro-lens, viewed from the image plane, assumes a specific F number (referred to as a range-finding pupil F number F2.8 in this example). An area 901 outlined with the dotted line is an area corresponding to an aperture value greater than the aperture F-number 2.8 (e.g., F2), and contains therein the range-finding pupils 822 and 833. The distance between the gravitational centers 852 and 853 of the light fluxes (focus detection light fluxes) passing through the range-finding pupils 822 and 833, measured along the direction in which the range-finding pupils 822 and 833 are set side-by-side (along the vertical direction in the figure), is G2 (=G1).

When vignetting of a focus detection light flux such as that shown in FIG. 12 occurs (the range-finding position S corresponds to the position 105 in FIG. 2), the opening formed via the opening restricting member is offset along the horizontal direction relative to the range-finding pupils and is made to overlap with a range-finding pupil (an area 903 indicates part of the opening restriction). While the right end portions of the range-finding pupils 822 and 833 are vignetted by the area 903 in this state, the vignetting occurs in symmetry at the range-finding pupils 822 and 833 and thus, the positions of the gravitational centers 852 and 853 of the range-finding pupils 822 and 833 do not change on account of the area 903. Thus, the distance G2 between the gravitational centers 852 and 853 of the light fluxes (focus detection light fluxes) passing through the range-finding pupils 822 and 833 remains unchanged as well.

There is a general tendency whereby when the focus detection area ranges in the periphery of the field and the pair of range-finding pupils are set side-by-side along the direction matching the direction of the focus detection area relative to the field center (hereafter referred to as a "radial direction"), focus detection light flux vignetting occurs asymmetrically relative to the range-finding pupils to result in complex changes in the distance between the gravitational centers of the range-finding pupils, which, in turn, lowers the accuracy with which the image shift amount is converted to a defocus amount and disrupts the balance of the quantities of focus detection light received at the pair of photoelectric conversion units. Since this leads to reduced uniformity between the pair of images, the image shift detection accuracy decreases and ultimately, the focus detection accuracy is compromised.

When the pair of range-finding pupils are set side-by-side along the direction perpendicular to the "radial direction" extending from the field center toward the focus detection area position, i.e., along the tangential direction (hereafter referred to as a "circumferential direction") in which the tangential line of a concentric circle centered on the field center extends, focus detection light flux vignetting occurs symmetrically relative to the pair of range-finding pupils. As a result, no change occurs in the distance between the gravitational centers of the range-finding pupils, allowing a high level of accuracy to be maintained when converting the image shift amount to the defocus amount and sustaining the quantities of the focus detection light received at the pair of photoelectric conversion units in balance. Since uniformity between the pair of images is thus sustained, the image shift detection accuracy is maintained at a high level and the ultimate focus detection accuracy, too, is maintained at a high level.

In the positional arrangement assumed in conjunction with the focus detection pixels in FIG. 3, a focus detection pixel 320 with the corresponding range-finding pupils set side-by-side along the "circumferential direction" is disposed at a pixel position where the pixel row made up with the focus detection pixels 320 with the corresponding pair of range-finding pupils set side-by-side along the "circumferential direction" intersects with the pixel row made up with focus detection pixels 330 with the corresponding pair of range-finding pupils set side-by-side along the "radial direction" so as to ensure that the continuity in the focus detection pixel row assuring a high level of focus detection performance even in the event of vignetting is sustained. Consequently, a desirable level of focus detection performance is assured even if vignetting occurs.

Figure 16:
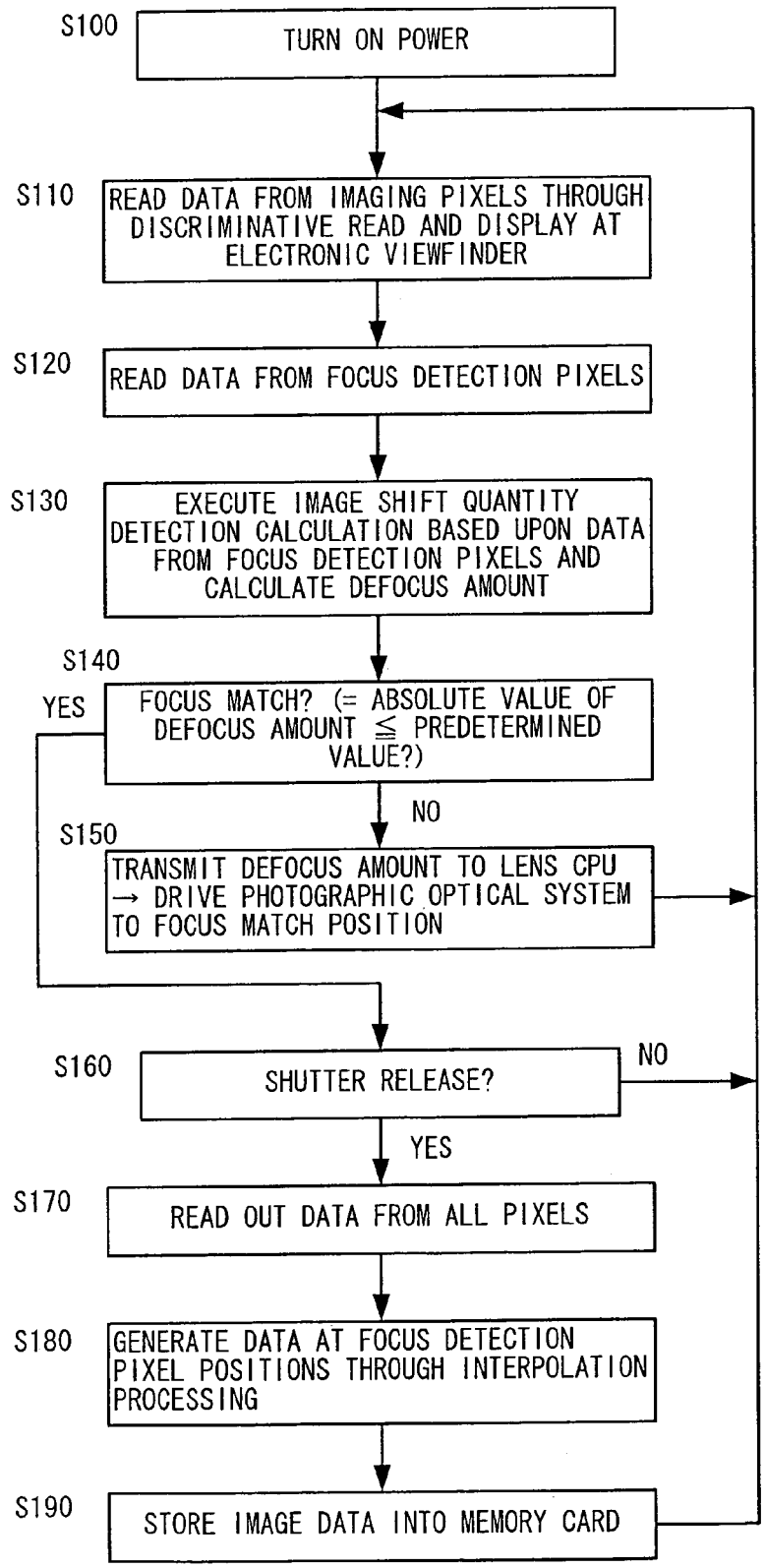
Figure 17:
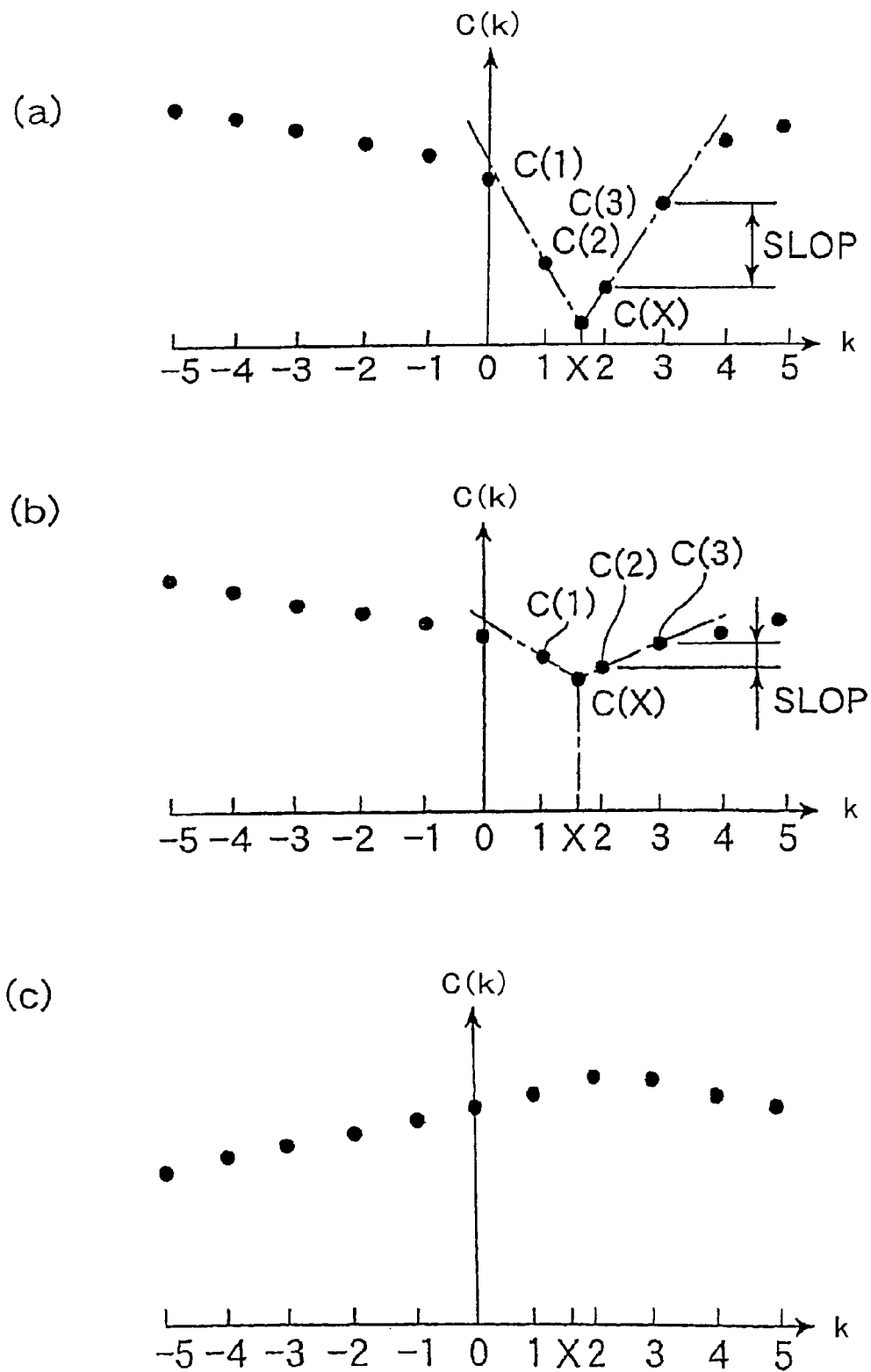

FIG. 16 presents a flowchart of the operation executed in the digital still camera (imaging apparatus) shown in FIG. 1. As power to the camera is turned on in step 100, the body drive control device 214 proceeds to step 110 to start an imaging operation. In step 110, aperture control information corresponding to a photographic aperture value automatically determined in correspondence to the photographic field brightness measured via a photometering device (not shown in FIG. 1) or corresponding to a photographic aperture value manually selected by the user via an operating member (not shown in FIG. 1) is provided to the lens drive control device 206. In response, the aperture opening diameter is set to match the photographic aperture value, data from imaging pixels are read out through a discriminative read or culling at this aperture opening diameter and the data thus read are brought up on display at the electronic viewfinder.

In step 120, data are read out from the focus detection pixel rows while the aperture opening diameter is sustained at the photographic aperture value. In step 130, an image shift amount is calculated through the image shift detection calculation processing (correlation operation processing) to be detailed later, which is executed based upon the two sets of image data corresponding to each focus detection pixel row and a defocus amount is calculated. In step 140, a decision is made as to whether or not the current condition is close to the focus match state, i.e., whether or not the absolute value of the defocus amount having been calculated is equal to or less than a predetermined value. If it is decided that the current condition is not close to the focus match state, the operation proceeds to step 150 to transmit the defocus amount to the lens drive control device 206 and drive the focusing lens 210 in the interchangeable lens 202 to the focus match position. Subsequently, the operation returns to step 110 to repeatedly execute the operation described above.

It is to be noted that the operation also proceeds to step 150 if focus detection cannot be executed. In this case, a scan-drive instruction is transmitted to the lens drive control device 206 so as to drive the focusing lens 210 in the interchangeable lens 202 to scan over the range between infinity and maximum close-up. The operation then returns to step 110 to repeatedly execute the operation described above.

If, on the other hand, it is decided that the current condition is close to the focus match state, the operation proceeds to step 160 to make a decision as to whether or not a shutter release has occurred in response to an operation at a shutter release means (not shown). If it is decided that a shutter release has not occurred, the operation returns to step 110 to repeatedly execute the operation described above. If it is decided that a shutter release has occurred, the aperture control information is transmitted to the lens drive control device 206 and, as a result, the aperture value is adjusted to the photographic aperture value at the interchangeable lens 202. Once the aperture control ends, the image sensor 212 is engaged in imaging operation and image data are read out from the imaging pixels and all the focus detection pixels in the image sensor 212.

In step 180, image data at each pixel position in the focus detection pixel row are generated through interpolation based upon the data at surrounding imaging pixels. In the following step 190, image data constituted with the data from the imaging pixels and the interpolated data are saved into the memory card 219 and then the operation returns to step 110 to execute the operation described above.

The image shift amount detection and the defocus amount calculation executed in step 130 in FIG. 16 are now explained in detail. High-frequency cut filter processing such as that expressed in (1) below is executed on a pair of data strings ($\alpha_1 \sim \alpha_M$ and $\beta_1 \sim \beta_M$: M indicates the number of sets of data) output from the focus detection pixel row, so as to generate a first data string and a second data string ($A_1 \sim A_N$ and $B_1 \sim B_N$), from which a noise component or a high-frequency component that would adversely affect the correlation processing has been eliminated. $\alpha_1 \sim \alpha_M$ are equivalent to the image data expressing the images formed with the focus detection light fluxes having passed through the range-finding pupil 92 in FIG. 11. In addition, $\beta_1 .. \beta_M$ are equivalent to the image data expressing the image formed with the focus detection light fluxes having passed through the range-finding pupil 93. It is to be noted that the high-frequency cut filter processing may be skipped if the arithmetic operation needs to be completed faster or if the extent of defocusing is already significant and thus it is obvious that only a very small high-frequency component is present.

$$A_n = \alpha_n + 2 \cdot \alpha_{n+1} + \alpha_{n+2},$$

$$B_n = \beta_n + 2 \cdot \beta_{n+1} + \beta_{n+2} \quad (1)$$

In expression (1) above, n=1~N. The correlation quantity C(k) is calculated by executing the correlation operation expressed in (2) on the data strings $A_n$ and $B_n$.

$$C(k) = \Sigma |A_n \cdot B_{n+1+k} - B_{n+k} \cdot A_{n+1}| \quad (2)$$

In expression (2), the $\Sigma$ operation is cumulatively executed with regard to n. The range assumed for n is limited to the range over which the data $A_n$, $A_{n+1}$, $B_{n+k}$ and $B_{n+1+k}$ exist in correspondence to the shift quantity k. In addition, the shift quantity k is an integer which represents a relative shift quantity assuming a value taken in units matching the data interval with which the data in the data strings are sampled.

The results of the arithmetic operation executed as expressed in (2) indicate that the correlation quantity C(k) assumes the smallest value (the smaller the value, the higher the correlation level) at the shift quantity at which the pair of sets of data achieve a high level of correlation (when k=kj=2 in FIG. 17(a)). The shift quantity x, which gives the smallest value C(x) in the continuous correlation quantity graph, is determined by adopting a three-point interpolation method expressed in (3)~(6) below.

$$x=kj+D/SLOP \quad (3)$$

$$C(x)=C(kj)-|D| \quad (4)$$

$$D=\{C(kj-1)-C(kj+1)\}/2 \quad (5)$$

$$SLOP=MAX\{C(kj+1)-C(kj),C(kj-1)-C(kj)\} \quad (6)$$

The judgment as to whether or not the shift quantity x calculated as expressed in (3) is reliable is made as follows. As shown in FIG. 17(b), the interpolated minimum value C(x) of the correlation quantity increases when the level of correlation between the pair of sets of data is low. Accordingly, if C(x) is equal to or greater than a predetermined threshold value, the shift quantity is judged to be less reliable and the calculated shift quantity x is canceled. Alternatively, C(x) may be standardized with regard to the data contrast, and in such a case, if the value obtained by dividing C(x) by SLOP indicating a value in proportion to the contrast is equal to or greater than a predetermined value, the calculated shift quantity should be judged to be not reliable and accordingly, the calculated shift quantity x should be canceled. As a further alternative, if SLOP taking on the value in proportion to the contrast is equal to or less than a predetermined value, the subject is judged to be a low-contrast subject and, accordingly, the reliability of the calculated shift quantity should be judged to be low and the calculated shift quantity x should be canceled.

If the level of correlation between the pair of sets of data is low and the correlation quantity C(k) does not dip at all over the shift range kmin to kmax, as shown in FIG. 17(c), the minimum value C(x) cannot be determined. In this case, it is decided that focus detection cannot be executed.

The following expression may be used in the correlation operation instead of expression (2).

$$C(k)=\Sigma|A_n/A_{n+1}-B_{n+k}/B_{n+1+k}| \quad (7)$$

In expression (7), the Σ operation is cumulatively executed with regard to n. The range assumed for n is limited to the range over which the data $A_n$, $A_{n+1}$, $B_{n+k}$ and $B_{n+1+k}$ exist in correspondence to the shift quantity k. It is to be noted that the correlation operation expression that may be used is not limited to expression (2) or expression (7).

If it is decided that the shift quantity x having been calculated is reliable, the defocus amount DEF indicating the extent of defocusing of the subject image plane relative to the predetermined imaging plane can be determined as expressed in (8) below.

$$DEF=KX\cdot PY\cdot x \quad (8)$$

In expression (8), PY indicates the detection pitch (the pitch at which the focus detection pixels are disposed) and KX indicates a conversion coefficient the value of which is determined in correspondence to the opening angle (determined in correspondence to the distance between the range-finding pupil gravitational centers and the range-finding pupil distance) formed by the gravitational centers of the light fluxes passing through the pair of range-finding pupils.

Through the image shift detection calculation processing described above, defocus amounts are calculated each in correspondence to the pixel row made up with the focus detection pixels 320 with the corresponding focus detection pupils set side-by-side along the "circumferential direction" or the pixel row made up with the focus detection pixels 330 with the corresponding pair of range-finding pupils set side-by-side along the "radial direction". If it is judged that focus detection is not possible at either pixel row, the detection is judged to be disabled. If, on the other hand, detection is judged to be possible at one of the pixel rows, the defocus amount calculated in correspondence to the detection-enabled pattern is designated as the ultimate defocus amount.

If detection is judged to be enabled both the pixel rows, the ultimate defocus amount is calculated by averaging the two defocus amounts. Alternatively, the defocus amount calculated for the focus detection pixel row with the corresponding pair of range-finding pupils set side-by-side along the direction ensuring a high level of focus detection performance even in the event of vignetting, i.e., the defocus amount calculated for the pixel row made up with focus detection pixels 320 with the corresponding pair of range-finding pupils set side-by-side along the "circumferential direction", is designated as the ultimate defocus amount.

(Variations of the Embodiment)

Figure 18:
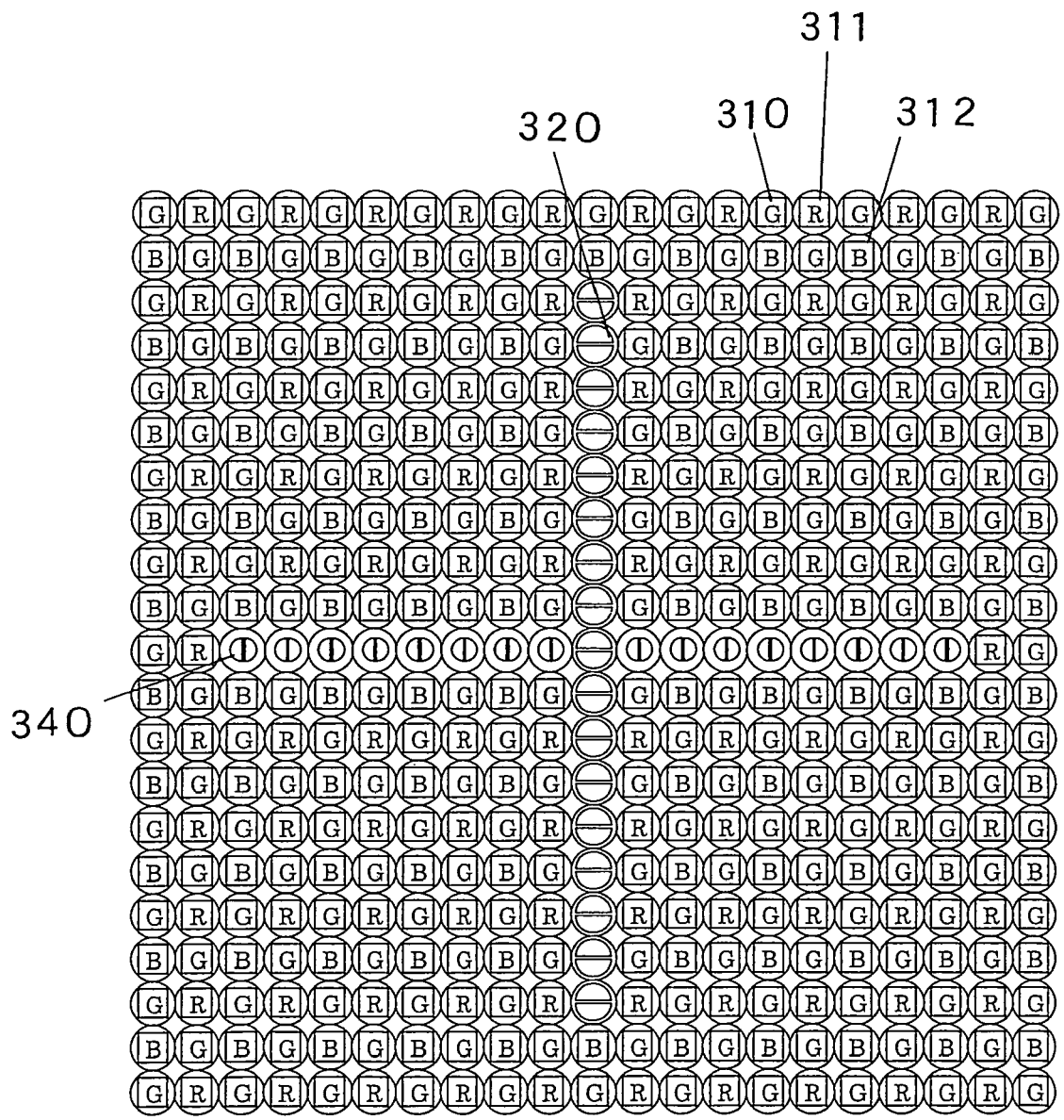

FIG. 18 is a front view showing in detail the structure adopted in an image sensor 212A achieved in a variation. It differs from the image sensor 212 shown in FIG. 3 in that the pixel row made up with the focus detection pixels 330 with the corresponding pair of range-finding pupils set side-by-side along the radial direction extending from the field center toward the focus detection area position in FIG. 3 is replaced with a pixel row made up with focus detection pixels 340 with smaller range-finding pupils (with a higher range-finding F-number) and the pair of range-finding pupils set side-by-side along the radial direction extending from the field center toward the focus detection area position.

Figure 19:
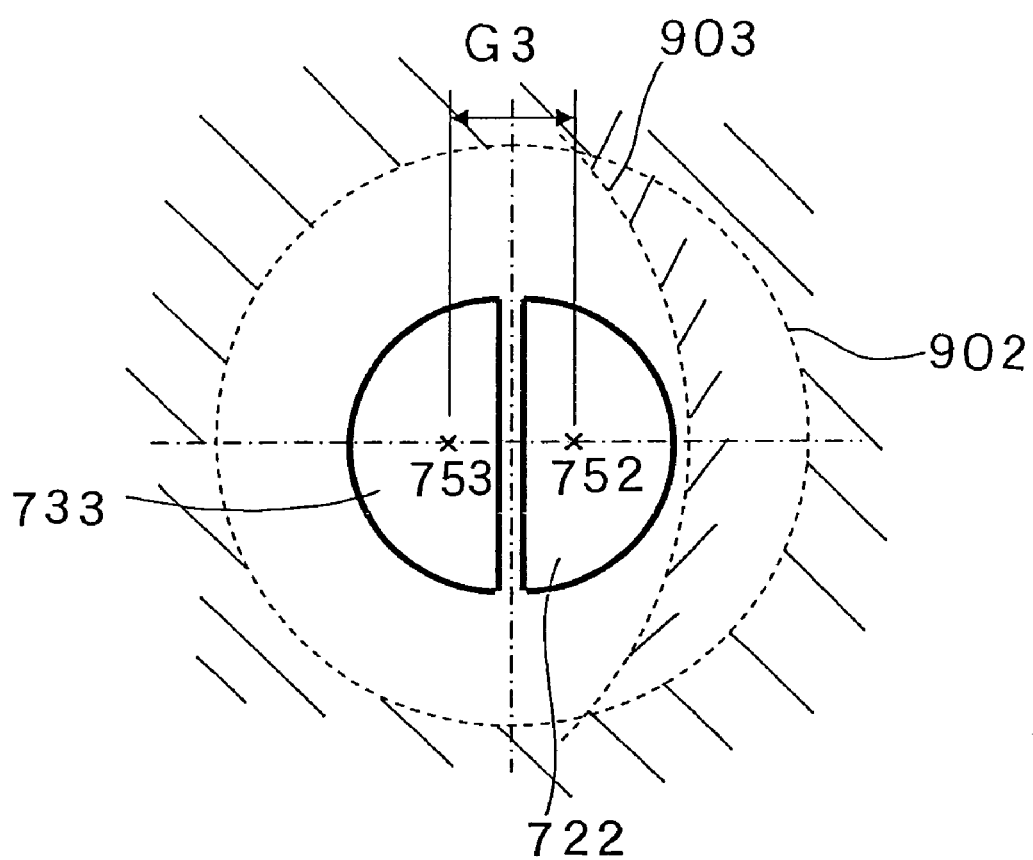

FIG. 19 is a front view of the range-finding pupils at the exit pupil plane, corresponding to the focus detection pixels 340. In FIG. 19, a circle circumscribing range-finding pupils 722 and 733 defined by the pair of photoelectric conversion units of a focus detection pixel 340 projected onto the exit pupil plane 90 via the micro-lens, viewed from the imaging plane, assumes a specific F number (referred to as a range-finding pupil F number F5.6 in this example). An area 902 outlined with the dotted line is an area corresponding to an aperture value greater than the aperture F-number 2.8 (e.g., F2), and contains therein the range-finding pupils 722 and 733. The distance between the gravitational centers 752 and 753 of the light fluxes (focus detection light fluxes) passing through the range-finding pupils 722 and 733, measured along the direction in which the range-finding pupils 722 and 733 are set side-by-side (along the horizontal direction in the figure), is G3. Even in the event of light fluxes vignetting occurring due to an opening restriction such as that shown in FIG. 19, the range-finding pupils 922 and 933 are not vignetted by an area 903 and thus the positions of the gravitational centers 752 and 753 remain unchanged since a large value is assumed for the range-finding F-number.

When a large F-number is taken for the range-finding pupils, focus detection light flux vignetting does not occur readily even if a pixel row made up with focus detection pixels 330 with the corresponding pair of range-finding pupils set side-by-side along the direction in which the line connecting the focus detection area position and the field center extends (radial direction) is disposed in the periphery of the field. This means that the distance between the gravitational centers of the range-finding pupils remains unchanged, making it possible to sustain a high level of accuracy with which the image shift amount is converted to the defocus amount. In addition, since the quantities of focus detection light received at the pairs of photoelectric conversion units remain in balance, the uniformity between the pair of images is sustained, allowing the image shift detection to be accurately executed and ultimately allowing the focus detection to be accurately executed.

FIG. 18 shows the focus detection pixels 320 used in focus detection disposed in a dense linear pattern with no gap between the individual focus detection pixels occupying part of a pattern where green pixels 310 and blue pixels 312, i.e., imaging pixels, would otherwise be disposed. The focus detection pixels 340 used in focus detection are disposed in a dense linear pattern with no gap between the individual focus detection pixels, occupying part of a row where green pixels 310 and red pixels 311, i.e., imaging pixels, would otherwise be disposed. A focus detection pixel 320 is disposed at the pixel position at which the pixel row made up with the focus detection pixels 320 and the pixel row made up with the focus detection pixels 340 intersect.

Image data at a position that would otherwise be occupied by a blue imaging pixel 312 but is actually occupied by a focus detection pixel 320 are generated through interpolation by averaging the image data at the blue pixel 312 present to the right of the focus detection pixel 320 across the green pixel 310 directly adjacent to the focus detection pixel 320 and the image data at the blue pixel 312 present to the left of the focus detection pixel 320 across the green pixel 312 directly adjacent to the focus detection pixel 320. In addition, image data at a position that would otherwise be occupied by a green imaging pixel 310 but is actually occupied by a focus detection pixel 320 are generated through interpolation by averaging the image data at the four green pixels 310 present next to the focus detection pixel 320 along the 45° diagonal directions, assuming the upper right position, the lower right position, the upper left position and the lower left position relative to the focus detection pixel 320.

Image data at a position that would otherwise be occupied by a red imaging pixel 311 but is actually occupied by a focus detection pixel 340, are generated through interpolation by averaging the image data at the red pixel 311 present above the focus detection pixel 340 across the green pixel 310 directly above the focus detection pixel 340 and the image data at the red pixel 311 present below the focus detection pixel 340 across the green pixel 310 directly below the focus detection pixel 340. Image data at a position that would otherwise be occupied by a green imaging pixel 310 but is actually occupied by a focus detection pixel 340 are generated through interpolation by averaging the image data at the four green pixels 310 present next to the focus detection pixel 340 along the 45° diagonal directions, assuming the upper right position, the lower right position, the upper left position and the lower left position relative to the focus detection pixel 340.

In addition to the advantages of the structure shown in FIG. 3, the positional arrangement assumed for the focus detection pixels shown in FIG. 18, with the focus detection pixel row with a large range-finding F-number set along the direction (radial direction), in which the line connecting the focus detection area position and the field center plane extends and vignetting tends to occur readily in the focus detection area set in the periphery of the field, assures accurate focus detection along directions even when light flux vignetting occurs due to various opening restricting elements in the optical system.

Figure 20:
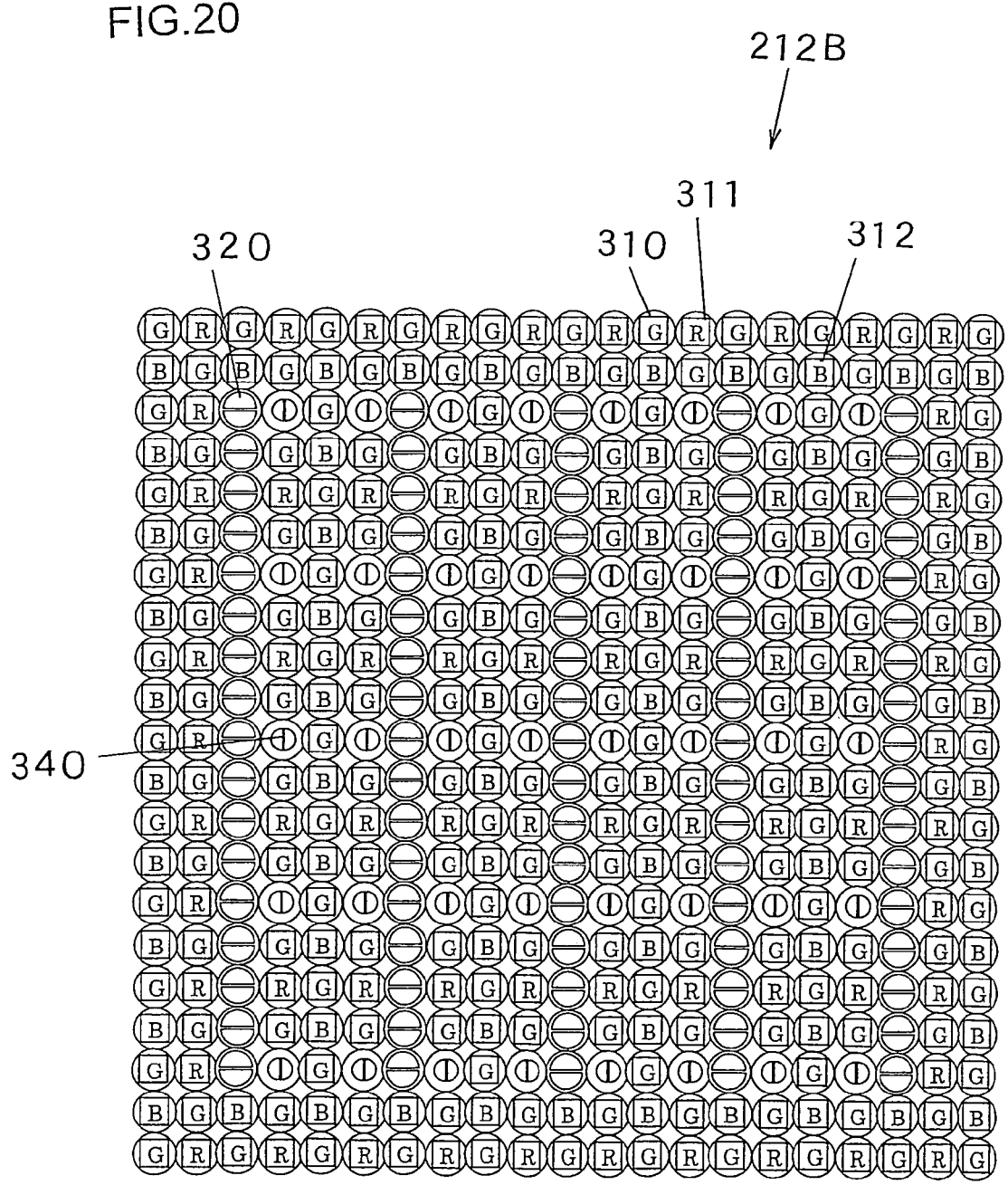

FIG. 20 is a front view showing in detail the structure adopted in an image sensor 212B achieved in a variation. It differs from the image sensor 212A shown in FIG. 18 in that a greater pixel pitch (with each focus detection pixel disposed after a single pixel interval) is assumed in the pixel row made up with focus detection pixels 340 with the corresponding pair of range-finding pupils set side-by-side along the direction in which the line connecting the focus detection area position and the field center extends (radial direction) and that a single focus detection area includes a plurality of pixel rows each made up with focus detection pixels 320 with the corresponding pair of range-finding pupils set side-by-side along the "circumferential direction" and a plurality of pixel rows each made up with focus detection pixels 340 with the corresponding pair of range-finding pupils set side-by-side along the radial direction extending from the field center toward the focus detection area position.

A greater pixel pitch is assumed in the focus detection pixel rows ranging along one direction than that assumed in the focus detection pixel rows ranging along the other direction and thus, a focus detection pixel in a focus detection pixel row assuming the smaller pixel pitch is set at the pixel position at which focus detection pixel rows intersect. At the same time, the focus detection pixel rows with the greater pixel pitch are allowed to extend without their pixel row continuity being disrupted at the intersection positions. Thus, a high-level of focus detection performance is assured along the two directions. In addition, since a greater pixel pitch is assumed for the focus detection pixel rows ranging along one direction than that assumed in the focus detection pixel rows ranging along the other direction, the pixel positions at which image data must be generated through interpolation are distributed with less density, which, in turn, improves the image data quality. Furthermore, since a plurality of focus detection pixel rows extending along one direction are set side-by-side and a plurality of focus detection pixel rows extending along another direction are set side-by-side within a single focus detection area, the subject image can be captured with a higher level of reliability and the focus detection performance also improves.

Figure 21:
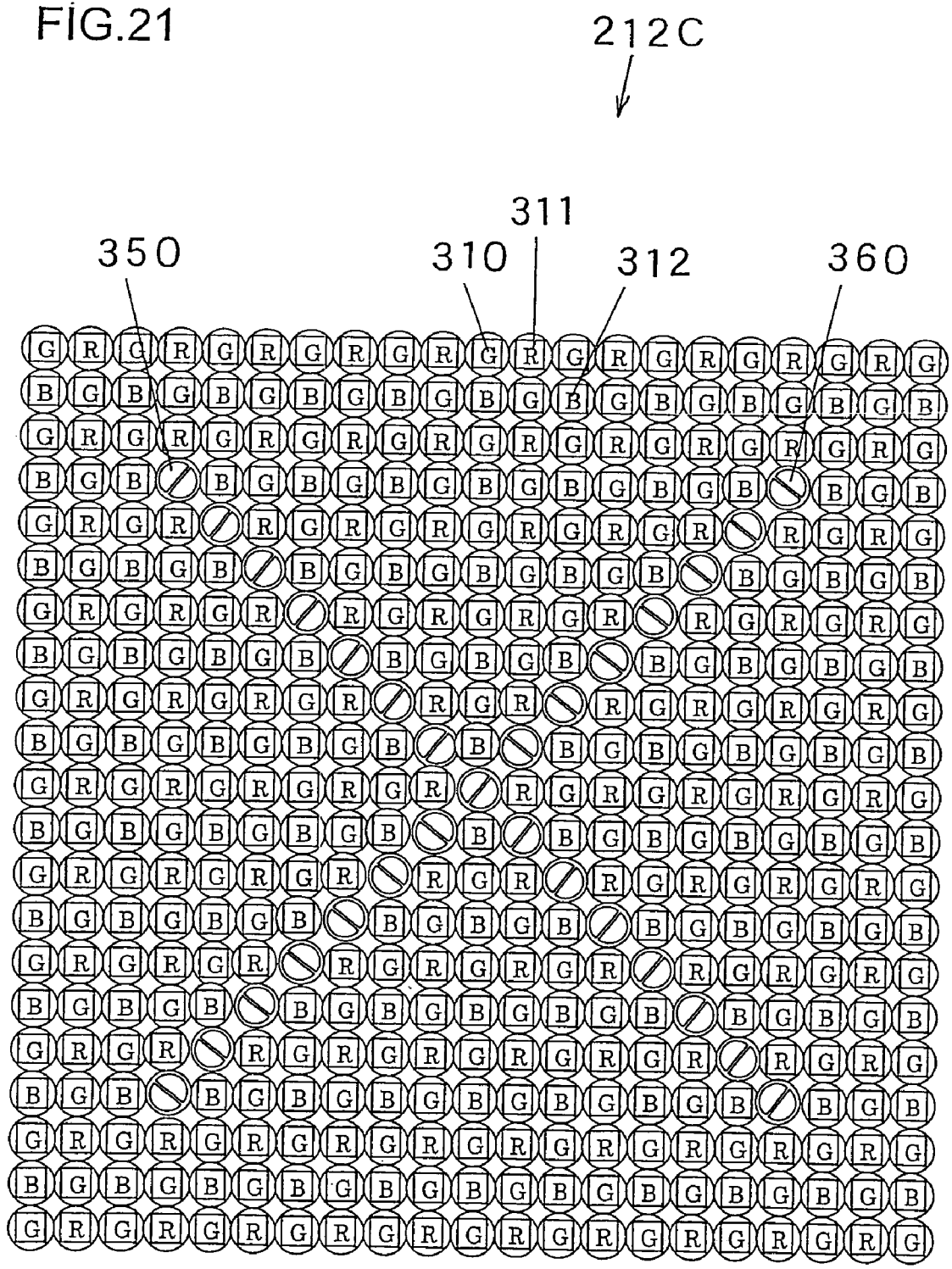

FIG. 21 is a front view showing in detail the structure adopted in an image sensor 212C achieved in a variation. It differs from the image sensor 212 in FIG. 3 in that the focus detection pixel row extending along the horizontal direction and the focus detection pixel row extending along the vertical direction, intersecting each other to form a cross shape in FIG. 3, are rotated by 45°. Thus, a focus detection pixel row leaning forward at a 45° angle along the diagonal direction and a focus detection pixel row leaning rearward at a 45° angle along the diagonal direction intersect in a cross shape. Focus detection pixels 350 and 360 are respectively oriented by rotating a focus detection pixel 320 (see FIG. 5) by ±45°. The focus detection pixels 350 and 360 used in focus detection are disposed in a dense linear arrangement occupying part of the ±45° diagonal linear ranges where green imaging pixels 310 (see FIG. 4) would otherwise be disposed. A focus detection pixel 350 is disposed at the pixel position at which the pixel row made up with the focus detection pixels 350 and the pixel row made up with the focus detection pixels 360 intersect.

Image data at a position occupied by a focus detection pixel 350 that would otherwise be occupied by a green pixel 310 are generated through interpolation by averaging the image data at the two green pixels 310 present next to the focus detection pixel 350, one present diagonally above the focus detection pixel 350 to the right along the 45° diagonal direction and the other diagonally below the focus detection pixel 350 to the left along the 45° diagonal direction. Image data at a position occupied by a focus detection pixel 360 that would otherwise be occupied by a green pixel 310 are generated through interpolation by averaging the image data at the two green pixels 310 present next to the focus detection pixel 360, one present diagonally above the focus detection pixel 360 to the left along the 45° diagonal direction and the other diagonally below the focus detection pixel 360 to the right along the 45° diagonal direction. Pixel data are generated through interpolation for the pixel position at which the pixel row made up with the focus detection pixels 350 and the pixel row made up with the focus detection pixels 360 intersect by averaging the image data at the green pixel 310 present to the right across the red pixel 311 directly adjacent to the focus detection pixel to the right, the image data at the green pixel 310 present to the left across the red pixel 311 directly adjacent to the focus detection pixel to the left, the image data at the green pixel 310 present above the focus detection pixel across the blue pixel 312 directly above the focus detection pixel and the image data at the green pixel 310 present below the focus detection pixel across the blue pixel 312 directly below the focus detection pixel.

The image data generated through the interpolation in the image sensor structured as described above are all green pixel data, including the image data generated for the pixel position at which the two focus detection pixel rows intersect. Since the green pixels are disposed at higher density than the red pixels and the blue pixels, a higher level of interpolation accuracy can be assured. Moreover, the image data generated through the interpolation will not adversely affect the overall image to any significant extent.

Figure 22:
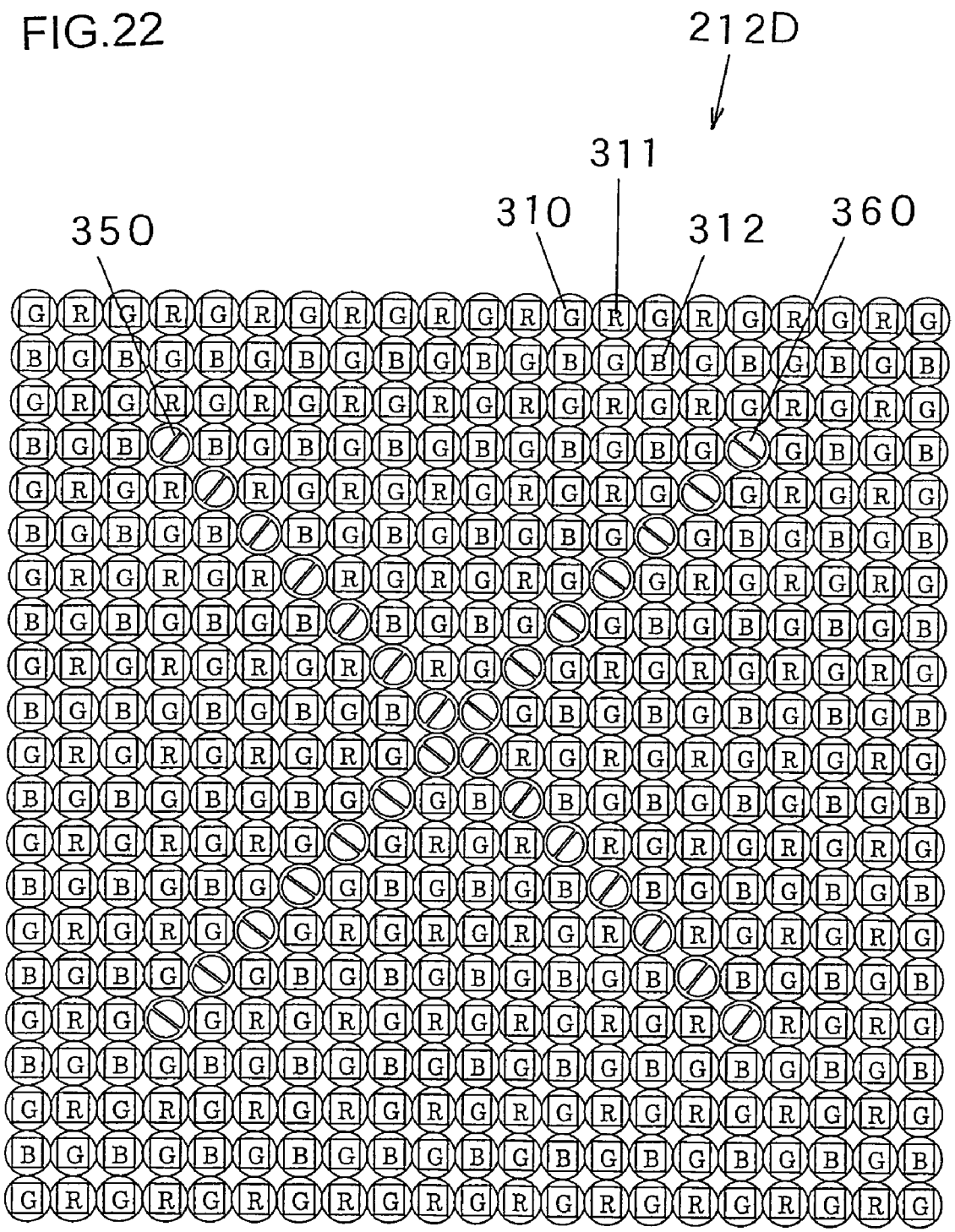

FIG. 22 is a front view showing in detail the structure adopted in an image sensor 212D achieved in a variation. It differs from the image sensor 212C in FIG. 21 in that the position of the focus detection pixel row made up with the focus detection pixels 360, leaning forward along the diagonal 45° direction is offset to the left by one pixel. In this structure, the focus detection pixel row made up with focus detection pixels 350 and the focus detection pixel row made up with the focus detection pixels 360 do not intersect at a single pixel position and thus, the focus detection pixel row made up with the focus detection pixels 360 is allowed to range without disruption. As a result, a higher level of focus detection performance is assured via the focus detection pixel row made up with the focus detection pixels 360.

Figure 23:
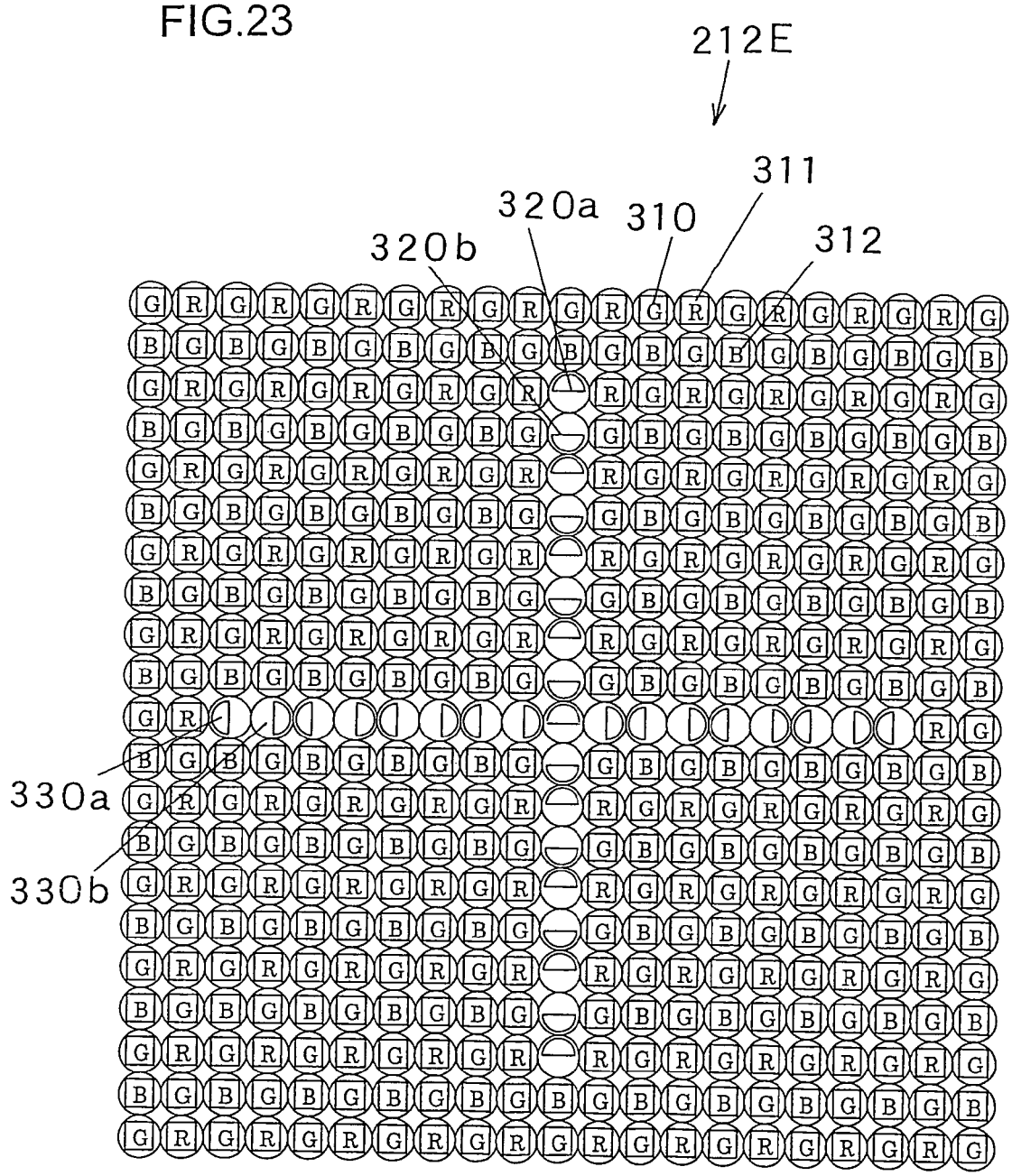

FIG. 23 is a front view showing in detail the structure adopted in an image sensor 212E achieved in a variation. It differs from the image sensor 212 in FIG. 3 in that the focus detection pixels 320 are each split into a focus detection pixel 320a and a focus detection pixel 320b and that the focus detection pixels 330 are each split into a focus detection pixel 330a and a focus detection pixel 330b. The extent of image shift manifested by a pair of images can be detected based upon the image data obtained via the focus detection pixels 320a and image data obtained via the focus detection pixels 320b. In addition, the extent of image shift manifested by a pair of images can be detected based upon the image data obtained via the focus detection pixels 330a and image data obtained via the focus detection pixels 330b.

In addition to the advantages of the image sensor 212 shown in FIG. 3, the structure described above, which includes focus detection pixels each constituted with a single macro lens and a single photoelectric conversion unit, allows focus detection pixels to assume a basic circuit structure identical to that of the imaging pixels so as to keep the image sensor structure as simple as possible.

Figure 24:
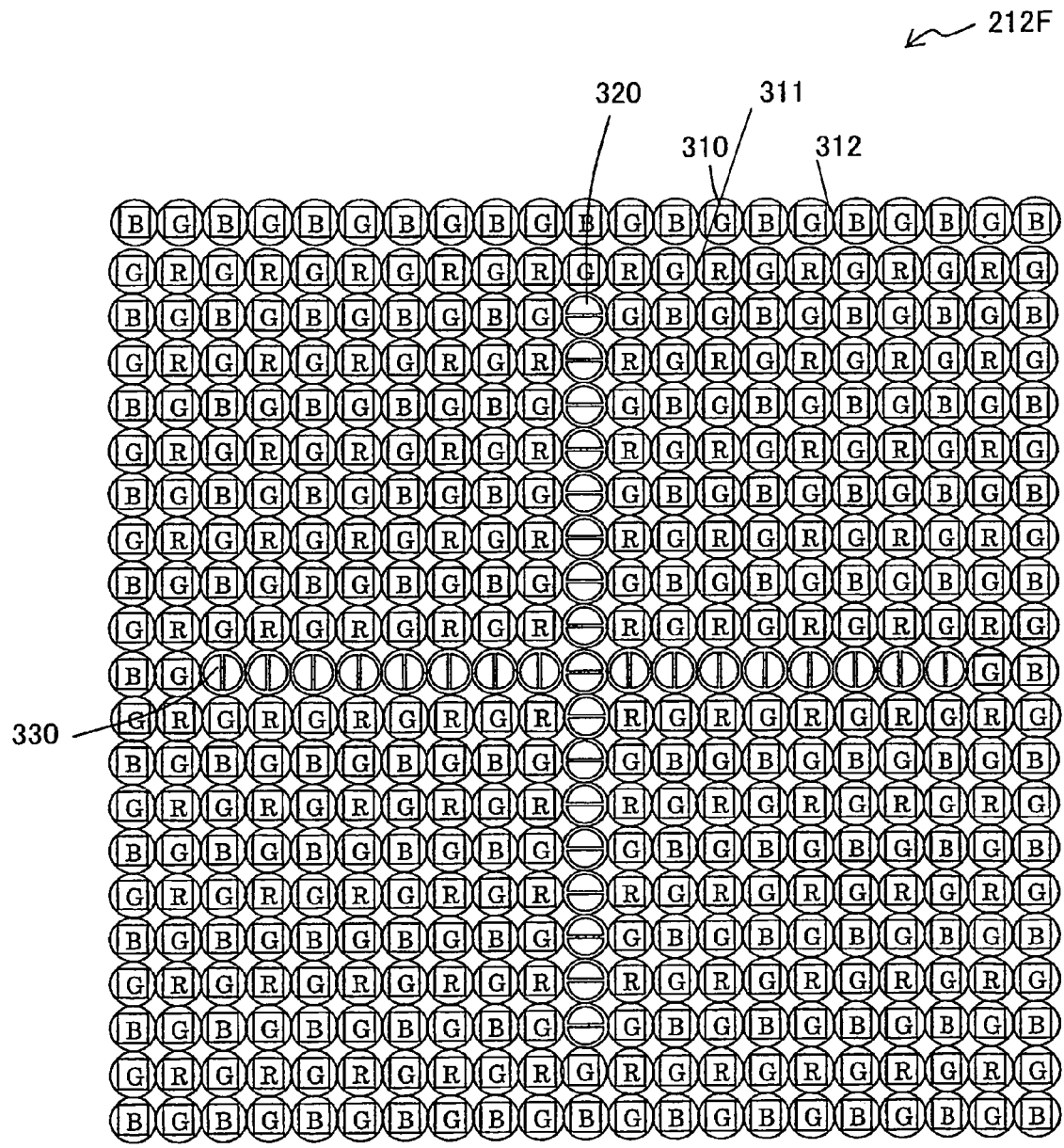

FIG. 24 is a front view showing in detail the structure adopted in an image sensor 212F achieved in a variation. In the image sensor shown in FIG. 3, the focus detection pixel row made up with the focus detection pixels 320 disposed along the vertical direction and the focus detection pixel row made up with focus detection pixels 330 disposed along the horizontal direction are made to intersect at a position that would otherwise be occupied by a green imaging pixel among imaging pixels assuming the Bayer array, in which green pixels are disposed at high density so as to assure better pixel interpolation accuracy at the intersection position. The focus detection pixel row and the focus detection pixel row may instead be made to intersect at a pixel position that would otherwise be occupied by an imaging pixel corresponding to a color to which the human eye is less sensitive, i.e., at a position that would otherwise be occupied by a blue pixel in the Bayer array and, in such a case, the error attributable to a slight decrease in the pixel interpolation accuracy at the intersection position can be rendered less noticeable to the human eye.

The image sensor 212F in FIG. 24 is constituted with imaging pixels used in imaging operation (green pixels 310, red pixels 311 and blue pixels 312) and focus detection pixels 320 and 330 used in focus detection. The focus detection pixels 320 are disposed in a dense linear pattern with no gap between the individual focus detection pixels, occupying part of a column where green pixels 310 and blue pixels 312, i.e., imaging pixels, would otherwise be disposed. The focus detection pixels 330 are disposed in a dense linear pattern with no gap between the individual focus detection pixels, occupying part of a row where green pixels 310 and blue pixels 312, i.e., imaging pixels, would otherwise be disposed. A focus detection pixel 320 is disposed at the pixel position at which the pixel row made up with the focus detection pixels 320 and the pixel row made up with the focus detection pixels 330 intersect. This intersection position would otherwise be occupied by a blue pixel 312.

Image data output from the imaging pixels through imaging operation are directly utilized. Image data at positions occupied by the focus detection pixels, on the other hand, must be generated through interpolation executed by using the image data at imaging pixels present near the focus detection pixels. For instance, image data at a position that would otherwise be occupied by a blue imaging pixel 312 but is actually occupied by a focus detection pixel 320 are generated through interpolation by averaging the image data at the blue pixel 312 present to the right of the focus detection pixel 320 across the green pixel 310 directly adjacent to the focus detection pixel 320 and the image data at the blue pixel 312 present to the left of the focus detection pixel 320 across the green pixel 310 directly adjacent to the focus detection pixel 320. Image data at a position that would otherwise be occupied by a green imaging pixel 310 but is actually occupied by a focus detection pixel 320 are generated through interpolation by averaging the image data at the four green pixels 310 present next to the focus detection pixel 320 along the 45° diagonal directions, assuming the upper right position, the lower right position, the upper left position and the lower left position relative to the focus detection pixel 320.

In addition, image data at a position occupied by a focus detection pixel 320 replacing a green pixel 310 (at each of the pixel positions above and below the pixel at the intersection position) are generated through interpolation by averaging the image data at two green pixels 310 set next to the focus detection pixel 320 diagonally above to the right and diagonally above to the left along the 45° diagonal directions or diagonally below to the right and diagonally below to the left along the 45° diagonal directions. Image data at a position that would otherwise be occupied by a blue imaging pixel 312 but is actually occupied by a focus detection pixel 330 are generated through interpolation by averaging the image data at the blue pixel 312 present above the focus detection pixel 330 across the green pixel 310 directly above the focus detection pixel 330 and the image data at the blue pixel 312 present below the focus detection pixel 330 across the green pixel 312 directly below the focus detection pixel 330.

Image data at a position that would otherwise be occupied by a green pixel 310 but is actually occupied by a focus detection pixel 330 are generated through interpolation by averaging the image data at the four green pixels 310 present next to the focus detection pixel 330 along the 45° diagonal directions, assuming the upper right position, the lower right position, the upper left position and the lower left position relative to the focus detection pixel 330. Image data at a position occupied by a focus detection pixel 330 replacing a green pixel 310 (at each of the pixel positions to the left and to the right relative to the intersecting pixel position) are generated through interpolation by averaging the image data at the two green pixels 310 present next to the focus detection pixel 330, either diagonally above to the right and diagonally below to the right along the 45° diagonal directions or diagonally above to the left and diagonally below to the left along the 45° diagonal directions. Image data are generated through interpolation for the intersection position occupied by the focus detection pixel 320 by averaging the image data at the four blue pixels 312 present near the focus detection pixel 320 across the red pixels 311 diagonally above to the right, diagonally below to the right, diagonally above to the left and diagonally below to the left along the 45° diagonal directions.

(Another Embodiment of the Present Invention)

Next, an alternative embodiment of the present invention is described. It is to be noted that the structure of the imaging apparatus achieved in the alternative embodiment is similar to that shown in FIG. 1, that the imaging pixels 310, 311, and 312 and the focus detection pixels 320 and 330 assume structures, sectional structures and characteristics similar to those shown in FIGS. 4, 5, 7, 8, 9 and 10 and that the same reference numerals are assigned to elements similar to those of the previous embodiment so as to preclude the need for a repeated explanation thereof. In addition, since the focus detection method adopted in this embodiment, the range-finding pupils at the exit pupil assumed in relation to the imaging pixels and the focus detection pixels in the embodiment and the like are similar to the method and the relationship explained in reference to FIGS. 11 through 13, they are not described repeatedly.

Figure 25:
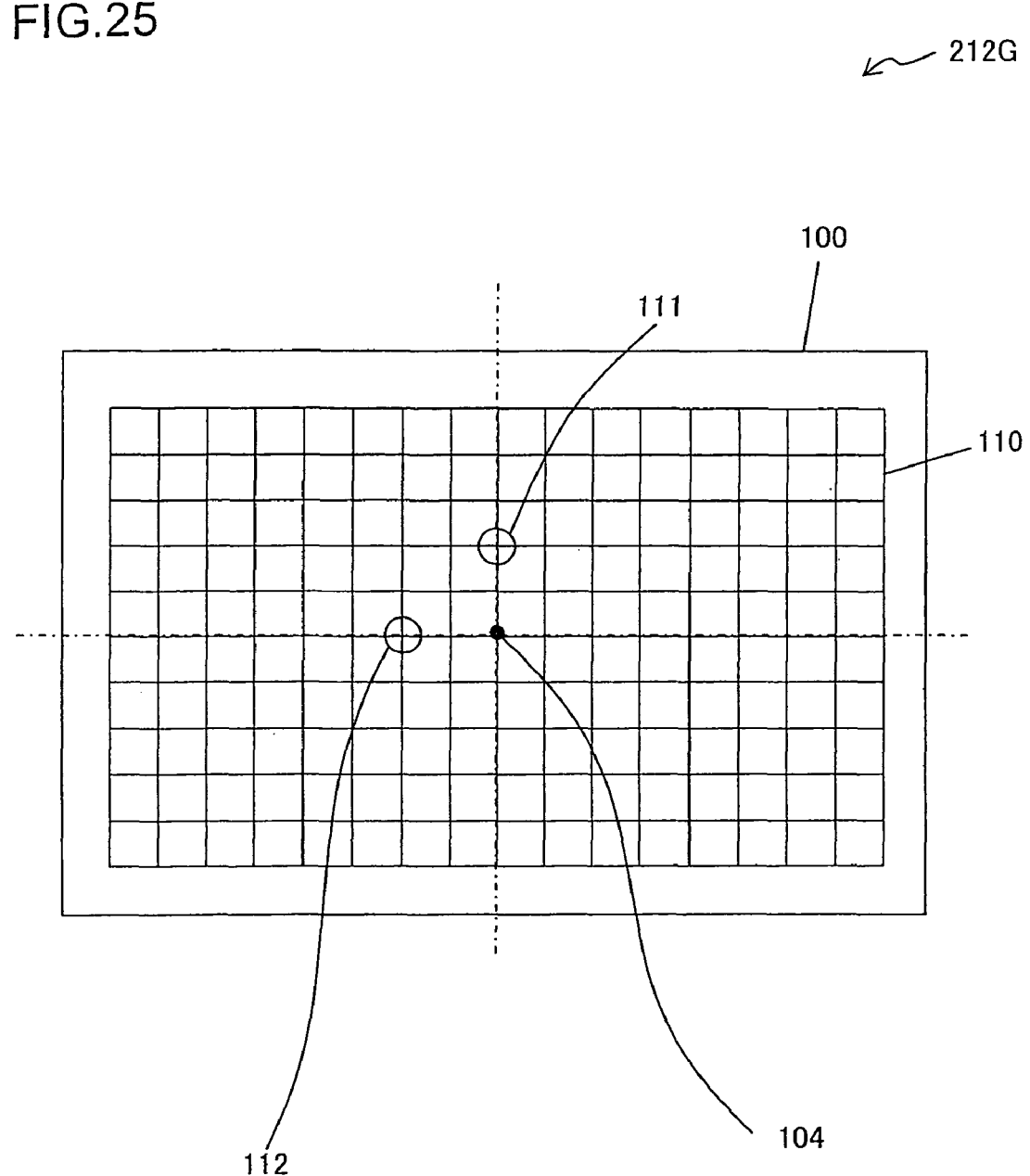

FIG. 25 illustrates the positional arrangement with which focus detection pixels are disposed at an image sensor 212G in the alternative embodiment. At the image sensor 212G, focus detection pixels are disposed along grid lines 110 on a photographic field 100. The grid 110 is made up with a plurality of straight lines set with a uniform pitch along the horizontal direction and the vertical direction on the rectangular photographic field 100 and substantially covers the entire photographic field 100.

For purposes of focus detection, the image shift manifesting along the lines is detected via the focus detection pixels disposed in the linear patterns. In other words, in the image sensor 212G shown in FIG. 25, image shift detection is executed along two directions, i.e., along the horizontal direction and the vertical direction, assuring reliable focus detection regardless of the pattern of the subject. In addition, since the focus detection pixels are disposed at equal densities along the two directions over the entire photographic field 100, focus detection can be executed with a uniform performance level at any focus detection position that may be taken on the photographic field 100.

Figure 26:
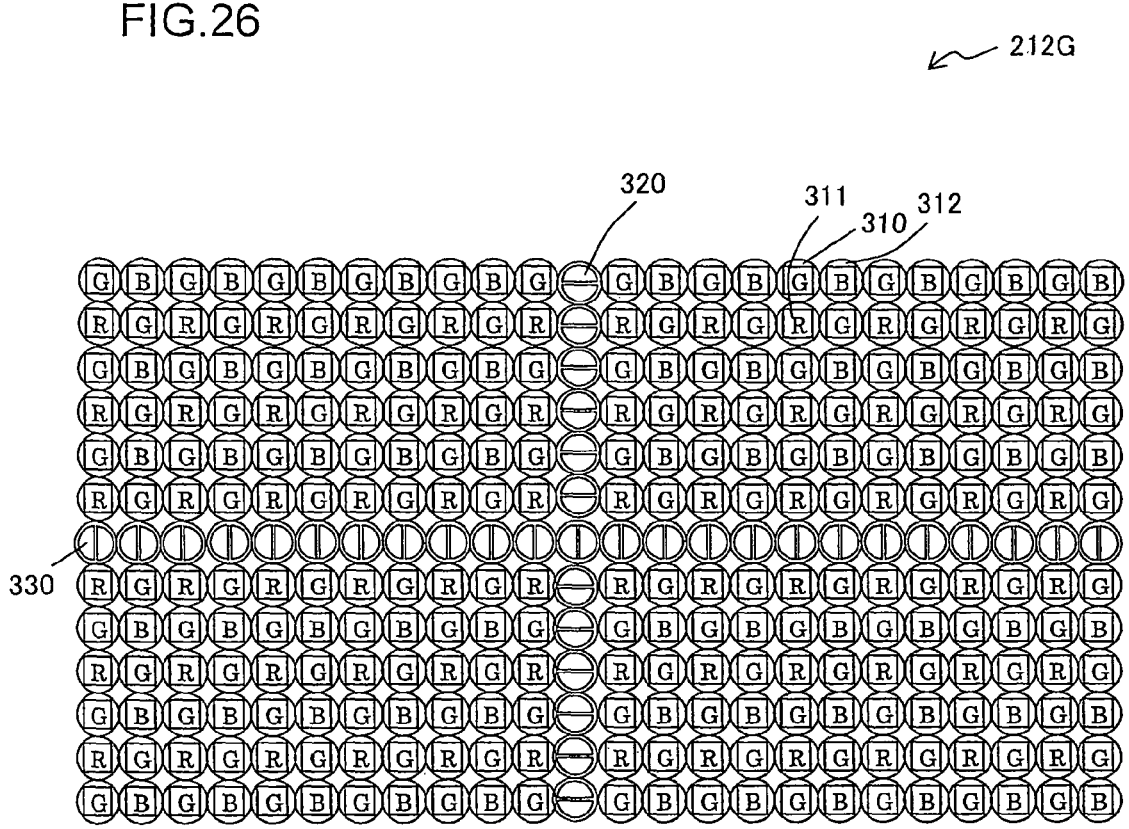
Figure 27:
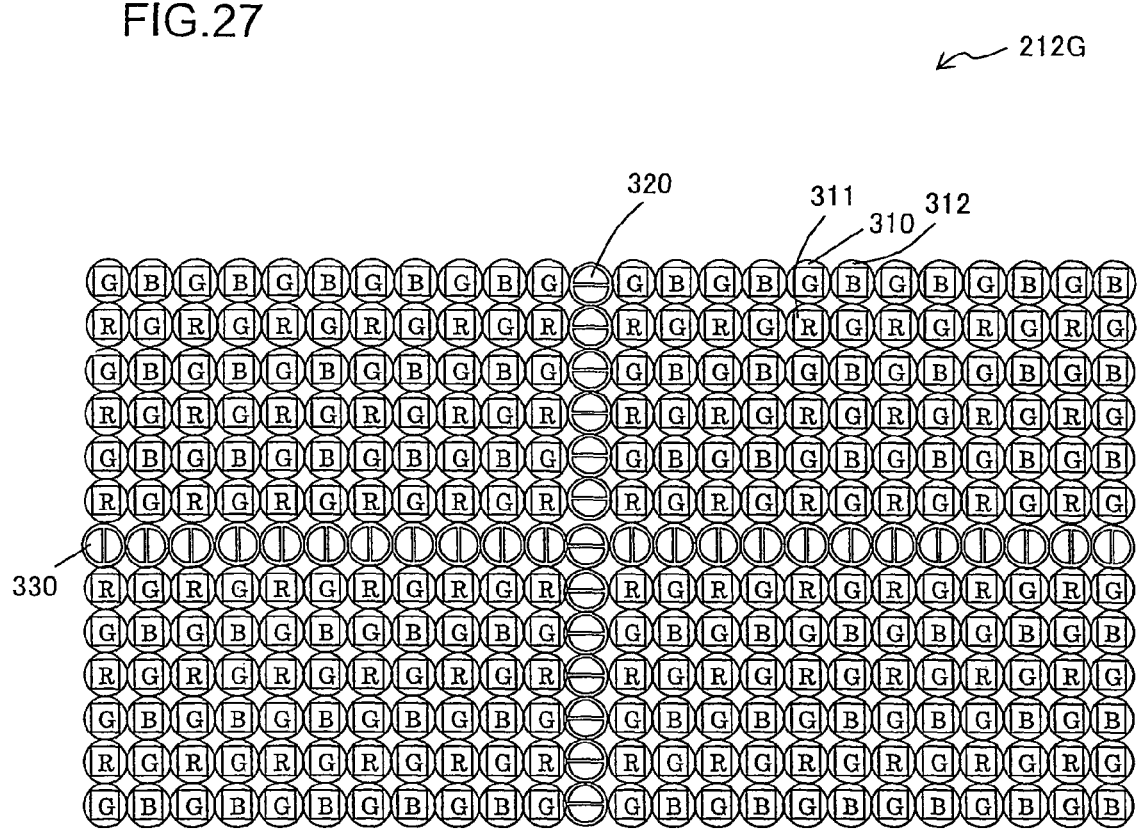

FIGS. 26 and 27 each present a front view showing the structure of the image sensor 212G in detail. The image sensor 212G is constituted with imaging pixels 310~312 such as that shown in FIG. 4 and focus detection pixels 320 and 330 such as that shown in FIG. 5. FIG. 26 is an enlargement of an area 111 that includes a grid intersection point assuming a position set away from the center 104 (the intersection point of the image plane and the optical axis of the interchangeable lens) of the photographic field 100 in FIG. 25 along the vertical direction. A focus detection pixel 330, which is part of the horizontal pattern occupies the pixel position equivalent to the grid intersection point. In addition, FIG. 27 is an enlargement of an area 112 that includes a grid intersection point assuming a position set away from the center 104 of the photographic field 100 in FIG. 25 along the horizontal direction. A focus detection pixel 320, which is part of the vertical pattern occupies the pixel position equivalent to the grid intersection point.

The type of focus detection pixel to occupy the position equivalent to the grid intersection point is determined in correspondence to the direction along which the straight line connecting the photographic field center and the grid intersection point extends, so as to reduce the adverse effect of focus detection light flux vignetting. Focus detection pixels 330 are disposed along straight lines extending along the horizontal direction in the grid 110, whereas focus detection pixels 320 are disposed along straight lines extending along the vertical direction in the grid 110. In addition, a focus detection pixel in the linear pattern extending along a direction closer to the direction (circumferential direction) perpendicular to the direction (radial direction) in which the straight line connecting the photographic field center 104 and the grid intersection point extends, is disposed at the intersection point extends in the grid 110.

As FIGS. 26 and 27 indicate, color filters assuming an RGB Bayer array are mounted at the two dimensionally arrayed imaging pixels 310~312. The focus detection pixels 320 and 330 used in focus detection are disposed in dense linear patterns with no gap formed between the individual focus detection pixels along rows and columns, which would otherwise be occupied by green imaging pixels 310 and blue imaging pixels 312. The focus detection pixels 320 and 330 are disposed so as to take up positions that would otherwise be occupied by green pixels 310 and blue pixels 312, since the human eye is more sensitive to red than to blue and the interpolation error that could occur when generating pixel data at focus detection pixel positions through interpolation by using the imaging pixel data at surrounding imaging pixels, as described above, can be rendered less noticeable by adopting the positional arrangement described above for the focus detection pixels.

Figure 28:
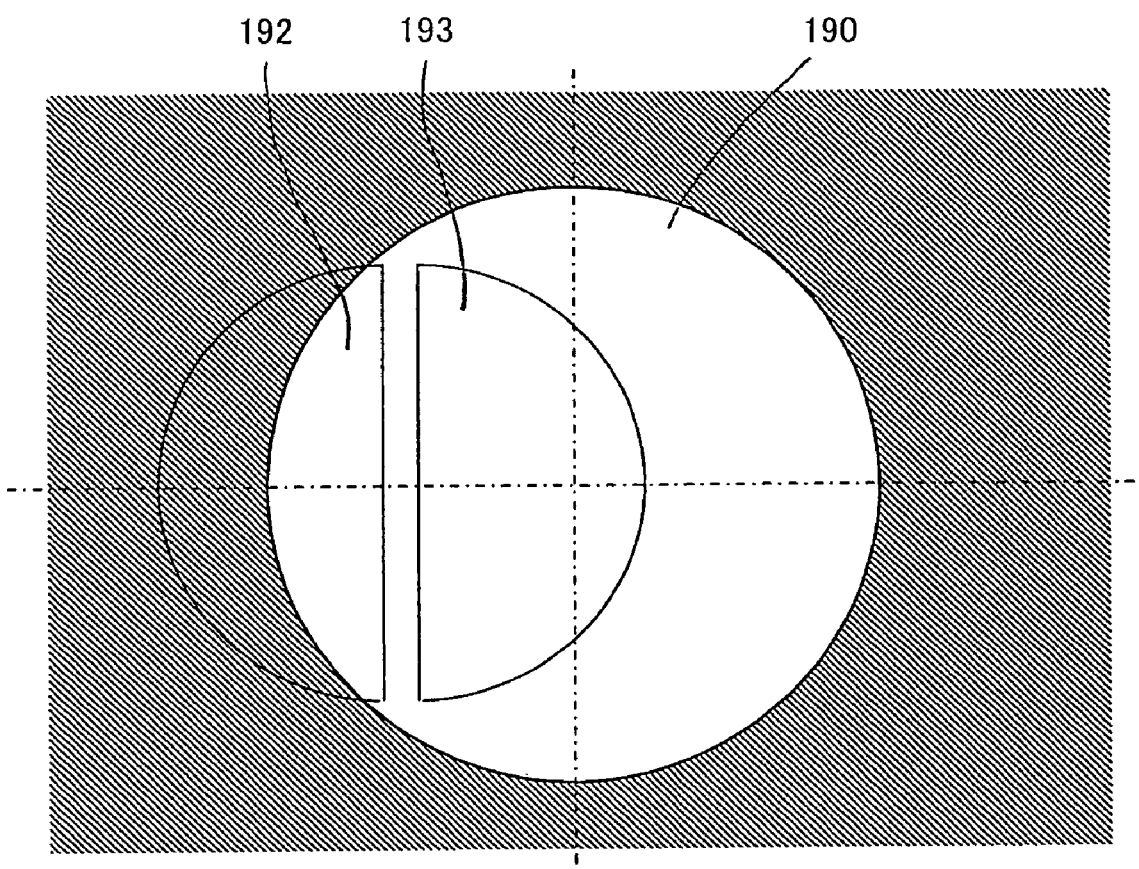
Figure 29:
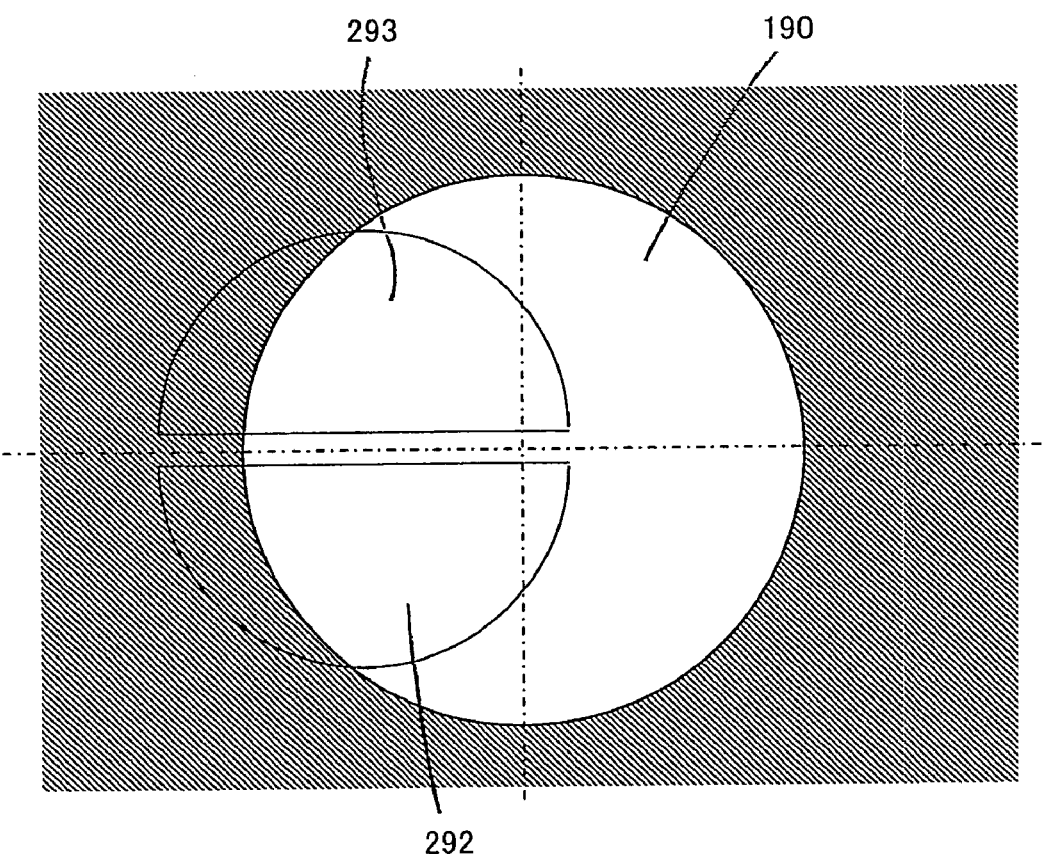

FIGS. 28 and 29 illustrate focus detection light flux vignetting. If the exit pupil 190 of the interchangeable lens does not assume the position matching the range-finding pupil distance d, the centers of the range-finding pupils corresponding to focus detection pixels disposed at positions set away from the optical axis in the photographic field will be offset from the center of the exit pupil plane of the interchangeable lens. FIGS. 28 and 29 respectively illustrate the positional relationships, shown on the exit pupil plane of the interchangeable lens, of the range-finding pupils 192 and 193 of a focus detection pixel 330 disposed near the area 112 in FIG. 25 and the range-finding pupils 292 and 293 of a focus detection pixel 320, also disposed near the area 112, to the exit pupil 190 of the interchangeable lens. FIG. 28 indicates that the range-finding pupils 192 and 193 are unevenly vignetted via the exit pupil 190. FIG. 29, on the other hand, indicates that the range-finding peoples 292 and 293 are evenly vignetted via the exit pupil 190.

Uneven vignetting at the range-finding pupils results in uneven vignetting of focus detection light fluxes, which may ultimately lead to unbalanced image signal levels. If the balance of the levels of the pair of image signals is significantly disrupted, the image shift detection accuracy will be lowered and, in some cases, the image shift detection itself may be disabled. Accordingly, a focus detection pixel (the focus detection pixel 320 in the image sensor shown in FIGS. 28 and 29), which better assures focus detection accuracy even when the focus detection light fluxes are vignetted, is disposed at each grid intersection point, as described above, so as to sustain the required level of focus detection accuracy.

Figure 30:
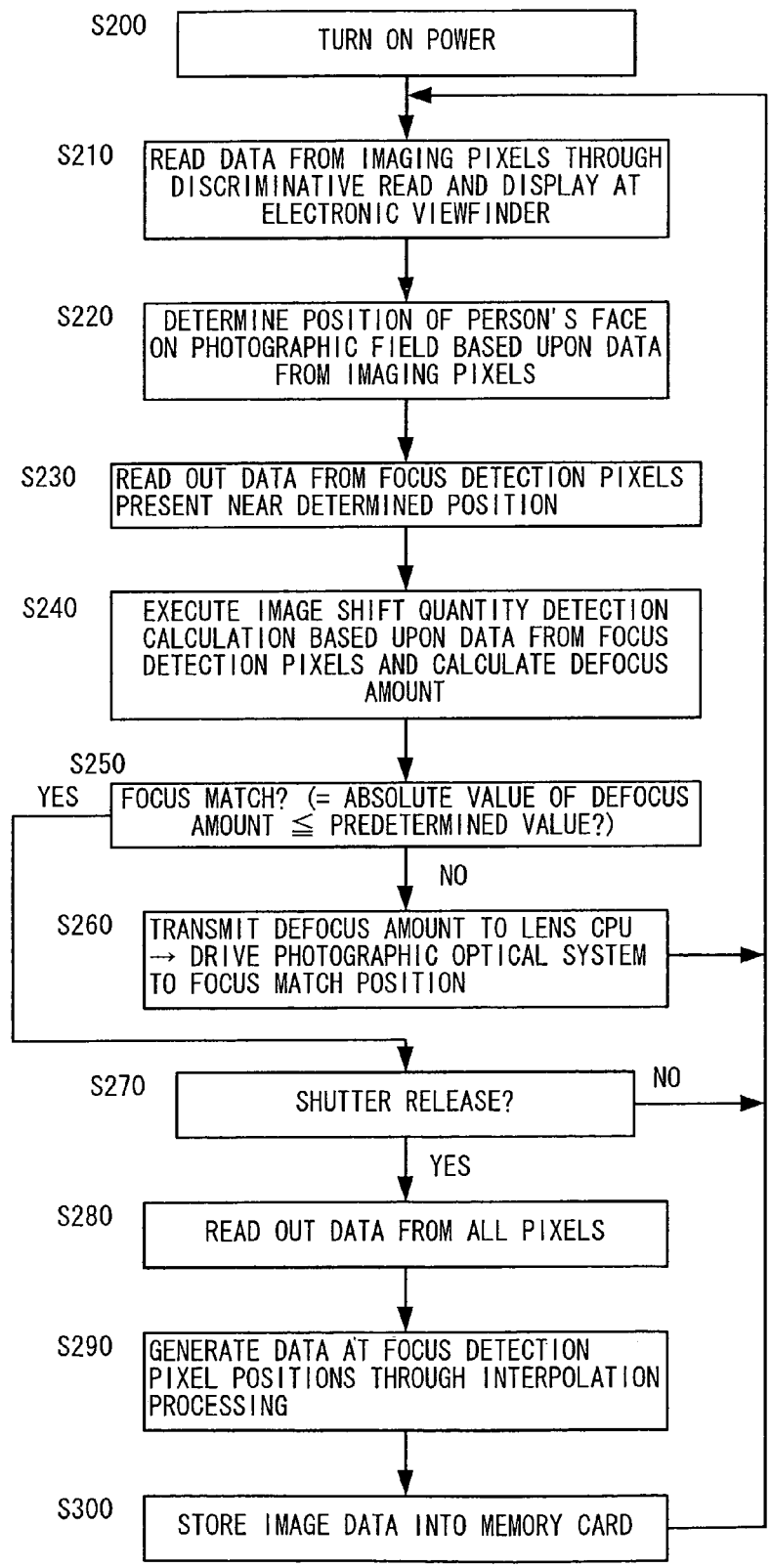
Figure 31:
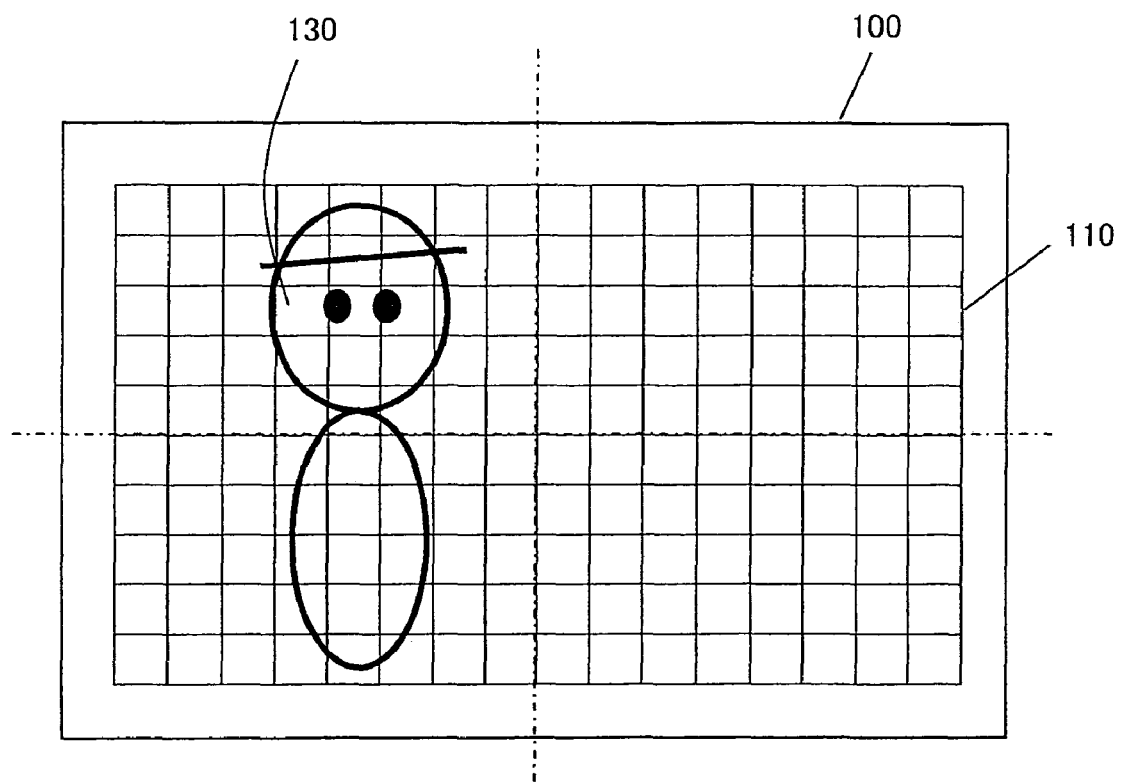

FIG. 30 presents a flowchart of the operation executed in the digital still camera (imaging apparatus) in the alternative embodiment. As power to the camera is turned on in step 200, the body drive control device 214 proceeds to step 210 to start an imaging operation. In step 210, data from the imaging pixels are read out and are displayed at the electronic viewfinder. In the following step 220, a position 130 occupied by a person's face in the photographic field, as shown in FIG. 31, is determined based upon the imaging pixel data. The person's face may be identified through a face detection technology in the known art by, for instance, identifying an area indicating skin color in the image data as a face position or by identifying a face position through template matching executed based upon preregistered face image data and the image data obtained through the imaging operation. It is to be noted that if no face is detected, a designated position is set at the center of the photographic field. If a plurality of faces is detected, a single designated position is determined by selecting, for instance, the face closest to the center of the photographic field or the face occupying the largest area through predetermined selection processing.

In step 230, the two sets of image data corresponding to the pair of images are read out from each focus detection pixel row present near the designated position (each focus detection pixel row on the grid 110 near the position 130 in FIG. 31). In the following step 240, image shift detection calculation processing (correlation operation processing) is executed based upon the two sets of image data having been read out, to calculate the image shift amount and the image shift amount is then converted to a defocus amount. Since a plurality of focus detection pixel rows are present near the designated position, a plurality of defocus amounts are calculated and the ultimate defocus amount may be determined through a specific type of determination processing by, for instance, taking the average of the plurality of defocus amounts or selecting the defocus amount indicating the shortest distance.

In step 250, a decision is made as to whether or not the current condition is close to the focus match state, i.e., whether or not the absolute value of the defocus amount having been calculated is equal to or less than a predetermined value. If it is decided that the current condition is not close to the focus match state, the operation proceeds to step 260 to transmit the defocus amount to the lens drive control device 206 and, in response, the focusing lens in the interchangeable lens is driven to the focus match position. Subsequently, the operation returns to step 210 to repeatedly execute the operation described above. It is to be noted that the operation also proceeds to this step if focus detection cannot be executed. In this case, a scan-drive instruction is transmitted to the lens drive control device 206 so as to drive the focusing lens in the interchangeable lens to scan over the range between infinity and close-up. The operation then returns to step 210 to repeatedly execute the operation described above.

If, on the other hand, it is decided that the current condition is close to the focus match state, the operation proceeds to step 270 to make a decision as to whether or not a shutter release has occurred in response to an operation at the shutter button (not shown). If it is decided that a shutter release has not occurred, the operation returns to step 210 to repeatedly execute the operation described above. If it is decided that a shutter release has occurred, the operation proceeds to step 280 to transmit an aperture-adjust instruction to the lens drive control device 206 and the aperture value at the interchangeable lens is thus adjusted to a control F-number (an F-number selected by the user or an automatically selected F-number). Once the aperture control ends, the image sensor is engaged in imaging operation and image data are read out from the imaging pixels and all the focus detection pixels in the image sensor. In step 290, image data at a pixel position occupied by a focus detection pixel in each focus detection pixel row are generated through interpolation based upon the data at surrounding imaging pixels. In the following step 300, image data constituted with the data from the imaging pixels and the interpolated data are saved into the memory card and then the operation returns to step 210 to repeatedly execute the operation described above.

The image shift detection calculation processing, i.e., the correlation operation processing, executed in step 240 in FIG. 30 is similar to that executed in the previous embodiment and a repeated explanation is not provided. It is to be noted that the light quantity balance between the pairs of images detected via the focus detection pixels may have been disrupted due to vignetting of the range-finding pupils by the lens aperture opening, and for this reason, a specific type of correlation operation that allows a high level of image shift detection accuracy to be sustained even when the light quantities are not in balance, should be executed.

Figure 32:
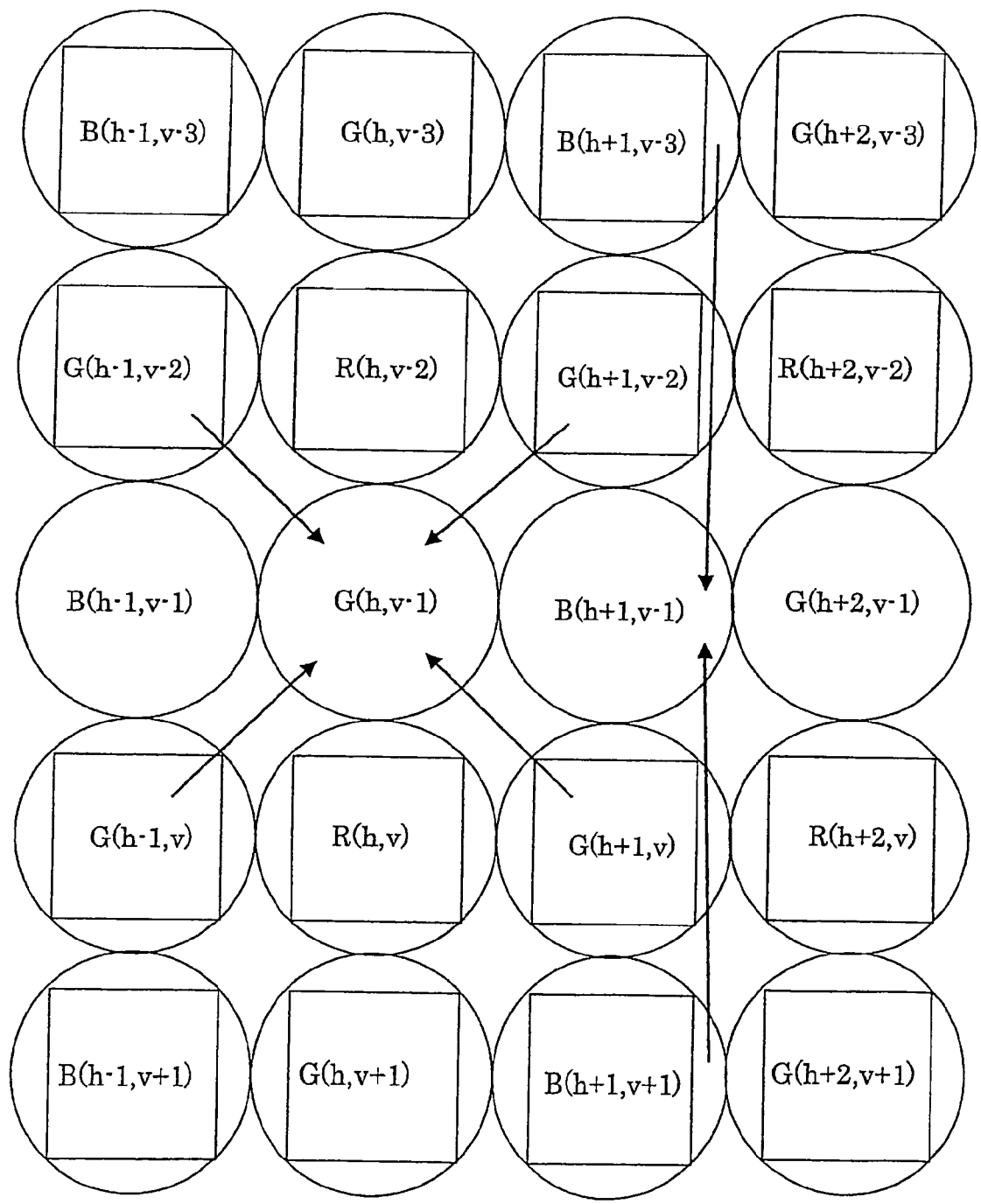

Next, the pixel interpolation processing executed in step 290 in FIG. 30 is described in detail. FIG. 32 illustrates how image data at focus detection pixel positions may be generated through interpolation executed based upon pixel data at imaging pixels present around the focus detection pixels. Variables h and v in the figure are used to indicate the position assumed by a given pixel along the horizontal direction and the vertical direction in a two-dimensional pixel array such as that shown in FIGS. 26 and 27. We now examine how pixel data $G(h, v-1)$ at the column h/row v−1 focus detection pixel position and pixel data $B(h+1, v-1)$ at the column h+1/row v−1 focus detection pixel position may be corrected based upon data output from nearby imaging pixels.

The column h/row v−1 pixel position would normally be occupied by a green imaging pixel 310 and accordingly, output data at this pixel position are generated through interpolation by averaging the output data from four green pixels 310 present around the pixel position as expressed (9) below.

$$G(h,v-1)=\{G(h-1,v-2)+G(h+1,v-2)+G(h-1,v)+G(h+1,v)\}/4 \qquad (9)$$

The column h+1/row v−1 pixel position would normally be occupied by a blue imaging pixel 312 and accordingly, output is data at this pixel position are generated through interpolation by averaging the output data from two blue pixels 312 present around the pixel position as expressed (10) below $$B(h+1,v-1)=\{B(h+1,v-3)+B(h+1,v+1)\}/2 \quad (10)$$

Pixel interpolation processing can be executed for all the focus detection pixel positions through calculations similar to those expressed in (9) and (10) above.

In the alternative embodiment, focus detection pixels are disposed successively in linear patterns along the horizontal direction and the vertical direction, occupying part of the dense square array of imaging pixels. This structure adopted in an image sensor constituted with a CCD image sensor or a CMOS sensor facilitates timing coordination with the read control and thus, makes it possible to execute a partial read or a discriminative read of outputs from the focus detection pixels among all the pixels with ease.

(Variations of the Alternative Embodiment)

Figure 33:
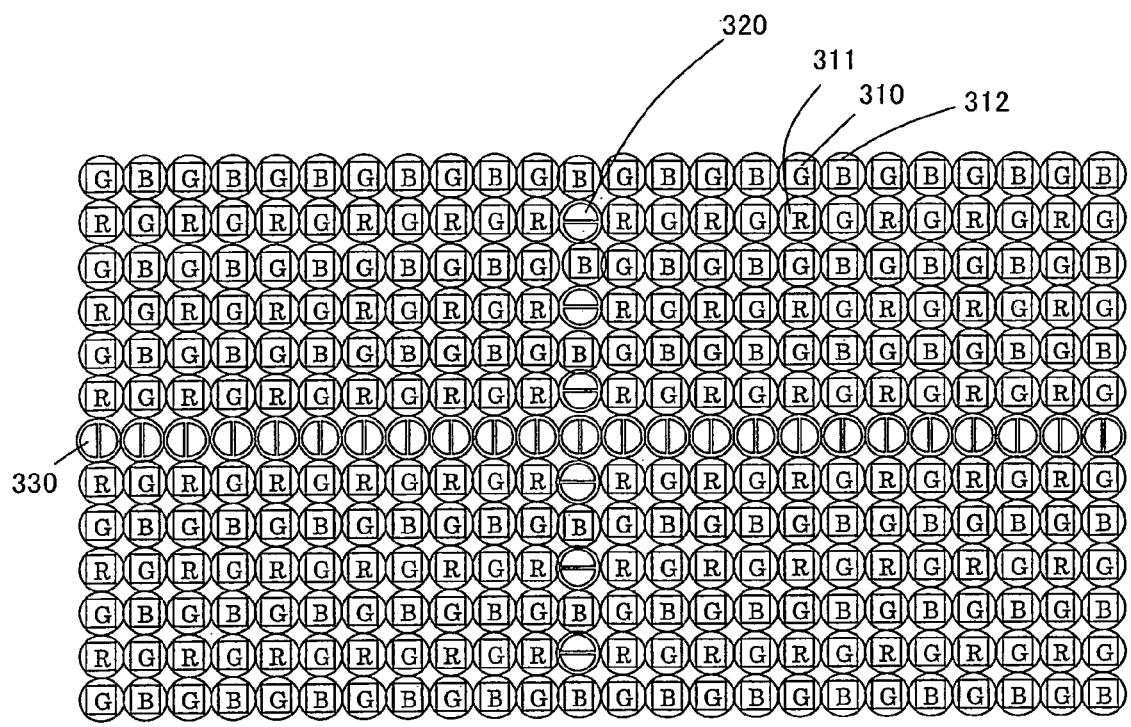
Figure 34:
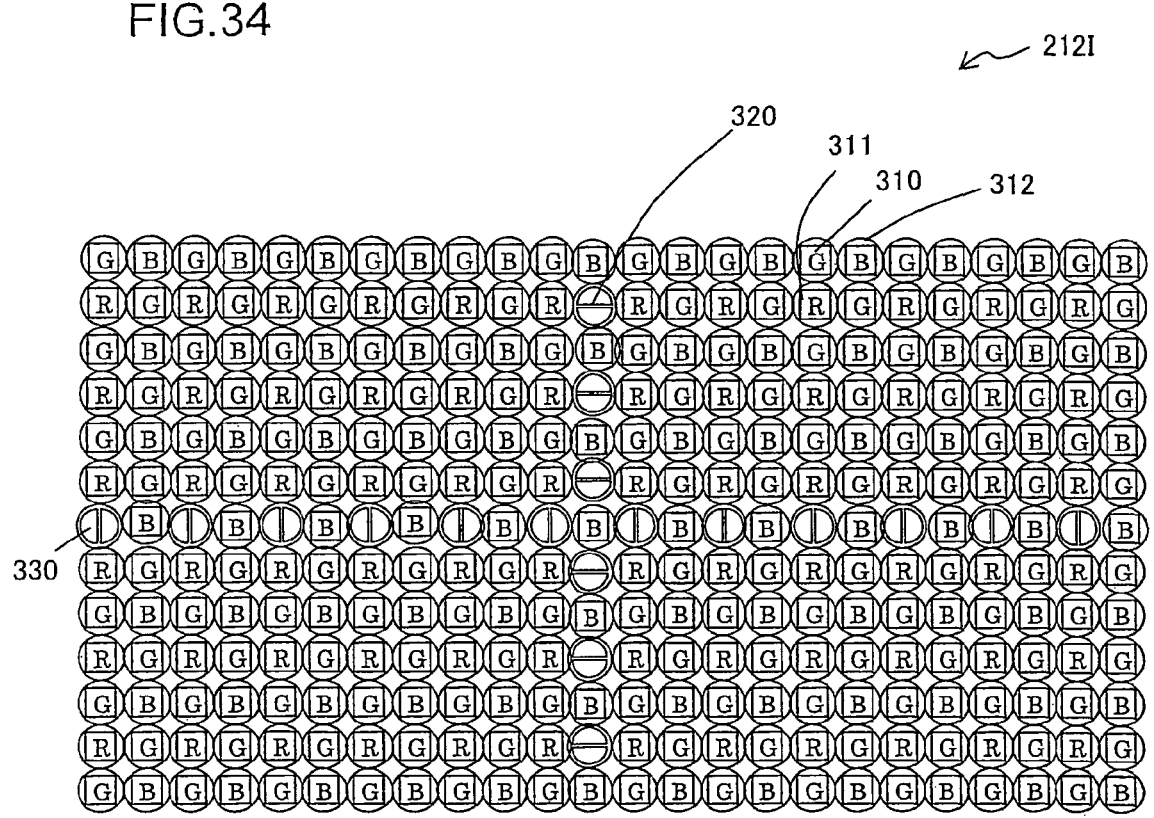

Next, variations of the image sensor are described. In FIGS. 33 and 34 respectively illustrate the positional arrangements assumed for focus detection pixels at image sensors 212H and 212I achieved in variations. While the focus detection pixels 320 and 330 are disposed successively adjacent to one another along straight lines at the image sensor 212G shown in FIGS. 26 and 27, focus detection pixels in one of the pixel rows running along a specific direction may be disposed over intervals equivalent to several pixels or focus detection pixels in the pixel rows may both be disposed over intervals equivalent to several pixels. FIG. 33, which corresponds to FIG. 26, shows focus detection pixels 320 each disposed at every other pixel position. FIG. 34, which corresponds to FIG. 27, shows focus detection pixels 320 and 330 each disposed at every other pixel position.

While the focus detection accuracy is somewhat lowered due to the greater image detection pitch with which the images are detected for purposes of focus detection via such focus detection pixel rows, the presence of imaging pixels disposed between the focus detection pixels reduces the number of positions at which the pixel interpolation must be executed and thus, better image quality is assured. In addition, since the pixel disposed at the intersection position at which the focus detection pixel rows intersect does not disrupt the continuity in either direction, the image shift detection can be executed along continuous areas containing the intersection position both along the horizontal direction and the vertical direction by adopting either of the focus detection pixel arrangements. It is to be noted that in either of the pixel arrangements shown in FIGS. 26 and 27, too, image shift detection may be executed for the focus detection pixel row disrupted at the intersection position by regarding the focus detection pixel row as a virtual focus detection pixel row with focus detection pixels disposed at every other pixel position so as to enable image shift detection over a continuous range containing the intersection position even in conjunction with a focus detection pixel row with no focus detection pixel disposed at the intersection position.

Figure 35:
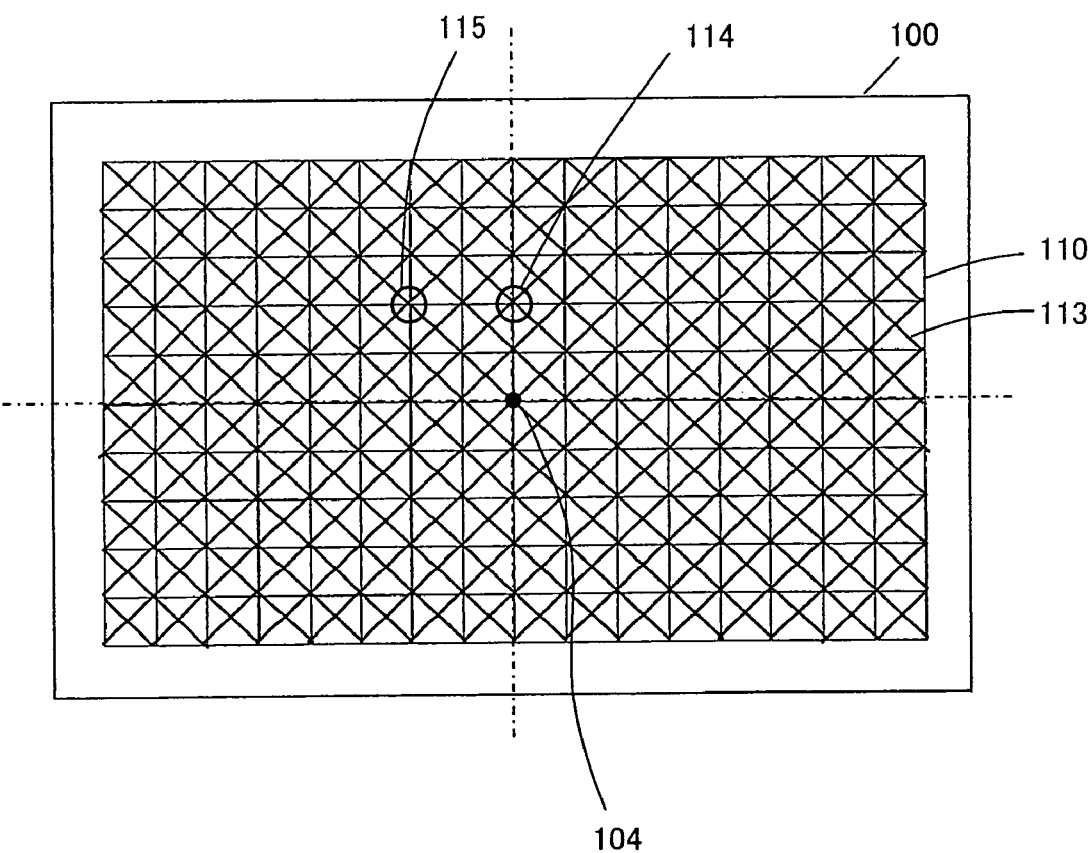
Figure 36:
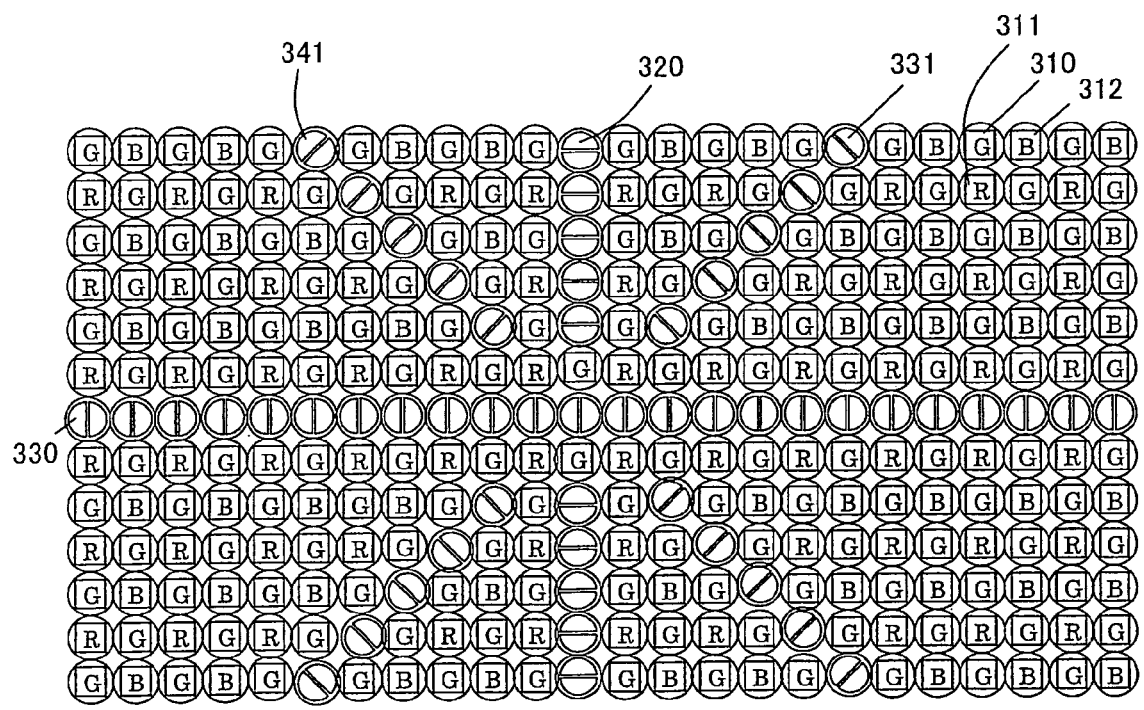
Figure 37:
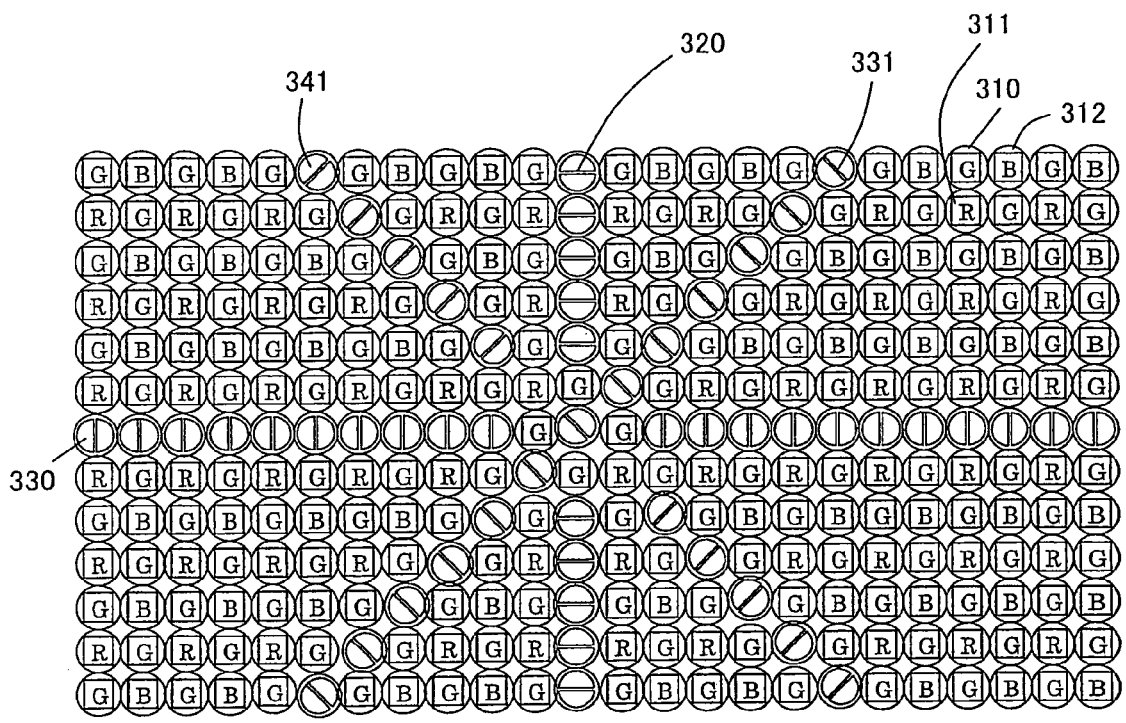

FIGS. 35, 36 and 37 illustrate the positional arrangement assumed for focus detection pixels in an image sensor 212J achieved as another variation. FIG. 35 shows the image sensor 212J with focus detection pixels disposed in a grid 113 that includes straight lines extending along the 45° diagonal directions in addition to the grid lines in the grid 110 in the image sensor 212G shown in FIG. 25. FIG. 36 is an enlargement of an area 114 in FIG. 35 that includes a grid intersection point, set away from the center 104 of the photographic field 100 along the vertical direction. Focus detection pixels 330 are disposed along the horizontal direction, whereas focus detection pixels 320 are disposed along the vertical direction. In addition, focus detection pixels 331 are disposed along a straight line leaning forward along the 45° diagonal direction and focus detection pixels 341 are disposed along a straight line leaning backward along the 45° diagonal direction.

The focus detection pixels 331 are each oriented by rotating a focus detection pixel 330 by 45° along the counterclockwise direction, whereas the focus detection pixels 341 are each oriented by rotating a focus detection pixel 330 by 45° along the clockwise direction. One of the focus detection pixels 330 disposed along the horizontal direction occupies the pixel position equivalent to the grid intersection point.

FIG. 37 is an enlargement of an area 115 that includes a grid intersection point diagonally above the center 104 of the photographic field 100 in FIG. 35 set away from the center 104 along the straight line leaning backward along the 45° diagonal direction. One of the focus detection pixels 331 disposed along the straight line leaning forward along the 45° diagonal direction takes up the pixel position equivalent to the grid intersection point. The principle with regard to the type of focus detection pixel to occupy the grid intersection point applies in all the other grid intersection points, so that a focus detection pixel among those disposed along a direction closer to the direction (circumferential direction) perpendicular to the direction (radial direction) along which the straight line connecting the photographic field center and the grid intersection point extends, occupies the grid intersection point.

The positional arrangement adopted in conjunction with the focus detection pixels in the image sensor 212J enables image shift detection along four directions and, as a result, reliable focus detection can be executed regardless of the directionality of the subject pattern. In addition, the increased presence of focus detection pixels per unit area on the photographic field makes it possible to execute focus detection in a precise area centered on a specific position having been designated.

Figure 38:
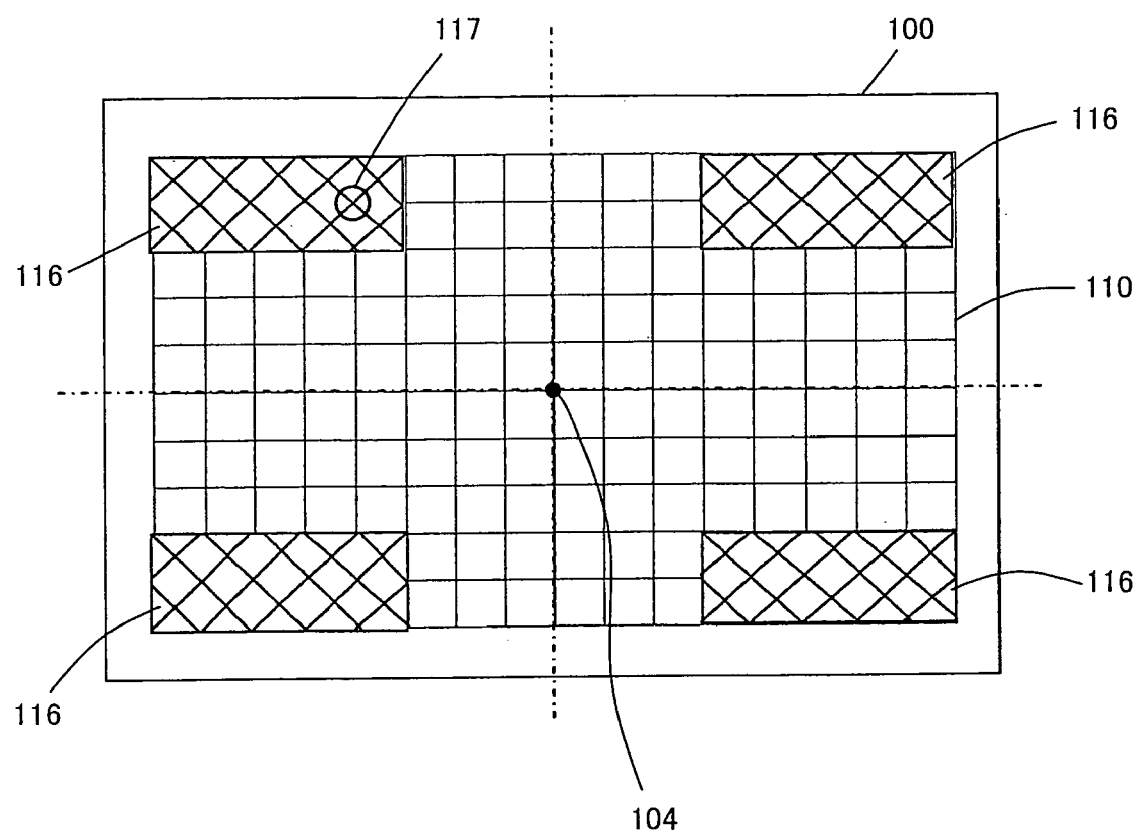
Figure 39:
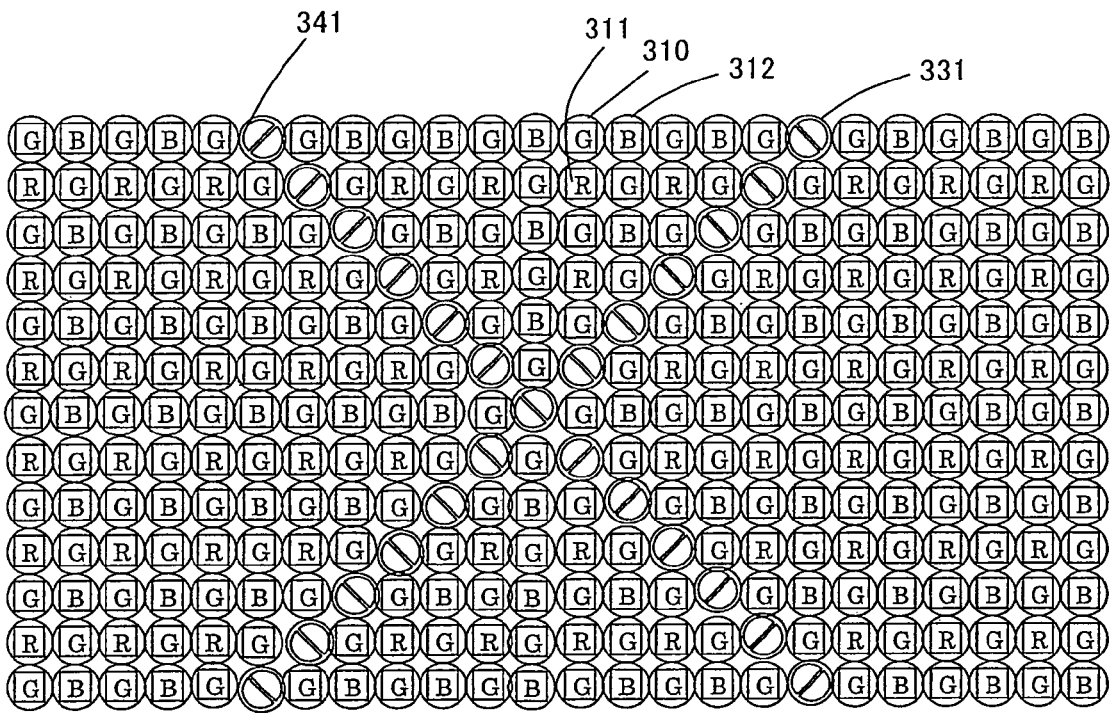

FIGS. 38 and 39 show the positional arrangement assumed for focus detection pixels in an image sensor 212K achieved as another variation. FIG. 38 shows a variation of the grid pattern 110 assumed at the image sensor 212G in FIG. 25, with grid patterns 116 each made up with straight lines extending along the 45° diagonal directions set in the areas at the four corners along the diagonals in the photographic field 100. FIG. 39 is an enlargement of an area 117 in FIG. 38, which contains an intersection point in the grid pattern 116 diagonally above the center 104 of the photographic field 100, set away from the center 104 to the left along the 45° diagonal direction. One of the focus detection pixels 331 disposed along the straight line leaning forward along the 45° diagonal direction takes up the pixel position equivalent to the grid intersection point. The principle with regard to the type of focus detection pixel to occupy the grid intersection point applies in all the other grid intersection points, so that a focus detection pixel among those disposed along a direction closer to the direction (circumferential direction) perpendicular to the direction (radial direction) along which the straight line connecting the photographic field center and the grid intersection point extends occupies the grid intersection point.

The positional arrangement assumed for the focus detection pixels at the image sensor 212K allows image shift detection to be executed along a concentric direction relative to the center 104 of the photographic field 100 in the four corner areas along the diagonals in the photographic field and, as a result, the focus detection accuracy is not compromised due to vignetting of focus detection light fluxes. At the same time, the grid patterns 116 made up with the straight lines extending along the 45° diagonal directions enable image shift detection to be executed along two directions. Consequently, reliable focus detection is assured regardless of the directionality of the subject pattern. In addition, the number of focus detection pixels in the image sensor achieved in this variation is smaller than that of focus detection pixels in the arrangement illustrated in FIG. 35 and, as a result, the decrease in the image quality is minimized.

Figure 40:
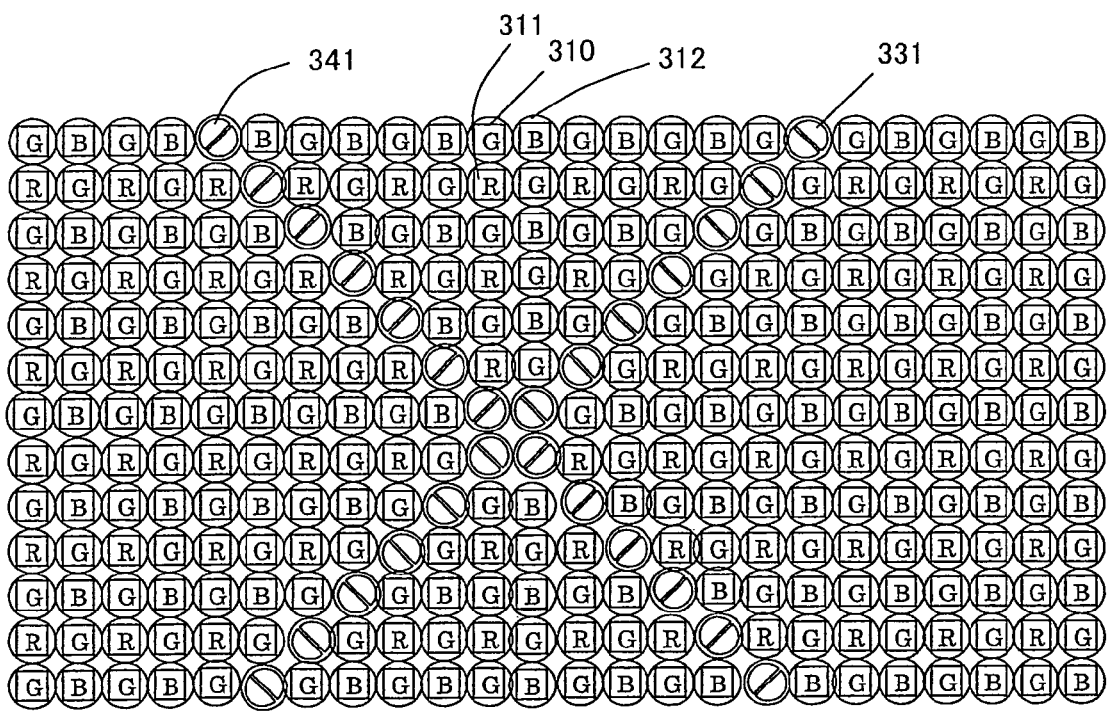

While the focus detection pixel that assures better focus detection accuracy in the event of focus detection light flux vignetting, among the focus detection pixels 331 disposed along the forward leaning diagonal direction and the focus detection pixels 341 disposed along the backward leaning diagonal direction, is disposed at the focus detection pixel row intersection position in both FIGS. 35 and 38 (at the intersection positions in the grid patterns 113 and 116), the focus detection pixel rows may be made to intersect over the gap between the individual focus detection pixels, as in an image sensor 212L shown in FIG. 40, so as to set the focus detection pixels in both focus detection pixel rows with continuity and without a disruption at the intersection position.

Figure 41:
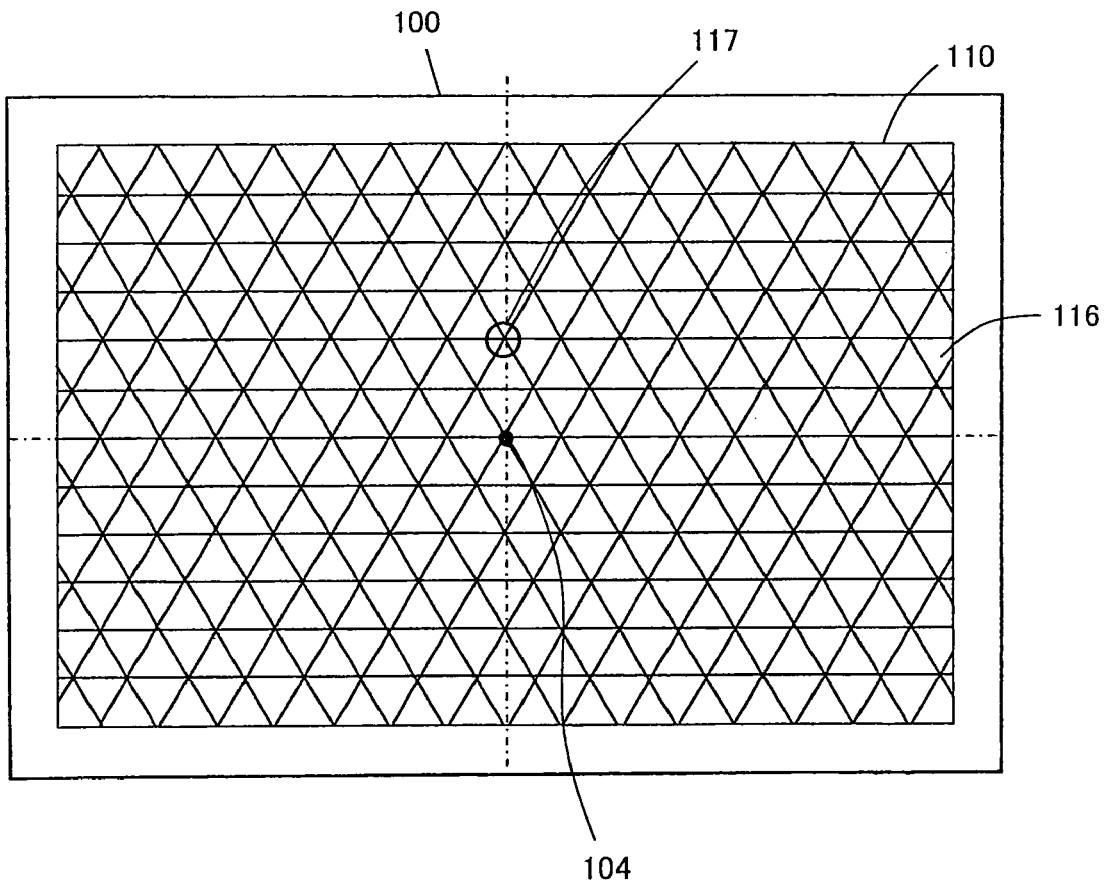
Figure 42:
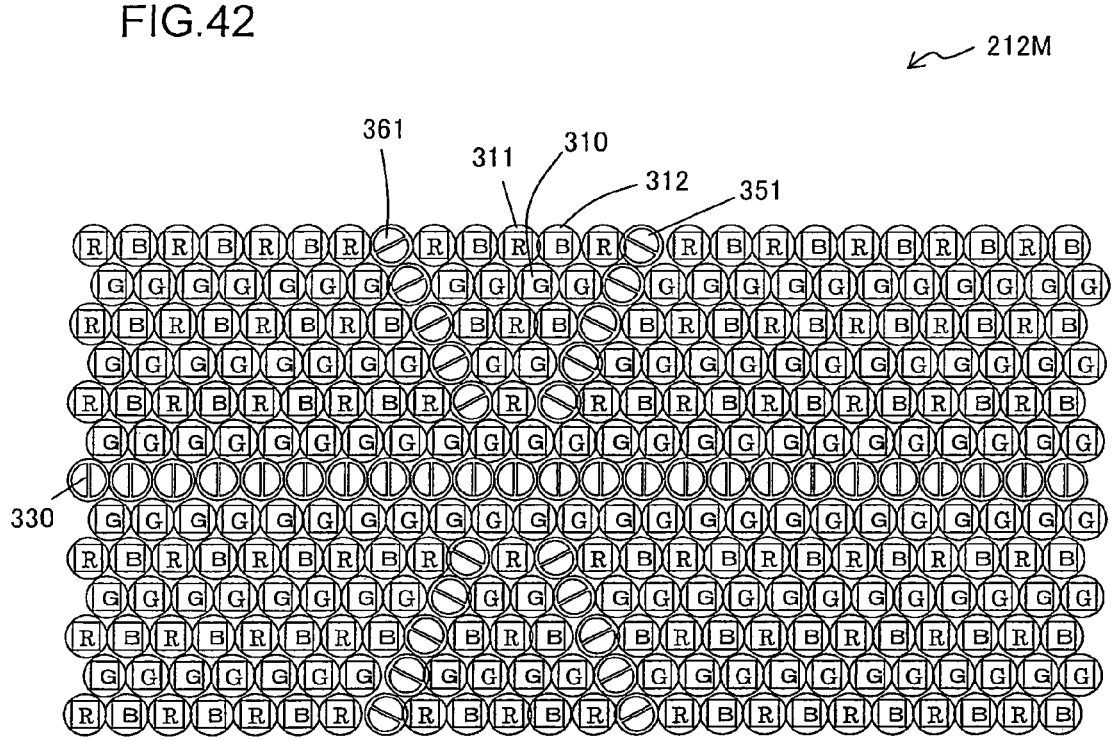

FIGS. 41 and 42 illustrate the positional arrangement adopted for focus detection pixels at an image sensor 212M achieved in yet another variation. While the imaging pixels and the focus detection pixels in each of the image sensor described above are disposed in a dense square array, the present invention may adopt in a dense hexagonal array of imaging pixels and focus detection pixels. Imaging pixels and focus detection pixels are disposed in a dense hexagonal array over the photographic field 100 of the image sensor 212M, with the focus detection pixels disposed along grid lines. The grid 116 is made up with straight lines extending along the horizontal direction and straight lines leaning forward and leaning backward with 60° slopes relative to the horizontal lines, all set with a uniform pitch over the rectangular photographic field 100. The grid lines cover substantially the entire range of the photographic field 100.

FIG. 42 is an enlargement of an area 117 in FIG. 41, which contains a grid intersection point and is set away from the center 104 of the photographic field 100 along the vertical direction. Focus detection pixels 330 are disposed along the horizontal direction, focus detection pixels 351, are disposed along the forward leaning straight line extending along the 60° diagonal direction and focus detection pixels 361 are disposed along the backward leaning straight line extending along the 60° diagonal direction. The focus detection pixels 351 are each oriented by rotating a focus detection pixel 330 by 60° along the counterclockwise direction, whereas the focus detection pixels 361 are oriented by rotating a focus detection pixel 330 by 60° along the clockwise direction. A focus detection pixel 330 among those disposed along the horizontal direction occupies the pixel position equivalent to the grid intersection point, with the pixel row made up with the focus detection pixels 351 and the pixel row made up with the focus detection pixels 361 each discontinued over three pixels in the middle range containing the focus detection pixel 330.

The principle with regard to the type of focus detection pixel to occupy the grid intersection point applies in all the other grid intersection points, so that a focus detection pixel among those disposed along a direction closer to the direction (circumferential direction) perpendicular to the direction (radial direction) along which the straight line connecting the photographic field center and the grid intersection point extends, occupies the grid intersection point. In the positional arrangement described above, focus detection pixels are not disposed with an excessively high density around the intersection position at which the focus detection pixel rows intersect so as to sustain a high level of pixel interpolation accuracy and assure a desired level of image quality.

Figure 43:
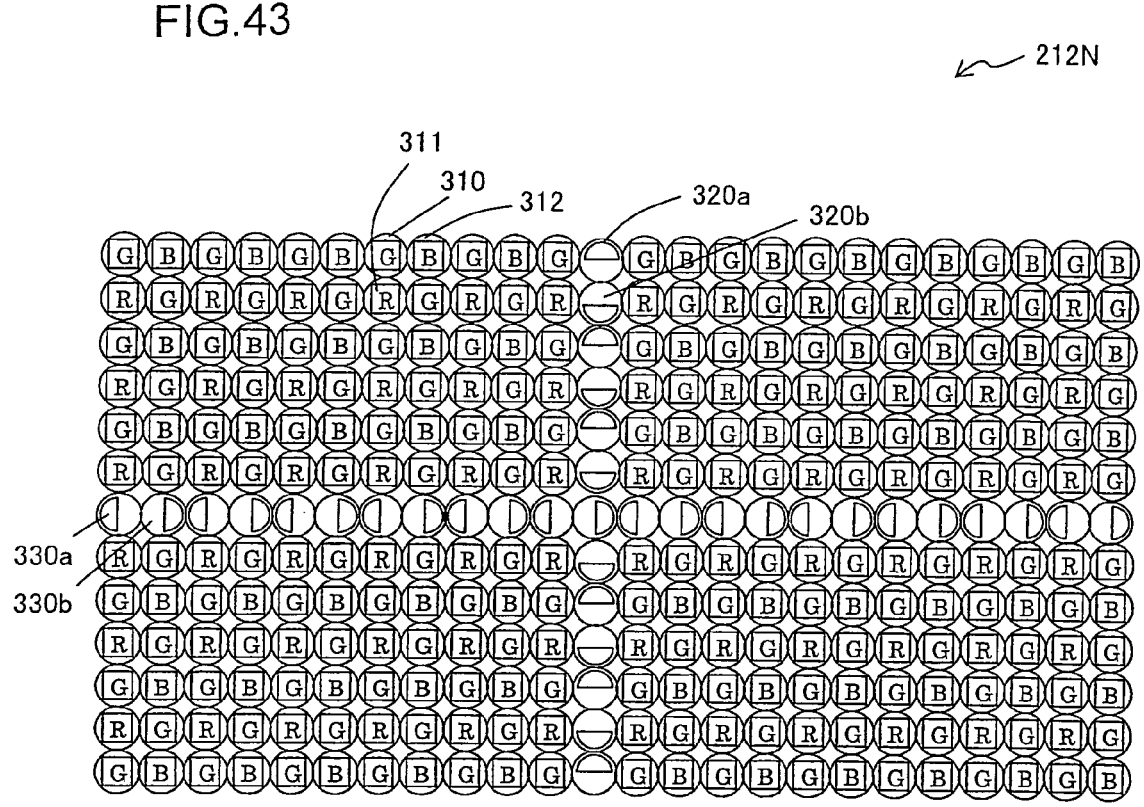

FIGS. 43 and 44 illustrate the positional arrangement assumed for focus detection pixels at an image sensor 212N achieved in a further variation. In each of the image sensors described above, focus detection pixels each include a pair of photoelectric conversion units so as to receive a pair of focus detection light fluxes at a single focus detection pixel. As an alternative, focus detection pixels may each include a single photoelectric conversion unit so as to receive one of the light fluxes in a focus detection light flux pair at a given focus detection pixel. The image sensor 212N in FIG. 43 corresponds to the image sensor 212G in FIG. 26, with each set of focus detection pixels made up with a focus detection pixel 330a and a focus detection pixel 330b corresponding to a focus detection pixel 330 and each set of focus detection pixels made up with a focus detection pixel 320a and a focus detection pixel 320b corresponding to a focus detection pixel 320.

FIG. 44(a) shows the structure of a focus detection pixel 330a (320a). The focus detection pixel 330a (320a) is constituted with a micro-lens 10 and a photoelectric conversion unit 16. FIG. 44(b) shows the structure of a focus detection pixel 330b (320b). The focus detection pixel 330b (320b) is constituted with a micro-lens 10 and a photoelectric conversion unit 17. The photoelectric conversion units 16 and 17 projected onto the exit pupil of the interchangeable lens via the micro-lenses 10 define the range-finding pupils 92 and 93 in FIG. 11. Thus, the outputs of a pair of images to be used in horizontal focus detection are obtained via the focus detection pixel row made up with the focus detection pixels 330a and 330b. In addition, the focus detection pixel 320a and the focus detection pixel 320b are respectively oriented by rotating the focus detection pixels 330a and 330b by 90° along the clockwise direction and the outputs of the pair of images to be used in vertical focus detection can be obtained via the focus detection pixel row made up with the focus detection pixels 320a and 320b.

The use of focus detection pixels each equipped with a single photoelectric conversion unit disposed there in allows a uniform read circuit structure to be adopted in conjunction with the imaging pixels and the focus detection pixels, which, in turn, makes it possible to keep the circuit structure as simple as possible.

While a face position is determined based upon the imaging pixel data alone without using the focus detection pixel data during the face detection processing executed in step 220 in the flowchart of the imaging operation in the alternative embodiment presented in FIG. 30, pixel data at each of the pixel positions occupied by the focus detection pixels in the focus detection pixel rows may be generated through pixel interpolation based upon the data at the imaging pixels present around the focus detection pixels, as in step 290, and a face position may then be determined based upon the data from the imaging pixels and data generated through the pixel interpolation. In this case, since pixel data at the positions occupied by the focus detection pixels are utilized as well, the face detection accuracy is improved.

While the results of the face detection processing executed in step 220 are utilized in the focus detection during the imaging operation in the alternative embodiment shown in FIG. 30, the face detection processing results may instead be utilized in exposure control, white balance control or the like.

While the position of a person's face on the photographic field is determined in step 220 during the imaging operation in the alternative embodiment shown in FIG. 30, the present invention is not limited to this example and the results obtained by determining the position assumed by a person or the position assumed by a person's eye may instead be utilized in focus detection. During the imaging operation, a specific subject other than a person or a specific color may be detected on the photographic field and the position occupied by the subject or the color may be determined, instead.

While the face detection is executed based upon the data from the imaging pixels alone without using the data from the focus detection pixels in step 220 during the imaging operation executed in the alternative embodiment shown in FIG. 30, exposure detection, white balance detection, blur detection or the like may be likewise executed based upon the output from the image sensor but without using data from the focus detection pixels. In addition, pixel data at each of the pixel positions occupied by the focus detection pixels in the focus detection pixel rows may be generated through pixel interpolation executed based upon data at imaging pixels present around the focus detection pixel, as in step 290, and then, exposure detection, white balance detection, blur detection or the like may be executed based upon the data originating from the imaging pixels and the data generated through pixel interpolation. By using the pixel data generated for the focus detection pixel positions in addition to the data from the imaging pixels, better detection accuracy is assured in the exposure detection, the white balance detection, the blur detection or the like.

While the focus detection is executed based upon the data from the focus detection pixels present near the face position detected on the photographic field in steps 220 and 230 during the imaging operation executed in the alternative embodiment shown in FIG. 30, the present invention is not limited to this example and a specific focus detection position may be manually selected or focus detection may be executed at a plurality of focus detection positions set over the entire photographic field.

The grid pitch with which focus detection pixels are disposed in the embodiment may be determined as described below. If the grid pitch is very small, the number of sets of data used in the focus detection is bound to be extremely large, and a great length of time will be required to execute the focus detection calculation processing, resulting in slower response and lowered image quality due to more errors in the pixel interpolation. For these reasons, it is desirable to select a grid pitch equal to or greater than ten pixels. At the same time, in order to ensure that the accurate image shift amount is detected even when a great extent of defocusing occurs at the optical system, focus detection pixels must be disposed continuously over a range equal to or greater than a predetermined length (grid pitch). For instance, assuming the opening angle formed by the gravitational centers of the pair of focus detection light fluxes passing through the pair of range-finding pupils in FIG. 11 is equivalent to F10, an image shift of at least 0.5 mm (5 mm/10) must be detected via the focus detection pixels on the photographic field in order to assure detection of defocusing at ±5 mm.

Since a common image portion must be detected in addition to the image shift of 0.5 mm, focus detection pixels ultimately must be disposed continuously over a range of approximately 1 mm on the photographic field. The grid pitch must therefore be set equal to or greater than 1 mm. If the grid pitch is too coarse, on the other hand, the distance between the designated face position and the focus detection pixel row closest to the face position may be significant and focus detection may be executed for an image portion other than the face, such as a background image portion. For instance, assuming that the photographic field at the image sensor ranges 36 mm (across) by 24 mm (down), a face photographed as the main subject is known through experience to have an areal size with a diameter of approximately 4 mm or more. In this case, the grid pitch must be set equal to or less than 4 mm. When the subject used to select the designated position is an upper body or full body portrait of a person or a person's eye, an upper limit to the grid pitch must be set based upon a statistically-determined typical areal size of the subject on the photographic field.

While the image sensors described above each include imaging pixels equipped with color filters disposed in a Bayer array, the structures of the color filters and the positional arrangement with which they are disposed are not limited to those described earlier and the present invention may be adopted in conjunction with complementary color filters (green: G, yellow: Ye, magenta: Mg, cyan: Cy). In such a case, the advantages of the present invention will be fully realized by ensuring that the intersection position at which two focus detection pixel rows intersect is set at a pixel position that would otherwise be occupied by a pixel corresponding to the color with the highest level of density in the pixel array.

While the focus detection pixels at each of the image sensors described above are not equipped with color filters, the present invention may be adopted in conjunction with focus detection pixels equipped with color filters, the color of which matches one of the colors of the color filters at the imaging pixels (e.g., green filters). In this case, image data originating from the focus detection pixels, too, can be utilized in the image data interpolation and thus, better image quality is achieved.

While the focus detection pixels shown in FIGS. 5 and 44 include photoelectric conversion units assuming semicircular shapes, the photoelectric conversion units may assume a shape other than these. For instance, the photoelectric conversion units in the focus detection pixels may assume an elliptical shape, a rectangular shape, a polygonal shape or the like.

The present invention may be adopted in conjunction with either a CCD image sensor or a CMOS image sensor.

An image sensor adopting the present invention may be engaged in focus detection executed through a method other than the split-pupil phase detection method executed via micro-lenses. In other words, the present invention may be adopted in any image sensor that includes pixels each equipped with a pair of photoelectric conversion units. For instance, the present invention may be adopted in a split-pupil image sensor engaged in detection executed by using polarized light.

Furthermore, the angle formed by the two focus detection pixel rows intersecting each other is not limited to 90° and the two focus detection pixel rows may instead intersect with an intersecting angle of 45°.

The imaging apparatus according to the present invention may be embodied as an apparatus other than a digital still camera or a film still camera with an interchangeable lens detachably mounted at the camera body. For instance, the present invention may be adopted in a digital still camera or a film still camera with an integrated lens. It may also be adopted in a video camera, a compact camera module built into a portable telephone, a surveillance camera or the like. The present invention may be further adopted in a focus detection device installed in an apparatus other than a camera, a range-finding device or a stereo range-finding device.

As explained above, in the embodiment of the present invention and its variations, two focus detection pixel rows can be set to intersect while assuring high image quality for the overall captured image generated by using image data from the imaging pixels and image data generated in correspondence to each focus detection pixel position through interpolation based upon image data originating from surrounding imaging pixels.

In addition, the two focus detection pixel rows can be made to intersect by minimizing any disadvantage that may result from a disruption in one of the focus detection pixel rows, such as a lowered level of focus detection performance.

Furthermore, the two focus detection pixel rows can be made to intersect without having to use any focus detection pixel with a special structure.

Moreover, focus detection cannot be executed at a random position within the photographic field of an imaging apparatus in the related art, in which the focus detection areas are set at discrete positions within the photographic field. For instance, focus detection executed over the area taken up by a person's face determined based upon image signals from imaging pixels is disabled if a focus detection area is not present at the designated position. In the alternative embodiment and its variations, focus detection pixels are disposed with a high level of efficiency over the photographic field to assure optimal focus detection through the split-pupil method. In other words, focus detection pixels are distributed substantially evenly along a plurality of directions in a given area of the photographic field so as to enable focus detection along the plurality of directions in the area and, at the same time, the quantity of focus detection pixels is kept to an absolute minimum to ensure that the image quality is not compromised.

The disclosure of the following priority application is herein incorporated by reference:
Japanese Patent Application No. 2006-249525 filed Sep. 14, 2006

The invention claimed is:

1. An image sensor that captures an image formed through an optical system and that comprises a plurality of types of imaging pixels with spectral sensitivity characteristics different from one another, two-dimensionally disposed in a Bayer array, wherein:
   a plurality of focus detection pixel rows are disposed so as to occupy part of the Bayer array and extend along a plurality of directions intersecting each other, each made up with a plurality of focus detection pixels set along one of the plurality of directions, the focus detection pixel rows are used to detect a focusing condition of the optical system; and
   a focus detection pixel occupying a position at which the focus detection pixel rows intersect is set at a position equivalent to a position of one of a blue pixel and a green pixel in the Bayer array.

2. An image sensor according to claim 1, wherein:
the focus detection pixel occupying the position at which the focus detection pixel rows intersect is set at a position equivalent to a position of a blue pixel in the Bayer array.

3. An image sensor that captures an image formed through an optical system and that comprises a plurality of types of imaging pixels with spectral sensitivity characteristics different from one another, two-dimensionally disposed in a predetermined array, wherein:
   a plurality of focus detection pixel rows are disposed so as to occupy part of the predetermined array and extend along a plurality of directions intersecting each other, each made up with a plurality of focus detection pixels set along one of the plurality of directions, and the focus detection pixel rows are used to detect a focusing condition of the optical system; and
   a focus detection pixel occupying a position at which the focus detection pixel rows intersect is set at a position equivalent to a position of an imaging pixel with specific spectral sensitivity characteristics corresponding to imaging pixels disposed with a highest level of density in the predetermined array.

4. An image sensor according to claim 3, wherein:
the predetermined array is a Bayer array.

5. An image sensor according to claim 3, wherein:
the imaging pixels and the focus detection pixels are each equipped with a micro-lens and a photoelectric conversion unit.

6. An image sensor according to claim 3, wherein:
the plurality of focus detection pixel rows comprises a first focus detection pixel row and a second focus detection pixel row, the first focus detection pixel row is arranged along a direction perpendicular to a direction running from a center of photographic field to a field periphery and the second focus detection pixel row is arranged along the direction running from the center of photographic field toward the field periphery; and
a focus detection pixel in the first focus detection pixel row occupies the position at which the first focus detection pixel row and the second focus detection pixel row intersect.

7. An image sensor according to claim 6, wherein:
the focus detection pixels in the first focus detection pixel row each receives a first pair of focus detection light fluxes having passed through the optical system and the focus detection pixels in a second focus detection pixel row each receives a second pair of focus detection light fluxes having passed through the optical system; and
a distance between gravitational centers of the first pair of focus detection light fluxes is greater than a distance between gravitational centers of the second pair of focus detection light fluxes.

8. An image sensor according to claim 6, wherein: an array pitch at which the focus detection pixels in the first focus detection pixel row are disposed is set smaller than an array pitch at which the focus detection pixels in the second focus detection pixel rows are disposed and a focus detection pixel in the first focus detection pixel row occupies the position at which the first focus detection pixel row and the second focus detection pixel row intersect.

9. An image sensor according to claim 3, wherein:
the imaging pixels are disposed in a dense two-dimensional array; and
the plurality of focus detection pixel rows are disposed in a grid pattern assuming a greater grid pitch than an array pitch at which the imaging pixels are disposed.

10. An image sensor according to claim 9, wherein:
the plurality of focus detection pixel rows are disposed in a square grid pattern.

11. An image sensor according to claim 9, wherein:
the plurality of focus detection pixel rows includes focus detection pixel rows disposed along directions in which diagonal lines connecting intersection points of the focus detection pixel rows disposed in the grid pattern extend.

12. An image sensor according to claim 9, wherein:
the focus detection pixels are disposed adjacent to one another continuously along a straight line.

13. An image sensor according to claim 12, wherein:
a focus detection pixel in a focus detection pixel row ranging along a direction closer to a tangential direction along which a tangential line of a concentric circle centered on a center of photographic field extends, occupies an intersection position at which the focus detection pixel rows intersect each other.

14. An imaging apparatus, comprising:
an image sensor according to claim 3; and
a focus detection means for detecting a focusing condition of the optical system based upon signals output from the focus detection pixel rows.

15. An imaging apparatus according to claim 14, comprising:
an interpolation means for generating an image signal at a position occupied by each of the focus detection pixels through interpolation executed based upon image signals from the imaging pixels disposed near the focus detection pixel.

16. An imaging apparatus according to claim 15, comprising:
a selection means for selecting a specific position on the image sensor based upon an output from the image sensor, wherein:
the focus detection means detects the focusing condition of the optical system based upon signals from the focus detection pixel row present in the position selected via the selection means.

17. An imaging apparatus according to claim 16, wherein:
the selection means detects a position of a person, a person's face or a person's eye within an image obtained via the image sensor.

18. An imaging apparatus according to claim 17, wherein:
the plurality of focus detection pixel rows are disposed in a grid pattern assuming a grid pitch greater than an array pitch at which the imaging pixels are disposed; and
the grid pitch is set smaller than a statistically-determined average size of the person, the person's face or the person's eyes assumed on the photographic field.

19. An imaging apparatus according to claim 17, wherein:
the selection means selects the specific position based upon an output from the image sensor which does not include signals from the focus detection pixels.

20. An imaging apparatus according to claim 17, wherein:
the selection means selects the specific position by using image signals generated via the interpolation means in correspondence to positions occupied by the focus detection pixels.

* * * * *